(12) United States Patent
Walmsley

(10) Patent No.: US 7,401,223 B2
(45) Date of Patent: *Jul. 15, 2008

(54) AUTHENTICATION CHIP FOR AUTHENTICATING AN UNTRUSTED CHIP

(75) Inventor: Simon Robert Walmsley, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 285 days.

This patent is subject to a terminal disclaimer.

(21) Appl. No.: 10/902,883

(22) Filed: Aug. 2, 2004

(65) Prior Publication Data

US 2005/0066168 A1   Mar. 24, 2005

Related U.S. Application Data

(63) Continuation of application No. 09/505,147, filed on Feb. 15, 2000, now Pat. No. 6,816,968, and a continuation of application No. 09/113,223, filed on Jul. 10, 1998, now Pat. No. 6,442,525.

(51) Int. Cl.
*H04L 9/00* (2006.01)

(52) U.S. Cl. ............... 713/169; 713/155; 713/159; 713/167; 713/168; 713/170; 713/172; 713/176; 713/181; 713/189; 380/46; 380/259; 380/260; 380/262

(58) Field of Classification Search ............ 713/169, 713/155, 159, 168–167, 170, 172, 176, 181, 713/189; 380/46, 259–260, 262
See application file for complete search history.

(56) References Cited

U.S. PATENT DOCUMENTS

| 4,736,423 | A | 4/1988 | Matyas |
| 4,799,061 | A | 1/1989 | Abraham et al. |
| 5,036,461 | A | 7/1991 | Elliott et al. |
| 5,136,642 | A | 8/1992 | Kawamura et al. |
| 5,196,840 | A | 3/1993 | Leith et al. |
| 5,245,657 | A | 9/1993 | Sakurai |
| 5,506,905 | A | 4/1996 | Markowski et al. |
| 5,515,441 | A | 5/1996 | Facher |
| 5,619,571 | A | 4/1997 | Sandstrom et al. |

(Continued)

FOREIGN PATENT DOCUMENTS

| DE | 19716111 | 10/1998 |
| EP | 915590 | 5/1999 |
| JP | 11008618 A | 1/1999 |

*Primary Examiner*—Kambiz Zand
*Assistant Examiner*—Peter Poltorak

(57) ABSTRACT

A trusted authentication chip for use in authenticating an untrusted authentication chip; the trusted authentication chip including a random number generator, a symmetric encryption function and two secret keys for the function, a signature function and a test function; wherein the trusted authentication chip generates test data including a random number and its signature, encrypted using a first of said secret keys and transmits the test data to the untrusted authentication chip, wherein the trusted authentication chip receives a data message and an encrypted version of the data message in combination with the random number from the untrusted authentication chip, the data message being encrypted using a second of said secret keys, wherein the test function operates to encrypt the random number together with the data message by the symmetric encryption function using the second secret key, compare the two versions of the random number encrypted together with the data message using the second key, and in the event that the two versions match, considers the untrusted authentication chip and the data message to be valid, otherwise, it considers the untrusted authentication chip and the data message to be invalid.

9 Claims, 8 Drawing Sheets

U.S. PATENT DOCUMENTS

| | | |
|---|---|---|
| 6,028,937 A | 2/2000 | Tatebayashi et al. |
| 6,067,620 A * | 5/2000 | Holden et al. ............... 713/155 |
| 6,192,473 B1 | 2/2001 | Ryan, Jr. et al. |
| 6,374,354 B1 | 4/2002 | Walsley et al. |
| 6,389,533 B1 | 5/2002 | Davis et al. |
| 6,442,690 B1 | 8/2002 | Howard et al. |
| 6,487,660 B1 | 11/2002 | Vanstone et al. |
| 6,529,487 B1 | 3/2003 | Rose |
| 6,704,871 B1 * | 3/2004 | Kaplan et al. ............... 713/192 |
| 2003/0016770 A1 * | 1/2003 | Trans et al. ................. 375/346 |

* cited by examiner

AUTHENTICATION CHIP FOR AUTHENTICATING AN UNTRUSTED CHIP

CROSS REFERENCE TO RELATED APPLICATIONS

This Application is a continuation application of U.S. Ser. No. 09/505,147, filed on Feb. 15, 2000, now Issued Pat. No. 6,816,968.

The present application is a continuation of and claims the benefit of U.S. application Ser. No. 09/113,223 filed on Jul. 10, 1998, now Issued Pat. No. 6,442,525, the entire contents of which are herein incorporated by reference.

TECHNICAL FIELD

This invention concerns a consumable authentication protocol for validating the existence of an untrusted authentication chip, as well as ensuring that the authentication chip lasts only as long as the consumable. In a further aspect it concerns a consumable authentication system for the protocol. In this invention we are concerned not only with validating that an authentication chip is present, but writes and reads of the authentication chip's memory space must be authenticated as well.

BACKGROUND ART

1 Introduction

Manufacturers of systems that require consumables, such as a laser printer that requires toner cartridges, have struggled with the problem of authenticating consumables, to varying levels of success. Most have resorted to specialized packaging. However this does not stop home refill operations or clone manufacture. The prevention of copying is important for two reasons:

To protect revenues

To prevent poorly manufactured substitute consumables from damaging the base system. For example, poorly filtered ink may clog print nozzles in an ink jet printer.

2 Scope

Authentication is an extremely large and constantly growing field. This invention is concerned with authenticating consumables. In most cases, there is no reason to prohibit the use of consumables in a third party product.

The invention concerns an authentication chip that contains an authentication code and circuit specially designed to prevent copying. The chip is manufactured using the standard Flash memory manufacturing process, and is low cost enough to be included in consumables such as ink and toner cartridges.

Once programmed, the authentication chips are compliant with the NSA export guidelines since they do not constitute an encryption device. They can therefore be practically manufactured in the USA (and exported) or anywhere else in the world.

3 Concepts and Terms

This part discusses terms and concepts that are referred to throughout the remainder of the document.

3.1 Symbolic Nomenclature

The following symbolic nomenclature is used throughout this document:

TABLE 1

Summary of Symbolic Nomenclature

| Symbol | Description |
|---|---|
| $F[X]$ | Function F, taking a single parameter X |
| $F[X, Y]$ | Function F, taking two parameters, X and Y |
| $X|Y$ | X concatenated with Y |
| $X \wedge Y$ | Bitwise X AND Y |
| $X \vee Y$ | Bitwise X OR Y (inclusive-OR) |
| $X \oplus Y$ | Bitwise X XOR Y (exclusive-OR) |
| $\neg X$ | Bitwise NOT X (complement) |
| $X \leftarrow Y$ | X is assigned the value Y |
| $X \leftarrow \{Y, Z\}$ | The domain of assignment inputs to X is Y and Z |
| $X = Y$ | X is equal to Y |
| $X \neq Y$ | X is not equal to Y |
| $\Downarrow X$ | Decrement X by 1 (floor 0) |
| $\Uparrow X$ | Increment X by 1 (modulo register length) |
| Erase X | Erase Flash memory register X |
| SetBits[X, Y] | Set the bits of the Flash memory register X based on Y |
| $Z \leftarrow$ ShiftRight[X, Y] | Shift register X right one bit position, taking input bit from Y and placing the output bit in Z |

3.2 Basic Terms

A message, denoted by M, is plaintext. The process of transforming M into ciphertext C, where the substance of M is hidden, is called encryption. The process of transforming C back into M is called decryption. Referring to the encryption function as E, and the decryption function as D, we have the following identities:

$$E[M]=C$$

$$D[C]=M$$

Therefore the following identity is true: $D[E[M]]=M$.

3.3 Symmetric Cryptography

A symmetric encryption algorithm is one where: the encryption function E relies on key $K_1$, the decryption function D relies on key $K_2$, $K_2$ can be derived from $K_1$, and $K_1$ can be derived from $K_2$.

In most symmetric algorithms, $K_1$ equals $K_2$. However, even if $K_1$ does not equal $K_2$, given that one key can be derived from the other, a single key K can suffice for the mathematical definition. Thus:

$$E_K[M]=C$$

$$D_K[C]=M$$

The security of these algorithms rests very much in the key K. Knowledge of K allows anyone to encrypt or decrypt. Consequently K must remain a secret for the duration of the value of M. For example, M may be a wartime message "My current position is grid position 123-456". Once the war is over the value of M is greatly reduced, and if K is made public, the knowledge of the combat unit's position may be of no relevance whatsoever. Of course if it is politically sensitive for the combat unit's position to be known even after the war, K may have to remain secret for a very long time.

An enormous variety of symmetric algorithms exist, from the textbooks of ancient history through to sophisticated modern algorithms. Many of these are insecure, in that modern cryptanalysis techniques (see Section 3.8) can successfully attack the algorithm to the extent that K can be derived.

The security of the particular symmetric algorithm is a function of two things: the strength of the algorithm and the length of the key [78].

The strength of an algorithm is difficult to quantify, relying on its resistance to cryptographic attacks (see Section 3.8). In addition, the longer that an algorithm has remained in the public eye, and yet remained unbroken in the midst of intense scrutiny, the more secure the algorithm is likely to be. By contrast, a secret algorithm that has not been scrutinized by cryptographic experts is unlikely to be secure.

Even if the algorithm is "perfectly" strong (the only way to break it is to try every key—see Section 3.8.1.5), eventually the right key will be found. However, the more keys there are, the more keys have to be tried. If there are N keys, it will take a maximum of N tries. If the key is N bits long, it will take a maximum of $2^N$ tries, with a 50% chance of finding the key after only half the attempts ($2^{N-1}$). The longer N becomes, the longer it will take to find the key, and hence the more secure it is. What makes a good key length depends on the value of the secret and the time for which the secret must remain secret as well as available computing resources.

In 1996, an ad hoc group of world-renowned cryptographers and computer scientists released a report [9] describing minimal key lengths for symmetric ciphers to provide adequate commercial security. They suggest an absolute minimum key length of 90 bits in order to protect data for 20 years, and stress that increasingly, as cryptosystems succumb to smarter attacks than brute-force key search, even more bits may be required to account for future surprises in cryptanalysis techniques.

We will ignore most historical symmetric algorithms on the grounds that they are insecure, especially given modern computing technology. Instead, we will discuss the following algorithms:

DES
Blowfish
RC5
IDEA

3.3.1 DES

DES (Data Encryption Standard) [26] is a US and international standard, where the same key is used to encrypt and decrypt. The key length is 56 bits. It has been implemented in hardware and software, although the original design was for hardware only. The original algorithm used in DES was patented in 1976 (U.S. Pat. No. 3,962,539) and has since expired.

During the design of DES, the NSA (National Security Agency) provided secret S-boxes to perform the key-dependent nonlinear transformations of the data block. After differential cryptanalysis was discovered outside the NSA, it was revealed that the DES S-boxes were specifically designed to be resistant to differential cryptanalysis.

As described in [92], using 1993 technology, a 56-bit DES key can be recovered by a custom-designed $1 million machine performing a brute force attack in only 35 minutes. For $10 million, the key can be recovered in only 3.5 minutes. DES is clearly not secure now, and will become less so in the future.

A variant of DES, called triple-DES is more secure, but requires 3 keys: $K_1$, $K_2$, and $K_3$. The keys are used in the following manner:

$$E_{K3}[D_{K2}[E_{K1}[M]]]=C$$

$$D_{K3}[E_{K2}[D_{K1}[C]]]=M$$

The main advantage of triple-DES is that existing DES implementations can be used to give more security than single key DES. Specifically, triple-DES gives protection of equivalent key length of 112 bits [78]. Triple-DES does not give the equivalent protection of a 168-bit key (3×56) as one might naively expect.

Equipment that performs triple-DES decoding and/or encoding cannot be exported from the United States.

3.3.2 Blowfish

Blowfish is a symmetric block cipher first presented by Schneier in 1994 [76]. It takes a variable length key, from 32 bits to 448 bits, is unpatented, and is both license and royalty free. In addition, it is much faster than DES.

The Blowfish algorithm consists of two parts: a key-expansion part and a data-encryption part. Key expansion converts a key of at most 448 bits into several subkey arrays totaling 4168 bytes. Data encryption occurs via a 16-round Feistel network. All operations are XORs and additions on 32-bit words, with four index array lookups per round.

It should be noted that decryption is the same as encryption except that the subkey arrays are used in the reverse order. Complexity of implementation is therefore reduced compared to other algorithms that do not have such symmetry.

[77] describes the published attacks which have been mounted on Blowfish, although the algorithm remains secure as of February 1998[79]. The major finding with these attacks has been the discovery of certain weak keys. These weak keys can be tested for during key generation. For more information, refer to [77] and [79].

3.3.3 RC5

Designed by Ron Rivest in 1995, RC5 [74] has a variable block size, key size, and number of rounds. Typically, however, it uses a 64-bit block size and a 128-bit key.

The RC5 algorithm consists of two parts: a key-expansion part and a data-encryption part. Key expansion converts a key into 2r+2 subkeys (where r=the number of rounds), each subkey being w bits. For a 64-bit blocksize with 16 rounds (w=32, r=16), the subkey arrays total 136 bytes. Data encryption uses addition mod 2w, XOR and bitwise rotation.

An initial examination by Kaliski and Yin [43] suggested that standard linear and differential cryptanalysis appeared impractical for the 64-bit blocksize version of the algorithm. Their differential attacks on 9 and 12 round RC5 require $2^{45}$ and $2^{62}$ chosen plaintexts respectively, while the linear attacks on 4, 5, and 6 round RC5 requires $2^{37}$, $2^{47}$ and $2^{57}$ known plaintexts). These two attacks are independent of key size.

More recently however, Knudsen and Meier [47] described a new type of differential attack on RC5 that improved the earlier results by a factor of 128, showing that RC5 has certain weak keys.

RC5 is protected by multiple patents owned by RSA Laboratories. A license must be obtained to use it.

3.3.4 IDEA

Developed in 1990 by Lai and Massey [53], the first incarnation of the IDEA cipher was called PES. After differential cryptanalysis was discovered by Biham and Shamir in 1991, the algorithm was strengthened, with the result being published in 1992 as IDEA [52].

IDEA uses 128-bit keys to operate on 64-bit plaintext blocks. The same algorithm is used for encryption and decryption. It is generally regarded as the most secure block algorithm available today [78][56].

The biggest drawback of IDEA is the fact that it is patented (U.S. Pat. No. 5,214,703, issued in 1993), and a license must be obtained from Ascom Tech AG (Bern) to use it.

3.4 Asymmetric Cryptography

An asymmetric encryption algorithm is one where:
the encryption function E relies on key $K_1$,
the decryption function D relies on key $K_2$,
K2 cannot be derived from $K_1$ in a reasonable amount of time, and
K1 cannot be derived from $K_2$ in a reasonable amount of time.
Thus:

$$E_{K1}[M]=C$$

$$D_{K2}[C]=M$$

These algorithms are also called public-key because one key $K_1$ can be made public. Thus anyone can encrypt a message (using $K_1$) but only the person with the corresponding decryption key ($K_2$) can decrypt and thus read the message.

In most cases, the following identity also holds: $E_{K2}[M]=C$ $$D_{K1}[C]=M$$

This identity is very important because it implies that anyone with the public key $K_1$ can see M and know that it came from the owner of $K_2$. No-one else could have generated C because to do so would imply knowledge of $K_2$. This gives rise to a different application, unrelated to encryption—digital signatures.

The property of not being able to derive $K_1$ from $K_2$ and vice versa in a reasonable time is of course clouded by the concept of reasonable time. What has been demonstrated time after time, is that a calculation that was thought to require a long time has been made possible by the introduction of faster computers, new algorithms etc. The security of asymmetric algorithms is based on the difficulty of one of two problems: factoring large numbers (more specifically large numbers that are the product of two large primes), and the difficulty of calculating discrete logarithms in a finite field. Factoring large numbers is conjectured to be a hard problem given today's understanding of mathematics. The problem however, is that factoring is getting easier much faster than anticipated. Ron Rivest in 1977 said that factoring a 125-digit number would take 40 quadrillion years [30]. In 1994 a 129-digit number was factored [3]. According to Schneier, you need a 1024-bit number to get the level of security today that you got from a 512-bit number in the 1980s [78]. If the key is to last for some years then 1024 bits may not even be enough. Rivest revised his key length estimates in 1990: he suggests 1628 bits for high security lasting until 2005, and 1884 bits for high security lasting until 2015 [69]. Schneier suggests 2048 bits are required in order to protect against corporations and governments until 2015 [80].

Public key cryptography was invented in 1976 by Diffie and Hellman [15][16], and independently by Merkle [57]. Although Diffie, Hellman and Merkle patented the concepts (U.S. Pat. Nos. 4,200,770 and 4,218,582), these patents expired in 1997.

A number of public key cryptographic algorithms exist. Most are impractical to implement, and many generate a very large C for a given M or require enormous keys. Still others, while secure, are far too slow to be practical for several years. Because of this, many public key systems are hybrid—a public key mechanism is used to transmit a symmetric session key, and then the session key is used for the actual messages.

All of the algorithms have a problem in terms of key selection. A random number is simply not secure enough. The two large primes p and q must be chosen carefully—there are certain weak combinations that can be factored more easily (some of the weak keys can be tested for). But nonetheless, key selection is not a simple matter of randomly selecting 1024 bits for example. Consequently the key selection process must also be secure.

Of the practical algorithms in use under public scrutiny, the following are discussed:
RSA
DSA
ElGamal

3.4.1 RSA

The RSA cryptosystem [75], named after Rivest, Shamir, and Adleman, is the most widely used public key cryptosystem, and is a de facto standard in much of the world [78].

The security of RSA depends on the conjectured difficulty of factoring large numbers that are the product of two primes (p and q). There are a number of restrictions on the generation of p and q. They should both be large, with a similar number of bits, yet not be close to one another (otherwise $p=q=\sqrt{pq}$). In addition, many authors have suggested that p and q should be strong primes [56]. The Hellman-Bach patent (U.S. Pat. No. 4,633,036) covers a method for generating strong RSA primes p and q such that n=pq and factoring n is believed to be computationally infeasible.

The RSA algorithm patent was issued in 1983 (U.S. Pat. No. 4,405,829). The patent expires on Sep. 20, 2000.

3.4.2 DSA

DSA (Digital Signature Algorithm) is an algorithm designed as part of the Digital Signature Standard (DSS) [29]. As defined, it cannot be used for generalized encryption. In addition, compared to RSA, DSA is 10 to 40 times slower for signature verification [40]. DSA explicitly uses the SHA-1 hashing algorithm (see Section 3.6.3.3).

DSA key generation relies on finding two primes p and q such that q divides p-1. According to Schneier [78], a 1024-bit p value is required for long term DSA security. However the DSA standard [29] does not permit values of p larger than 1024 bits (p must also be a multiple of 64 bits).

The US Government owns the DSA algorithm and has at least one relevant patent (U.S. Pat. No. 5,231,688 granted in 1993). However, according to NIST [61]:

"The DSA patent and any foreign counterparts that may issue are available for use without any written permission from or any payment of royalties to the U.S. government."

In a much stronger declaration, NIST states in the same document [61] that DSA does not infringe third party's rights:

"NIST reviewed all of the asserted patents and concluded that none of them would be infringed by DSS. Extra protection will be written into the PK1 pilot project that will prevent an organization or individual from suing anyone except the government for patent infringement during the course of the project."

It must however, be noted that the Schnorr authentication algorithm [81] (U.S. Pat. No. 4,995,082) patent holder claims that DSA infringes his patent. The Schnorr patent is not due to expire until 2008.

3.4.3 ElGamal

The ElGamal scheme [22][23] is used for both encryption and digital signatures. The security is based on the conjectured difficulty of calculating discrete logarithms in a finite field.

Key selection involves the selection of a prime p, and two random numbers g and x such that both g and x are less than p. Then calculate y=gx mod p. The public key is y, g, and p. The private key is x.

ElGamal is unpatented. Although it uses the patented Diffie-Hellman public key algorithm [15][16], those patents expired in 1997. ElGamal public key encryption and digital signatures can now be safely used without infringing third party patents.

3.5 Cryptographic Challenge-Response Protocols and Zero Knowledge Proofs

The general principle of a challenge-response protocol is to provide identity authentication. The simplest form of challenge-response takes the form of a secret password. A asks B for the secret password, and if B responds with the correct password, A declares B authentic.

There are three main problems with this kind of simplistic protocol. Firstly, once B has responded with the password, any observer C will know what the password is. Secondly, A must know the password in order to verify it. Thirdly, if C impersonates A, then B will give the password to C (thinking C was A), thus compromising the password.

Using a copyright text (such as a haiku) as the password is not sufficient, because we are assuming that anyone is able to copy the password (for example in a country where intellectual property is not respected).

The idea of cryptographic challenge-response protocols is that one entity (the claimant) proves its identity to another (the verifier) by demonstrating knowledge of a secret known to be associated with that entity, without revealing the secret itself to the verifier during the protocol [56]. In the generalized case of cryptographic challenge-response protocols, with some schemes the verifier knows the secret, while in others the secret is not even known by the verifier. A good overview of these protocols can be found in [25], [78], and [56].

Since this document specifically concerns Authentication, the actual cryptographic challenge-response protocols used for authentication are detailed in the appropriate sections. However the concept of Zero Knowledge Proofs bears mentioning here.

The Zero Knowledge Proof protocol, first described by Feige, Fiat and Shamir in [24] is extensively used in Smart Cards for the purpose of authentication [34][36][67]. The protocol's effectiveness is based on the assumption that it is computationally infeasible to compute square roots modulo a large composite integer with unknown factorization. This is provably equivalent to the assumption that factoring large integers is difficult.

It should be noted that there is no need for the claimant to have significant computing power. Smart cards implement this kind of authentication using only a few modulo multiplications [34][36].

Finally, it should be noted that the Zero Knowledge Proof protocol is patented [82] (U.S. Pat. No. 4,748,668, issued May 31, 1988).

3.6 One-Way Functions

A one-way function F operates on an input X, and returns F[X] such that X cannot be determined from F[X]. When there is no restriction on the format of X, and F[X] contains fewer bits than X, then collisions must exist. A collision is defined as two different X input values producing the same F[X] value—i.e. $X_1$ and $X_2$ exist such that $X_1 \neq X_2$ yet $F[X_1] = F[X_2]$.

When X contains more bits than F[X], the input must be compressed in some way to create the output. In many cases, X is broken into blocks of a particular size, and compressed over a number of rounds, with the output of one round being the input to the next. The output of the hash function is the last output once X has been consumed. A pseudo-collision of the compression function CF is defined as two different initial values $V_1$ and $V_2$ and two inputs $X_1$ and $X_2$ (possibly identical) are given such that $CF(V_1, X_1) = CF(V_2, X_2)$. Note that the existence of a pseudo-collision does not mean that it is easy to compute an $X_2$ for a given $X_1$.

We are only interested in one-way functions that are fast to compute. In addition, we are only interested in deterministic one-way functions that are repeatable in different implementations. Consider an example F where F[X] is the time between calls to F. For a given F[X] X cannot be determined because X is not even used by F. However the output from F will be different for different implementations. This kind of F is therefore not of interest.

In the scope of this document, we are interested in the following forms of one-way functions:
- Encryption using an unknown key
- Random number sequences
- Hash Functions
- Message Authentication Codes

3.6.1 Encryption Using an Unknown Key

When a message is encrypted using an unknown key K, the encryption function E is effectively one-way. Without the key K, it is computationally infeasible to obtain M from EK[M]. An encryption function is only one-way for as long as the key remains hidden.

An encryption algorithm does not create collisions, since E creates EK[M] such that it is possible to reconstruct M using function D. Consequently F[X] contains at least as many bits as X (no information is lost) if the one-way function F is E.

Symmetric encryption algorithms (see Section 3.3) have the advantage over asymmetric algorithms (see Section 3.4) for producing one-way functions based on encryption for the following reasons:
- The key for a given strength encryption algorithm is shorter for a symmetric algorithm than an asymmetric algorithm
- Symmetric algorithms are faster to compute and require less software or silicon Note however, that the selection of a good key depends on the encryption algorithm chosen. Certain keys are not strong for particular encryption algorithms, so any key needs to be tested for strength. The more tests that need to be performed for key selection, the less likely the key will remain hidden.

3.6.2 Random Number Sequences

Consider a random number sequence $R_0, R_1, \ldots, R_i, R_{1+i}$. We define the one-way function F such that F[X] returns the $X^{th}$ random number in the random sequence. However we must ensure that F[X] is repeatable for a given X on different implementations. The random number sequence therefore cannot be truly random. Instead, it must be pseudo-random, with the generator making use of a specific seed.

There are a large number of issues concerned with defining good random number generators. Knuth, in [48] describes what makes a generator "good" (including statistical tests), and the general problems associated with constructing them. Moreau gives a high level survey of the current state of the field in [60].

The majority of random number generators produce the $i^{th}$ random number from the $i-1^{th}$ state–the only way to determine the $i^{th}$ number is to iterate from the $0^{th}$ number to the $i^{th}$. If i is large, it may not be practical to wait for i iterations.

However there is a type of random number generator that does allow random access. In [10], Blum, Blum and Shub define the ideal generator as follows: ". . . we would like a pseudo-random sequence generator to quickly produce, from short seeds, long sequences (of bits) that appear in every way to be generated by successive flips of a fair coin". They defined the $x^2$ mod n generator [10], more commonly referred to as the BBS generator. They showed that given certain assumptions upon which modern cryptography relies, a BBS generator passes extremely stringent statistical tests.

The BBS generator relies on selecting n which is a Blum integer (n=pq where p and q are large prime numbers, p≠q, p mod 4=3, and q mod 4=3). The initial state of the generator is given by $x_0$ where $x_0=x^2$ mod n, and x is a random integer relatively prime to n. The $i^{th}$ pseudo-random bit is the least significant bit of $x_i$ where:

$$x_i = x_{i-1}^2 \bmod n$$

As an extra property, knowledge of p and q allows a direct calculation of the $i^{th}$ number in the sequence as follows:

$$x_i = x_0^y \bmod n \text{ where } y = 2^i \bmod ((p-1)(q-1))$$

Without knowledge of p and q, the generator must iterate (the security of calculation relies on the conjectured difficulty of factoring large numbers).

When first defined, the primary problem with the BBS generator was the amount of work required for a single output bit. The algorithm was considered too slow for most applications. However the advent of Montgomery reduction arithmetic [58] has given rise to more practical implementations, such as [59]. In addition, Vazirani and Vazirani have shown in [90] that depending on the size of n, more bits can safely be taken from $x_i$ without compromising the security of the generator.

Assuming we only take 1 bit per $x_i$, N bits (and hence N iterations of the bit generator function) are needed in order to generate an N-bit random number. To the outside observer, given a particular set of bits, there is no way to determine the next bit other than a 50/50 probability. If the x, p and q are hidden, they act as a key, and it is computationally infeasible to take an output bit stream and compute x, p, and q. It is also computationally infeasible to determine the value of i used to generate a given set of pseudo-random bits. This last feature makes the generator one-way. Different values of i can produce identical bit sequences of a given length (e.g. 32 bits of random bits). Even if x, p and q are known, for a given F[i], i can only be derived as a set of possibilities, not as a certain value (of course if the domain of i is known, then the set of possibilities is reduced further).

However, there are problems in selecting a good p and q, and a good seed x. In particular, Ritter in [68] describes a problem in selecting x. The nature of the problem is that a BBS generator does not create a single cycle of known length. Instead, it creates cycles of various lengths, including degenerate (zero-length) cycles. Thus a BBS generator cannot be initialized with a random state—it might be on a short cycle. Specific algorithms exist in section 9 of [10] to determine the length of the period for a given seed given certain strenuous conditions for n.

3.6.3 Hash Functions

Special one-way functions, known as Hash functions, map arbitrary length messages to fixed-length hash values. Hash functions are referred to as H[M]. Since the input is of arbitrary length, a hash function has a compression component in order to produce a fixed length output. Hash functions also have an obfuscation component in order to make it difficult to find collisions and to determine information about M from H[M].

Because collisions do exist, most applications require that the hash algorithm is preimage resistant, in that for a given $X_1$ it is difficult to find $X_2$ such that $H[X_1]=H[X_2]$. In addition, most applications also require the hash algorithm to be collision resistant (i.e. it should be hard to find two messages $X_1$ and $X_2$ such that $H[X_1]=H[X_2]$). However, as described in [20], it is an open problem whether a collision-resistant hash function, in the ideal sense, can exist at all.

The primary application for hash functions is in the reduction of an input message into a digital "fingerprint" before the application of a digital signature algorithm. One problem of collisions with digital signatures can be seen in the following example.

A has a long message M1 that says "I owe B $10". A signs $H[M_1]$ using his private key. B, being greedy, then searches for a collision message $M_2$ where $H[M_2]=H[M_1]$ but where $M_2$ is favorable to B, for example "I owe B $1 million". Clearly it is in A's interest to ensure that it is difficult to find such an $M_2$.

Examples of collision resistant one-way hash functions are SHA-1[28], MD5 [73] and RIPEMD-160 [66], all derived from MD4 [70][72].

3.6.3.1 MD4

Ron Rivest introduced MD4 [70][72] in 1990. It is only mentioned here because all other one-way hash functions are derived in some way from MD4.

MD4 is now considered completely broken [18] [19] in that collisions can be calculated instead of searched for. In the example above, B could trivially generate a substitute message $M_2$ with the same hash value as the original message $M_1$.

3.6.3.2 MD5

Ron Rivest introduced MD5 [73] in 1991 as a more secure MD4. Like MD4, MD5 produces a 128-bit hash value. MD5 is not patented [80].

Dobbertin describes the status of MD5 after recent attacks [20]. He describes how pseudo-collisions have been found in MD5, indicating a weakness in the compression function, and more recently, collisions have been found. This means that MD5 should not be used for compression in digital signature schemes where the existence of collisions may have dire consequences. However MD5 can still be used as a one-way function. In addition, the HMAC-MD5 construct (see Section 3.6.4.1) is not affected by these recent attacks.

3.6.3.3 SHA-1

SHA-1[28] is very similar to MD5, but has a 160-bit hash value (MD5 only has 128 bits of hash value). SHA-1 was designed and introduced by the NIST and NSA for use in the Digital Signature Standard (DSS). The original published description was called SHA [27], but very soon afterwards, was revised to become SHA-1[28], supposedly to correct a security flaw in SHA (although the NSA has not released the mathematical reasoning behind the change).

There are no known cryptographic attacks against SHA-1 [78]. It is also more resistant to brute force attacks than MD4 or MD5 simply because of the longer hash result.

The US Government owns the SHA-1 and DSA algorithms (a digital signature authentication algorithm defined as part of DSS [29]) and has at least one relevant patent (U.S. Pat. No. 5,231,688 granted in 1993). However, according to NIST [61]:

"The DSA patent and any foreign counterparts that may issue are available for use without any written permission from or any payment of royalties to the U.S. government."

In a much stronger declaration, NIST states in the same document [61] that DSA and SHA-1 do not infringe third party's rights:

"NIST reviewed all of the asserted patents and concluded that none of them would be infringed by DSS. Extra protection will be written into the PKI pilot project that will prevent an organization or individual from suing anyone except the government for patent infringement during the course of the project."

It must however, be noted that the Schnorr authentication algorithm [81] (U.S. Pat. No. 4,995,082) patent holder claims that DSA infringes his patent. The Schnorr patent is not due to expire until 2008. Fortunately this does not affect SHA-1.

3.6.3.4 RIPEMD-160

RIPEMD-160 [66] is a hash function derived from its predecessor RIPEMD [11] (developed for the European Community's RIPE project in 1992). As its name suggests, RIPEMD-160 produces a 160-bit hash result. Tuned for software implementations on 32-bit architectures, RIPEMD-160 is intended to provide a high level of security for 10 years or more.

Although there have been no successful attacks on RIPEMD-160, it is comparatively new and has not been extensively cryptanalyzed. The original RIPEMD algorithm [11] was specifically designed to resist known cryptographic attacks on MD4. The recent attacks on MD5 (detailed in [20]) showed similar weaknesses in the RIPEMD 128-bit hash function. Although the attacks showed only theoretical weaknesses, Dobbertin, Preneel and Bosselaers further strengthened RIPEMD into a new algorithm RIPEMD-160.

RIPEMD-160 is in the public domain, and requires no licensing or royalty payments.

3.6.4 Message Authentication Codes

The problem of message authentication can be summed up as follows:

How can A be sure that a message supposedly from B is in fact from B?

Message authentication is different from entity authentication (described in the section on cryptographic challenge-response protocols). With entity authentication, one entity (the claimant) proves its identity to another (the verifier). With message authentication, we are concerned with making sure that a given message is from who we think it is from i.e. it has not been tampered with en route from the source to its destination. While this section has a brief overview of message authentication, a more detailed survey can be found in [86].

A one-way hash function is not sufficient protection for a message. Hash functions such as MD5 rely on generating a hash value that is representative of the original input, and the original input cannot be derived from the hash value. A simple attack by E, who is in-between A and B, is to intercept the message from B, and substitute his own. Even if A also sends a hash of the original message, E can simply substitute the hash of his new message. Using a one-way hash function alone, A has no way of knowing that B's message has been changed.

One solution to the problem of message authentication is the Message Authentication Code, or MAC.

When B sends message M, it also sends MAC[M] so that the receiver will know that M is actually from B. For this to be possible, only B must be able to produce a MAC of M, and in addition, A should be able to verify M against MAC[M]. Notice that this is different from encryption of M—MACs are useful when M does not have to be secret.

The simplest method of constructing a MAC from a hash function is to encrypt the hash value with a symmetric algorithm:
1. Hash the input message H[M]
2. Encrypt the hash EK[H[M]]

This is more secure than first encrypting the message and then hashing the encrypted message. Any symmetric or asymmetric cryptographic function can be used, with the appropriate advantages and disadvantage of each type described in Section 3.3 and Section 3.4.

However, there are advantages to using a key-dependent one-way hash function instead of techniques that use encryption (such as that shown above):

Speed, because one-way hash functions in general work much faster than encryption;

Message size, because EK[M] is at least the same size as M, while H[M] is a fixed size (usually considerably smaller than M);

Hardware/software requirements—keyed one-way hash functions are typically far less complex than their encryption-based counterparts; and One-way hash function implementations are not considered to be encryption or decryption devices and therefore are not subject to US export controls.

It should be noted that hash functions were never originally designed to contain a key or to support message authentication. As a result, some ad hoc methods of using hash functions to perform message authentication, including various functions that concatenate messages with secret prefixes, suffixes, or both have been proposed [56][78]. Most of these ad hoc methods have been successfully attacked by sophisticated means [42][64][65]. Additional MACs have been suggested based on XOR schemes [8] and Toeplitz matrices [49] (including the special case of LFSR-based (Linear Feed Shift Register) constructions).

3.6.4.1 HMAC

The HMAC construction [6][7] in particular is gaining acceptance as a solution for Internet message authentication security protocols. The HMAC construction acts as a wrapper, using the underlying hash function in a black-box way. Replacement of the hash function is straightforward if desired due to security or performance reasons. However, the major advantage of the HMAC construct is that it can be proven secure provided the underlying hash function has some reasonable cryptographic strengths—that is, HMAC's strengths are directly connected to the strength of the hash function [6].

Since the HMAC construct is a wrapper, any iterative hash function can be used in an HMAC. Examples include HMAC-MD5, HMAC-SHA1, HMAC-RIPEMD160 etc.

Given the following definitions:

H=the hash function (e.g. MD5 or SHA-1)

n=number of bits output from H (e.g. 160 for SHA-1, 128 bits for MD5)

M=the data to which the MAC function is to be applied

K=the secret key shared by the two parties ipad=0x36 repeated 64 times opad=0x5C repeated 64 times The HMAC algorithm is as follows:
1. Extend K to 64 bytes by appending 0x00 bytes to the end of K
2. XOR the 64 byte string created in (1) with ipad
3. append data stream M to the 64 byte string created in (2)
4. Apply H to the stream generated in (3)
5. XOR the 64 byte string created in (1) with opad
6. Append the H result from (4) to the 64 byte string resulting from (5)
7. Apply H to the output of (6) and output the result Thus:

$$HMAC[M]=H[(K \oplus opad)|H[(K \oplus ipad)|M]]$$

The recommended key length is at least n bits, although it should not be longer than 64 bytes (the length of the hashing block). A key longer than n bits does not add to the security of the function.

HMAC optionally allows truncation of the final output e.g. truncation to 128 bits from 160 bits.

The HMAC designers' Request for Comments [51] was issued in 1997, one year after the algorithm was first introduced. The designers claimed that the strongest known attack against HMAC is based on the frequency of collisions for the hash function H (see Section 5.5.10), and is totally impractical for minimally reasonable hash functions:

As an example, if we consider a hash function like MD5 where the output length is 128 bits, the attacker needs to acquire the correct message authentication tags computed (with the same secret key K) on about 264 known plaintexts. This would require the processing of at least 264 blocks under H, an impossible task in any realistic scenario (for a block length of 64 bytes this would take 250,000 years in a continuous 1 Gbps link, and without changing the secret key K all this time). This attack could become realistic only if serious flaws in the collision behavior of the function H are discovered (e.g. Collisions found after 230 messages). Such a discovery would determine the immediate replacement of function H (the effects of such a failure would be far more severe for the traditional uses of H in the context of digital signatures, public key certificates etc).

Of course, if a 160-bit hash function is used, then $2^{64}$ should be replaced with $2^{80}$.

This should be contrasted with a regular collision attack on cryptographic hash functions where no secret key is involved and $2^{64}$ off-line parallelizable operations suffice to find collisions.

More recently, HMAC protocols with replay prevention components [62] have been defined in order to prevent the capture and replay of any M, HMAC[M] combination within a given time period.

Finally, it should be noted that HMAC is in the public domain [50], and incurs no licensing fees. There are no known patents infringed by HMAC.

3.7 Random Numbers and Time Varying Messages

The use of a random number generator as a one-way function has already been examined. However, random number generator theory is very much intertwined with cryptography, security, and authentication.

There are a large number of issues concerned with defining good random number generators. Knuth, in [48] describes what makes a generator good (including statistical tests), and the general problems associated with constructing them. Moreau gives a high level survey of the current state of the field in [60].

One of the uses for random numbers is to ensure that messages vary over time. Consider a system where A encrypts commands and sends them to B. If the encryption algorithm produces the same output for a given input, an attacker could simply record the messages and play them back to fool B. There is no need for the attacker to crack the encryption mechanism other than to know which message to play to B (while pretending to be A). Consequently messages often include a random number and a time stamp to ensure that the message (and hence its encrypted counterpart) varies each time.

Random number generators are also often used to generate keys. Although Klapper has recently shown [45] that a family of secure feedback registers for the purposes of building key-streams does exist, he does not give any practical construction. It is therefore best to say at the moment that all generators are insecure for this purpose. For example, the Berlekamp-Massey algorithm [54], is a classic attack on an LFSR random number generator. If the LFSR is of length n, then only 2n bits of the sequence suffice to determine the LFSR, compromising the key generator.

If, however, the only role of the random number generator is to make sure that messages vary over time, the security of the generator and seed is not as important as it is for session key generation. If however, the random number seed generator is compromised, and an attacker is able to calculate future "random" numbers, it can leave some protocols open to attack. Any new protocol should be examined with respect to this situation.

The actual type of random number generator required will depend upon the implementation and the purposes for which the generator is used. Generators include Blum, Blum, and Shub [10], stream ciphers such as RC4 by Ron Rivest [71], hash functions such as SHA-1[28] and RIPEMD-160[66], and traditional generators such LFSRs (Linear Feedback Shift Registers) [48] and their more recent counterpart FCSRs (Feedback with Carry Shift Registers) [44].

3.8 Attacks

This section describes the various types of attacks that can be undertaken to break an authentication cryptosystem. The attacks are grouped into physical and logical attacks.

Logical attacks work on the protocols or algorithms rather than their physical implementation, and attempt to do one of three things:

Bypass the authentication process altogether

Obtain the secret key by force or deduction, so that any question can be answered Find enough about the nature of the authenticating questions and answers in order to, without the key, give the right answer to each question.

The attack styles and the forms they take are detailed below.

Regardless of the algorithms and protocol used by a security chip, the circuitry of the authentication part of the chip can come under physical attack. Physical attacks come in four main ways, although the form of the attack can vary:

Bypassing the security chip altogether

Physical examination of the chip while in operation (destructive and non-destructive)

Physical decomposition of chip

Physical alteration of chip

The attack styles and the forms they take are detailed below.

This section does not suggest solutions to these attacks. It merely describes each attack type. The examination is restricted to the context of an authentication chip (as opposed to some other kind of system, such as Internet authentication) attached to some System.

3.8.1 Logical Attacks

These attacks are those which do not depend on the physical implementation of the cryptosystem. They work against the protocols and the security of the algorithms and random number generators.

3.8.1.1 Ciphertext Only Attack

This is where an attacker has one or more encrypted messages, all encrypted using the same algorithm. The aim of the attacker is to obtain the plaintext messages from the encrypted messages. Ideally, the key can be recovered so that all messages in the future can also be recovered.

3.8.1.2 Known Plaintext Attack

This is where an attacker has both the plaintext and the encrypted form of the plaintext. In the case of an authentication chip, a known-plaintext attack is one where the attacker can see the data flow between the system and the authentication chip. The inputs and outputs are observed (not chosen by the attacker), and can be analyzed for weaknesses (such as birthday attacks or by a search for differentially interesting input/output pairs).

A known plaintext attack can be carried out by connecting a logic analyzer to the connection between the system and the authentication chip.

3.8.1.3 Chosen Plaintext Attacks

A chosen plaintext attack describes one where a cryptanalyst has the ability to send any chosen message to the cryptosystem, and observe the response. If the cryptanalyst knows the algorithm, there may be a relationship between inputs and outputs that can be exploited by feeding a specific output to the input of another function.

The chosen plaintext attack is much stronger than the known plaintext attack since the attacker can choose the messages rather than simply observe the data flow.

On a system using an embedded authentication chip, it is generally very difficult to prevent chosen plaintext attacks since the cryptanalyst can logically pretend he/she is the system, and thus send any chosen bit-pattern streams to the authentication chip.

3.8.1.4 Adaptive Chosen Plaintext Attacks

This type of attack is similar to the chosen plaintext attacks except that the attacker has the added ability to modify subsequent chosen plaintexts based upon the results of previous experiments. This is certainly the case with any system/authentication chip scenario described for consumables such as photocopiers and toner cartridges, especially since both systems and consumables are made available to the public.

3.8.1.5 Brute Force Attack

A guaranteed way to break any key-based cryptosystem algorithm is simply to try every key. Eventually the right one will be found. This is known as a brute force attack. However, the more key possibilities there are, the more keys must be tried, and hence the longer it takes (on average) to find the right one. If there are N keys, it will take a maximum of N tries. If the key is N bits long, it will take a maximum of $2^N$ tries, with a 50% chance of finding the key after only half the attempts ($2^{N-1}$). The longer N becomes, the longer it will take to find the key, and hence the more secure the key is. Of course, an attack may guess the key on the first try, but this is more unlikely the longer the key is.

Consider a key length of 56 bits. In the worst case, all $2^{56}$ tests ($7.2 \times 10^{16}$ tests) must be made to find the key. In 1977, Diffie and Hellman described a specialized machine for cracking DES, consisting of one million processors, each capable of running one million tests per second [17]. Such a machine would take 20 hours to break any DES code.

Consider a key length of 128 bits. In the worst case, all $2^{128}$ tests ($3.4 \times 10^{38}$ tests) must be made to find the key. This would take ten billion years on an array of a trillion processors each running 1 billion tests per second.

With a long enough key length, a brute force attack takes too long to be worth the attacker's efforts.

3.8.1.6 Guessing Attack

This type of attack is where an attacker attempts to simply "guess" the key. As an attack it is identical to the brute force attack (see Section 3.8.1.5) where the odds of success depend on the length of the key.

3.8.1.7 Quantum Computer Attack

To break an n-bit key, a quantum computer [83] (NMR, Optical, or Caged Atom) containing n qubits embedded in an appropriate algorithm must be built. The quantum computer effectively exists in $2^n$ simultaneous coherent states. The trick is to extract the right coherent state without causing any decoherence. To date this has been achieved with a 2 qubit system (which exists in 4 coherent states). It is thought possible to extend this to 6 qubits (with 64 simultaneous coherent states) within a few years.

Unfortunately, every additional qubit halves the relative strength of the signal representing the key. This rapidly becomes a serious impediment to key retrieval, especially with the long keys used in cryptographically secure systems.

As a result, attacks on a cryptographically secure key (e.g. 160 bits) using a Quantum Computer are likely not to be feasible and it is extremely unlikely that quantum computers will have achieved more than 50 or so qubits within the commercial lifetime of the authentication chips. Even using a 50 qubit quantum computer, $2^{110}$ tests are required to crack a 160 bit key.

3.8.1.8 Purposeful Error Attack

With certain algorithms, attackers can gather valuable information from the results of a bad input. This can range from the error message text to the time taken for the error to be generated.

A simple example is that of a userid/password scheme. If the error message usually says "Bad userid", then when an attacker gets a message saying "Bad password" instead, then they know that the userid is correct. If the message always says "Bad userid/password" then much less information is given to the attacker. A more complex example is that of the recent published method of cracking encryption codes from secure web sites [41]. The attack involves sending particular messages to a server and observing the error message responses. The responses give enough information to learn the keys—even the lack of a response gives some information.

An example of algorithmic time can be seen with an algorithm that returns an error as soon as an erroneous bit is detected in the input message. Depending on hardware implementation, it may be a simple method for the attacker to time the response and alter each bit one by one depending on the time taken for the error response, and thus obtain the key. Certainly in a chip implementation the time taken can be observed with far greater accuracy than over the Internet.

3.8.1.9 Birthday Attack

This attack is named after the famous "birthday paradox" (which is not actually a paradox at all). The odds of one person sharing a birthday with another, is 1 in 365 (not counting leap years). Therefore there must be 183 people in a room for the odds to be more than 50% that one of them shares your birthday. However, there only needs to be 23 people in a room for there to be more than a 50% chance that any two share a birthday, as shown in the following relation:

$$Prob = 1 - nPr/n^r = 1 - 365P23/365^{23} \approx 0.507$$

Birthday attacks are common attacks against hashing algorithms, especially those algorithms that combine hashing with digital signatures.

If a message has been generated and already signed, an attacker must search for a collision message that hashes to the same value (analogous to finding one person who shares your birthday). However, if the attacker can generate the message, the birthday attack comes into play. The attacker searches for two messages that share the same hash value (analogous to any two people sharing a birthday), only one message is acceptable to the person signing it, and the other is beneficial for the attacker. Once the person has signed the original message the attacker simply claims now that the person signed the alternative message—mathematically there is no way to tell which message was the original, since they both hash to the same value.

Assuming a brute force attack is the only way to determine a match, the weakening of an n-bit key by the birthday attack is $2^{n/2}$. A key length of 128 bits that is susceptible to the birthday attack has an effective length of only 64 bits.

3.8.1.10 Chaining Attack

These are attacks made against the chaining nature of hash functions. They focus on the compression function of a hash function. The idea is based on the fact that a hash function generally takes arbitrary length input and produces a constant length output by processing the input n bits at a time. The output from one block is used as the chaining variable set into the next block. Rather than finding a collision against an entire input, the idea is that given an input chaining variable set, to find a substitute block that will result in the same output chaining variables as the proper message.

The number of choices for a particular block is based on the length of the block. If the chaining variable is c bits, the hashing function behaves like a random mapping, and the block length is b bits, the number of such b-bit blocks is approximately $2^b/2^c$. The challenge for finding a substitution block is that such blocks are a sparse subset of all possible blocks.

For SHA-1, the number of 512 bit blocks is approximately $2^{512}/2^{160}$, or $2^{352}$. The chance of finding a block by brute force search is about 1 in $2^{160}$.

3.8.1.11 Substitution with a Complete Lookup Table

If the number of potential messages sent to the chip is small, then there is no need for a clone manufacturer to crack the key. Instead, the clone manufacturer could incorporate a ROM in their chip that had a record of all of the responses from a genuine chip to the codes sent by the system. The larger the key, and the larger the response, the more space is required for such a lookup table.

3.8.1.12 Substitution with a Sparse Lookup Table

If the messages sent to the chip are somehow predictable, rather than effectively random, then the clone manufacturer need not provide a complete lookup table. For example:

If the message is simply a serial number, the clone manufacturer need simply provide a lookup table that contains values for past and predicted future serial numbers. There are unlikely to be more than $10^9$ of these.

If the test code is simply the date, then the clone manufacturer can produce a lookup table using the date as the address.

If the test code is a pseudo-random number using either the serial number or the date as a seed, then the clone manufacturer just needs to crack the pseudo-random number generator in the system. This is probably not difficult, as they have access to the object code of the system. The clone manufacturer would then produce a content addressable memory (or other sparse array lookup) using these codes to access stored authentication codes.

3.8.1.13 Differential Cryptanalysis

Differential cryptanalysis describes an attack where pairs of input streams are generated with known differences, and the differences in the encoded streams are analyzed.

Existing differential attacks are heavily dependent on the structure of S boxes, as used in DES and other similar algorithms. Although other algorithms such as HMAC-SHA1 have no S boxes, an attacker can undertake a differential-like attack by undertaking statistical analysis of:

Minimal-difference inputs, and their corresponding outputs

Minimal-difference outputs, and their corresponding inputs.

Most algorithms were strengthened against differential cryptanalysis once the process was described. This is covered in the specific sections devoted to each cryptographic algorithm. However some recent algorithms developed in secret have been broken because the developers had not considered certain styles of differential attacks [91] and did not subject their algorithms to public scrutiny.

3.8.1.14 Message Substitution Attacks

In certain protocols, a man-in-the-middle can substitute part or all of a message. This is where a real authentication chip is plugged into a reusable clone chip within the consumable. The clone chip intercepts all messages between the system and the authentication chip, and can perform a number of substitution attacks.

Consider a message containing a header followed by content. An attacker may not be able to generate a valid header, but may be able to substitute their own content, especially if the valid response is something along the lines of "Yes, I received your message". Even if the return message is "Yes, I received the following message . . . ", the attacker may be able to substitute the original message before sending the acknowledgment back to the original sender.

Message Authentication Codes were developed to combat message substitution attacks.

3.8.1.15 Reverse Engineering the Key Generator

If a pseudo-random number generator is used to generate keys, there is the potential for a clone manufacture to obtain the generator program or to deduce the random seed used. This was the way in which the security layer of the Netscape browser program was initially broken [33].

3.8.1.16 Bypassing the Authentication Process

It may be that there are problems in the authentication protocols that can allow a bypass of the authentication process altogether. With these kinds of attacks the key is completely irrelevant, and the attacker has no need to recover it or deduce it.

Consider an example of a system that authenticates at power-up, but does not authenticate at any other time. A reusable consumable with a clone authentication chip may make use of a real authentication chip. The clone authentication chip uses the real chip for the authentication call, and then simulates the real authentication chip's state data after that.

Another example of bypassing authentication is if the system authenticates only after the consumable has been used. A clone authentication chip can accomplish a simple authentication bypass by simulating a loss of connection after the use of the consumable but before the authentication protocol has completed (or even started).

One infamous attack known as the "Kentucky Fried Chip" hack [2] involved replacing a microcontroller chip for a satellite TV system. When a subscriber stopped paying the subscription fee, the system would send out a "disable" message. However the new micro-controller would simply detect this message and not pass it on to the consumer's satellite TV system.

3.8.1.17 Garrote/Bribe Attack

If people know the key, there is the possibility that they could tell someone else. The telling may be due to coercion (bribe, garrote etc.), revenge (e.g. a disgruntled employee), or simply for principle. These attacks are usually cheaper and easier than other efforts at deducing the key. As an example, a number of people claiming to be involved with the development of the Divx standard have recently (May/June 1998) been making noises on a variety of DVD newsgroups to the effect they would like to help develop Divx specific cracking devices—out of principle.

3.8.2 Physical Attacks

The following attacks assume implementation of an authentication mechanism in a silicon chip that the attacker has physical access to. The first attack, Reading ROM, describes an attack when keys are stored in ROM, while the remaining attacks assume that a secret key is stored in Flash memory.

3.8.2.1 Reading ROM

If a key is stored in ROM it can be read directly. A ROM can thus be safely used to hold a public key (for use in asymmetric cryptography), but not to hold a private key. In symmetric cryptography, a ROM is completely insecure. Using a copyright text (such as a haiku) as the key is not sufficient, because we are assuming that the cloning of the chip is occurring in a country where intellectual property is not respected.

3.8.2.2 Reverse Engineering of Chip

Reverse engineering of the chip is where an attacker opens the chip and analyzes the circuitry. Once the circuitry has been analyzed the inner workings of the chip's algorithm can be recovered.

Lucent Technologies have developed an active method [4] known as TOBIC (Two photon OBIC, where OBIC stands for Optical Beam Induced Current), to image circuits. Developed primarily for static RAM analysis, the process involves removing any back materials, polishing the back surface to a mirror finish, and then focusing light on the surface. The excitation wavelength is specifically chosen not to induce a current in the IC.

A Kerckhoffs in the nineteenth century made a fundamental assumption about cryptanalysis: if the algorithm's inner workings are the sole secret of the scheme, the scheme is as good as broken [39]. He stipulated that the secrecy must reside entirely in the key. As a result, the best way to protect against reverse engineering of the chip is to make the inner workings irrelevant.

3.8.2.3 Usurping the Authentication Process

It must be assumed that any clone manufacturer has access to both the system and consumable designs.

If the same channel is used for communication between the system and a trusted system authentication chip, and a non-trusted consumable authentication chip, it may be possible for the non-trusted chip to interrogate a trusted authentication chip in order to obtain the "correct answer". If this is so, a clone manufacturer would not have to determine the key. They would only have to trick the system into using the responses from the system authentication chip.

The alternative method of usurping the authentication process follows the same method as the logical attack described in Section 3.8.1.16, involving simulated loss of contact with the system whenever authentication processes take place, simulating power-down etc.

3.8.2.4 Modification of System

This kind of attack is where the system itself is modified to accept clone consumables. The attack may be a change of system ROM, a rewiring of the consumable, or, taken to the extreme case, a completely clone system.

Note that this kind of attack requires each individual system to be modified, and would most likely require the owner's consent. There would usually have to be a clear advantage for the consumer to undertake such a modification, since it would typically void warranty and would most likely be costly. An example of such a modification with a clear advantage to the consumer is a software patch to change fixed-region DVD players into region-free DVD players (although it should be noted that this is not to use clone consumables, but rather originals from the same companies simply targeted for sale in other countries).

3.8.2.5 Direct Viewing of Chip Operation by Conventional Probing

If chip operation could be directly viewed using an STM (Scanning Tunnelling Microscope) or an electron beam, the keys could be recorded as they are read from the internal non-volatile memory and loaded into work registers.

These forms of conventional probing require direct access to the top or front sides of the IC while it is powered.

3.8.2.6 Direct Viewing of the Non-volatile Memory

If the chip were sliced so that the floating gates of the Flash memory were exposed, without discharging them, then the key could probably be viewed directly using an STM or SKM (Scanning Kelvin Microscope).

However, slicing the chip to this level without discharging the gates is probably impossible. Using wet etching, plasma etching, ion milling (focused ion beam etching), or chemical mechanical polishing will almost certainly discharge the small charges present on the floating gates.

3.8.2.7 Viewing the Light Bursts Caused by State Changes

Whenever a gate changes state, a small amount of infrared energy is emitted. Since silicon is transparent to infrared, these changes can be observed by looking at the circuitry from the underside of a chip. While the emission process is weak, it is bright enough to be detected by highly sensitive equipment developed for use in astronomy. The technique [89], developed by IBM, is called PICA (Picosecond Imaging Circuit Analyzer). If the state of a register is known at time t, then watching that register change over time will reveal the exact value at time t+n, and if the data is part of the key, then that part is compromised.

3.8.2.8 Viewing the Keys Using an SEPM

A non-invasive testing device, known as a Scanning Electric Potential Microscope (SEPM), allows the direct viewing of charges within a chip [37]. The SEPM has a tungsten probe that is placed a few micrometers above the chip, with the probe and circuit forming a capacitor. Any AC signal flowing beneath the probe causes displacement current to flow through this capacitor. Since the value of the current change depends on the amplitude and phase of the AC signal, the signal can be imaged. If the signal is part of the key, then that part is compromised.

3.8.2.9 Monitoring EMI

Whenever electronic circuitry operates, faint electromagnetic signals are given off. Relatively inexpensive equipment can monitor these signals and could give enough information to allow an attacker to deduce the keys.

3.8.2.10 Viewing $I_{dd}$ Fluctuations

Even if keys cannot be viewed, there is a fluctuation in current whenever registers change state. If there is a high enough signal to noise ratio, an attacker can monitor the difference in $I_{dd}$ that may occur when programming over either a high or a low bit. The change in $I_{dd}$ can reveal information about the key. Attacks such as these have already been used to break smart cards [46].

3.8.2.11 Differential Fault Analysis

This attack assumes introduction of a bit error by ionization, microwave radiation, or environmental stress. In most cases such an error is more likely to adversely affect the chip (e.g. cause the program code to crash) rather than cause beneficial changes which would reveal the key. Targeted faults such as ROM overwrite, gate destruction etc. are far more likely to produce useful results.

3.8.2.12 Clock Glitch Attacks

Chips are typically designed to properly operate within a certain clock speed range. Some attackers attempt to introduce faults in logic by running the chip at extremely high clock speeds or introduce a clock glitch at a particular time for a particular duration [1]. The idea is to create race conditions where the circuitry does not function properly. An example could be an AND gate that (because of race conditions) gates through Input1 all the time instead of the AND of $Input_1$ and $Input_2$.

If an attacker knows the internal structure of the chip, they can attempt to introduce race conditions at the correct moment in the algorithm execution, thereby revealing information about the key (or in the worst case, the key itself).

3.8.2.13 Power Supply Attacks

Instead of creating a glitch in the clock signal, attackers can also produce glitches in the power supply where the power is increased or decreased to be outside the working operating voltage range. The net effect is the same as a clock glitch—introduction of error in the execution of a particular instruction. The idea is to stop the CPU from XORing the key, or from shifting the data one bit-position etc. Specific instructions are targeted so that information about the key is revealed.

3.8.2.14 Overwriting ROM

Single bits in a ROM can be overwritten using a laser cutter microscope [1], to either 1 or 0 depending on the sense of the logic. If the ROM contains instructions, it may be a simple matter for an attacker to change a conditional jump to a non-conditional jump, or perhaps change the destination of a register transfer. If the target instruction is chosen carefully, it may result in the key being revealed.

3.8.2.15 Modifying EEPROM/Flash

These attacks fall into two categories:
- those similar to the ROM attacks except that the laser cutter microscope technique can be used to both set and reset individual bits. This gives much greater scope in terms of modification of algorithms.
- Electron beam programming of floating gates. As described in [87] and [32], a focused electron beam can change a gate by depositing electrons onto it. Damage to the rest of the circuit can be avoided, as described in [31]. This attack is potentially able to work against multi-level flash memory.

3.8.2.16 Gate Destruction

Anderson and Kuhn described the rump session of the 1997 workshop on Fast Software Encryption [1], where Biham and Shamir presented an attack on DES. The attack was to use a laser cutter to destroy an individual gate in the hardware implementation of a known block cipher (DES). The net effect of the attack was to force a particular bit of a register to be "stuck". Biham and Shamir described the effect of forcing a particular register to be affected in this way—the least significant bit of the output from the round function is set to 0. Comparing the 6 least significant bits of the left half and the right half can recover several bits of the key. Damaging a number of chips in this way can reveal enough information about the key to make complete key recovery easy.

An encryption chip modified in this way will have the property that encryption and decryption will no longer be inverses.

3.8.2.17 Overwrite Attacks

Instead of trying to read the Flash memory, an attacker may simply set a single bit by use of a laser cutter microscope. Although the attacker doesn't know the previous value, they know the new value. If the chip still works, the bit's original state must be the same as the new state. If the chip doesn't work any longer, the bit's original state must be the logical NOT of the current state. An attacker can perform this attack on each bit of the key and obtain the n-bit key using at most n chips (if the new bit matched the old bit, a new chip is not required for determining the next bit).

3.8.2.18 Test Circuitry Attack

Most chips contain test circuitry specifically designed to check for manufacturing defects. This includes BIST (Built In Self Test) and scan paths. Quite often the scan paths and test circuitry includes access and readout mechanisms for all the embedded latches. In some cases the test circuitry could potentially be used to give information about the contents of particular registers.

Test circuitry is often disabled once the chip has passed all manufacturing tests, in some cases by blowing a specific connection within the chip. A determined attacker, however, can reconnect the test circuitry and hence enable it.

3.8.2.19 Memory Remanence

Values remain in RAM long after the power has been removed [35], although they do not remain long enough to be considered non-volatile. An attacker can remove power once sensitive information has been moved into RAM (for example working registers), and then attempt to read the value from RAM. This attack is most useful against security systems that have regular RAM chips. A classic example is cited by [1], where a security system was designed with an automatic power-shut-off that is triggered when the computer case is opened. The attacker was able to simply open the case, remove the RAM chips, and retrieve the key because the values persisted.

3.8.2.20 Chip Theft Attack

If there are a number of stages in the lifetime of an authentication chip, each of these stages must be examined in terms of ramifications for security should chips be stolen. For example, if information is programmed into the chip in stages, theft of a chip between stages may allow an attacker to have access to key information or reduced efforts for attack. Similarly, if a chip is stolen directly after manufacture but before programming, does it give an attacker any logical or physical advantage?.

3.8.2.21 Trojan Horse Attack

At some stage the authentication chips must be programmed with a secret key. Suppose an attacker builds a clone authentication chip and adds it to the pile of chips to be programmed. The attacker has especially built the clone chip so that it looks and behaves just like a real authentication chip, but will give the key out to the attacker when a special attacker-known command is issued to the chip. Of course the attacker must have access to the chip after the programming has taken place, as well as physical access to add the Trojan horse authentication chip to the genuine chips.

SUMMARY OF THE INVENTION

This invention is a consumable authentication protocol for validating the existence of an untrusted authentication chip. The protocol includes the steps of:

Generating a secret random number and calculating a signature for the random number using a signature function, in a trusted authentication chip;

Encrypting the random number and the signature using a symmetric encryption function using a first secret key, in the trusted authentication chip;

Passing the encrypted random number and signature from the trusted authentication chip to an untrusted authentication chip;

Decrypting the encrypted random number and signature with a symmetric decryption function using the first secret key, in the untrusted authentication chip;

Calculating a signature for the decrypted random number using the signature function in the untrusted authentication chip;

Comparing the signature calculated in the untrusted authentication chip with the signature decrypted;

In the event that the two signatures match, encrypting the decrypted random number together with a data message read from the untrusted chip by the symmetric encryption function using a second secret key and returning it together with the data message to the trusted authentication chip;

Encrypting the random number together with the data message by the symmetric encryption function using the second secret key, in the trusted authentication chip;

Comparing the two versions of the random number encrypted together with the data message using the second key, in the trusted authentication chip;

In the event that the two versions match, considering the untrusted authentication chip and the data message to be valid.

Otherwise, considering the untrusted authentication chip and the data message to be invalid.

When the untrusted chip is associated with a consumable item, validation of the chip can be used to validate the consumable item. Data messages read from the untrusted chip may be related to the lifespan of the consumable and may therefore ensure the chip lasts only as long as the consumable.

The two secret keys are held in both the trusted and untrusted chips and must be kept secret.

The random number may be generated by a random function only in the trusted chip, it should be secret and seeded with a different initial value each time. A new random number may be generated after each successful validation.

The data message may be a memory vector of the authentication chip. Part of this space should be different for each chip. It does not have to be a random number, and parts of it may be constant (read only) for each consumable, or decrement only so that it can be completely downcounted only once for each consumable.

The encryption function may be held in both chips, whereas the decryption function may be held only in the untrusted chip.

The signature function may be held in both chips to generate digital signatures. The digital signature must be long enough to counter the chances of someone generating a random signature. 128 bits is a satisfactory size if S is symmetric encryption, while 160 bits is a satisfactory size if S is HMAC-SHA1.

A test function may be held only in the trusted chip. It may return a value, such as 1, and advance the random number if the untrusted chip is valid; otherwise it may return a value, such as 0, indicating invalidity. The time taken to return a value indicating invalidity must be the same for all bad inputs. The time taken to return the value indicating validity must be the same for all good inputs.

A read function in the untrusted chip may decrypt the random number and signature and then calculate its own signature for the decrypted random number. It may return the data message and a reencrypted random number in combination with the data message if the locally generated signature is the same as the decrypted signature. Otherwise it may return a value indicating failure, such as 0. The time taken to return the value indicating failure must be the same for all bad inputs. The time taken to make a return for a good input must be the same for all good inputs.

In addition to validating that an authentication chip is present, the protocol is also able to validate writes and reads of the authentication chip's memory space.

The authentication chip's data storage integrity is assumed to be secure—certain parts of memory may be Read Only, others Read/Write, while others are Decrement Only.

The protocol passes the chosen random number without the intermediate system knowing its value. This is done by encrypting both the random number and its digital signature.

The protocol has the following advantages:

The secret keys are not revealed during the authentication process. The time varying random number is encrypted, so that it is not revealed during the authentication process.

An attacker cannot build a table of values of the input and output of the encryption process. An attacker cannot call Read without a valid random numbers and signature pair encrypted with the first key. The second key is therefore resistant to a chosen text attack. The random number only advances with a valid call to Test, so the first key is also not susceptible to a chosen text attack.

The system is easy to design, especially in low cost systems such as ink-jet printers, as no encryption or decryption is required by the system itself.

There are a number of well-documented and cryptanalyzed symmetric algorithms to chose from for implementation, including patent-free and license-free solutions.

A wide range of signature functions exists, from message authentication codes to random number sequences to key-based symmetric cryptography.

Signature functions and symmetric encryption algorithms require fewer gates and are easier to verify than asymmetric algorithms.

Secure key size for symmetric encryption does not have to be as large as for an asymmetric (public key) algorithm. A minimum of 128 bits can provide appropriate security for symmetric encryption.

In another aspect the invention is a consumable authentication system for validating the existence of an untrusted authentication chip, and for ensuring that the authentication chip lasts only as long as the consumable. The system includes a trusted authentication chip and an untrusted authentication chip. The trusted authentication chip includes a random number generator, a symmetric encryption function and two secret keys for the function, a signature function and a test function. The untrusted authentication chip includes symmetric encryption and decryption functions and two secret keys for these functions, a signature function and a read function. The read function operates to test data from the trusted chip, including a random number and its signature, encrypted using the first key, by comparing the decrypted signature with a signature calculated from the decrypted random number. In the event that the two signatures match, the read function operates to return a data message and an encrypted version of the data message in combination with the random number, encrypted using the second key. The test function operates to encrypt the random number together with the data message by the symmetric encryption function using the second secret key, compares the two versions of the random number encrypted together with the data message, using the second key, and in the event that the two versions match, considers the untrusted authentication chip and the data message to be valid; otherwise, it considers the untrusted authentication chip and the data message to be invalid.

BEST MODES OF THE INVENTION

4 Requirements

Figure 1:
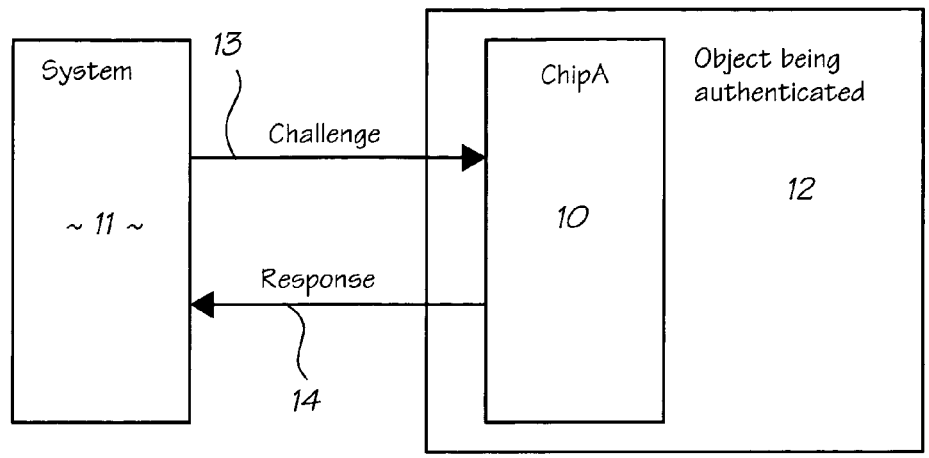
FIG. 1 is a data flow diagram for single chip authentication.

Existing solutions to the problem of authenticating consumables have typically relied on patents covering physical packaging. However this does not stop home refill operations or clone manufacture in countries with weak industrial property protection. Consequently a much higher level of protection is required.

The authentication mechanism is therefore built into an authentication chip that is embedded in the consumable and allows a system to authenticate that consumable securely and easily. Limiting ourselves to the system authenticating consumables (we don't consider the consumable authenticating the system), two levels of protection can be considered:

Presence Only Authentication:

This is where only the presence of an authentication chip is tested. The authentication chip can be removed and used in other consumables as long as be used indefinitely.

Consumable Lifetime Authentication:

This is where not only is the presence of the authentication chip tested for, but also the authentication chip must only last the lifetime of the consumable. For the chip to be re-used it must be completely erased and reprogrammed.

The two levels of protection address different requirements. We are primarily concerned with Consumable Lifetime authentication in order to prevent cloned versions of high volume consumables. In this case, each chip should hold secure state information about the consumable being authenticated. It should be noted that a Consumable Lifetime authentication chip could be used in any situation requiring a Presence Only authentication chip.

Requirements for authentication, data storage integrity and manufacture are considered separately. The following sections summarize requirements of each.

4.1 Authentication

The authentication requirements for both Presence Only and Consumable Lifetime authentication are restricted to the case of a system authenticating a consumable. We do not consider bi-directional authentication where the consumable also authenticates the system. For example, it is not necessary for a valid toner cartridge to ensure it is being used in a valid photocopier.

For Presence Only authentication, we must be assured that an authentication chip is physically present. For Consumable Lifetime authentication we also need to be assured that state data actually came from the authentication chip, and that it has not been altered en route. These issues cannot be separated—data that has been altered has a new source, and if the source cannot be determined, the question of alteration cannot be settled.

It is not enough to provide an authentication method that is secret, relying on a home-brew security method that has not been scrutinized by security experts. The primary requirement therefore is to provide authentication by means that have withstood the scrutiny of experts.

The authentication scheme used by the authentication chip should be resistant to defeat by logical means. Logical types of attack are extensive, and attempt to do one of three things:

Bypass the authentication process altogether

Obtain the secret key by force or deduction, so that any question can be answered Find enough about the nature of the authenticating questions and answers in order to, without the key, give the right answer to each question.

The logical attack styles and the forms they take are detailed in Section 3.8.1.

The algorithm should have a flat keyspace, allowing any random bit string of the required length to be a possible key. There should be no weak keys.

The examination of a solution to the requirement of authentication is examined in Section 5.

4.2 Data Storage Integrity

Although authentication protocols take care of ensuring data integrity in communicated messages, data storage integrity is also required. Two kinds of data must be stored within the authentication chip:

Authentication data, such as secret keys

Consumable state data, such as serial numbers, and media remaining etc.

The access requirements of these two data types differ greatly. The authentication chip therefore requires a storage/access control mechanism that allows for the integrity requirements of each type.

The examination of a solution to the requirement of data storage integrity is examined in Section 7, although the requirements of the two kinds of data are examined briefly here.

4.2.1 Authentication Data

Authentication data must remain confidential. It needs to be stored in the chip during a manufacturing/programming stage of the chip's life, but from then on must not be permitted to leave the chip. It must be resistant to being read from non-volatile memory. The authentication scheme is responsible for ensuring the key cannot be obtained by deduction, and the manufacturing process is responsible for ensuring that the key cannot be obtained by physical means.

The size of the authentication data memory area must be large enough to hold the necessary keys and secret information as mandated by the authentication protocols.

4.2.2 Consumable State Data

Consumable state data can be divided into the following types. Depending on the application, there will be different numbers of each of these types of data items.
- Read Only
- ReadWrite
- Decrement Only Read Only data needs to be stored in the chip during a manufacturing/programming stage of the chip's life, but from then on should not be allowed to change. Examples of Read Only data items are consumable batch numbers and serial numbers.

ReadWrite data is changeable state information, for example, the last time the particular consumable was used. Read-Write data items can be read and written an unlimited number of times during the lifetime of the consumable. They can be used to store any state information about the consumable. The only requirement for this data is that it needs to be kept in non-volatile memory. Since an attacker can obtain access to a system (which can write to Read-Write data), any attacker can potentially change data fields of this type. This data type should not be used for secret information, and must be considered insecure.

Decrement Only data is used to count down the availability of consumable resources.

A photocopier's toner cartridge, for example, may store the amount of toner remaining as a Decrement Only data item. An ink cartridge for a color printer may store the amount of each ink color as a Decrement Only data item, requiring three (one for each of Cyan, Magenta, and Yellow), or even as many as five or six Decrement Only data items. The requirement for this kind of data item is that once programmed with an initial value at the manufacturing/programming stage, it can only reduce in value. Once it reaches the minimum value, it cannot decrement any further. The Decrement Only data item is only required by Consumable Lifetime authentication.

Note that the size of the consumable state data storage required is only for that information required to be authenticated. Information which would be of no use to an attacker, such as ink color-curve characteristics or ink viscosity do not have to be stored in the secure state data memory area of the authentication chip.

4.3 Manufacture

The authentication chip must have a low manufacturing cost in order to be included as the authentication mechanism for low cost consumables.

The authentication chip should use a standard manufacturing process, such as Flash. This is necessary to:
- Allow a great range of manufacturing location options
- Use well-defined and well-behaved technology
- Reduce cost Regardless of the authentication scheme used, the circuitry of the authentication part of the chip must be resistant to physical attack. Physical attack comes in four main ways, although the form of the attack can vary:
- Bypassing the authentication chip altogether
- Physical examination of chip while in operation (destructive and non-destructive)
- Physical decomposition of chip
- Physical alteration of chip The physical attack styles and the forms they take are detailed in Section 3.8.2.

Ideally, the chip should be exportable from the USA, so it should not be possible to use an authentication chip as a secure encryption device. This is low priority requirement since there are many companies in other countries able to manufacture the authentication chips. In any case, the export restrictions from the USA may change.

The examination of a solution to the requirement of manufacture is examined in Section 10.

5 Authentication

Existing solutions to the problem of authenticating consumables have typically relied on physical patents on packaging. However this does not stop home refill operations or clone manufacture in countries with weak industrial property protection. Consequently a much higher level of protection is required.

It is not enough to provide an authentication method that is secret, relying on a home-brew security method that has not been scrutinized by security experts. Security systems such as Netscape's original proprietary system and the GSM Fraud Prevention Network used by cellular phones are examples where design secrecy caused the vulnerability of the security [33][91]. Both security systems were broken by conventional means that would have been detected if the companies had followed an open design process. The solution is to provide authentication by means that have withstood the scrutiny of experts.

In this part, we examine a number of protocols that can be used for consumables authentication, together with a high level look at the advantages and disadvantages of each particular scheme. We only use security methods that are publicly described, using known behaviors in this new way. Readers should be familiar with the concepts and terms described in Section 3. We avoid the Zero Knowledge Proof protocol.

For all protocols, the security of the scheme relies on a secret key, not a secret algorithm. The best way to protect against reverse engineering of any authentication chip is to make the algorithmic inner workings irrelevant (the algorithm of the inner workings must still be must be valid, but not the actual secret).

All the protocols rely on a time-variant challenge (i.e. the challenge is different each time), where the response depends on the challenge and the secret. The challenge involves a random number so that any observer will not be able to gather useful information about a subsequent identification.

Three protocols are presented for each of Presence Only and Consumable Lifetime authentication. Although the protocols differ in the number of authentication chips required for the authentication process, in all cases the system authenticates the consumable. Certain protocols will work with either one or two chips, while other protocols only work with two chips. Whether one chip or two authentication chips are used the system is still responsible for making the authentication decision.

5.0.1 Single Chip Authentication

When only one authentication chip is used for the authentication protocol, a single chip 10 (referred to as ChipA) is responsible for proving to a system 11 (referred to as System) that it is authentic. At the start of the protocol, System 11 is unsure of ChipA's authenticity. System 11 undertakes a challenge-response protocol with ChipA 10, and thus determines ChipA's authenticity. In all protocols the authenticity of the consumable 12 is directly based on the authenticity of the chip associated with it, i.e. if ChipA 10 is considered authentic, then the consumable 12, in which chip 10 is placed, is considered authentic. The data flow can be seen in FIG. 1, and involves a challenge 13 issued from the system, and a response 14 returned by the chip 10.

In single chip authentication protocols, System 11 can be software, hardware or a combination of both. It is important to note that System 11 is considered insecure—it can be easily reverse engineered by an attacker, either by examining the ROM or by examining circuitry. System is not specially engineered to be secure in itself.

5.0.2 Double Chip Authentication

In other protocols, two authentication chips are required. A single chip 20 (referred to as ChipA) is responsible for proving to a system 21 (referred to as System) that it is authentic. ChipA 20 is associated with the consumable 22. As part of the authentication process, System 21 makes use of a trusted authentication chip 23 (referred to as ChipT).

Figure 2:
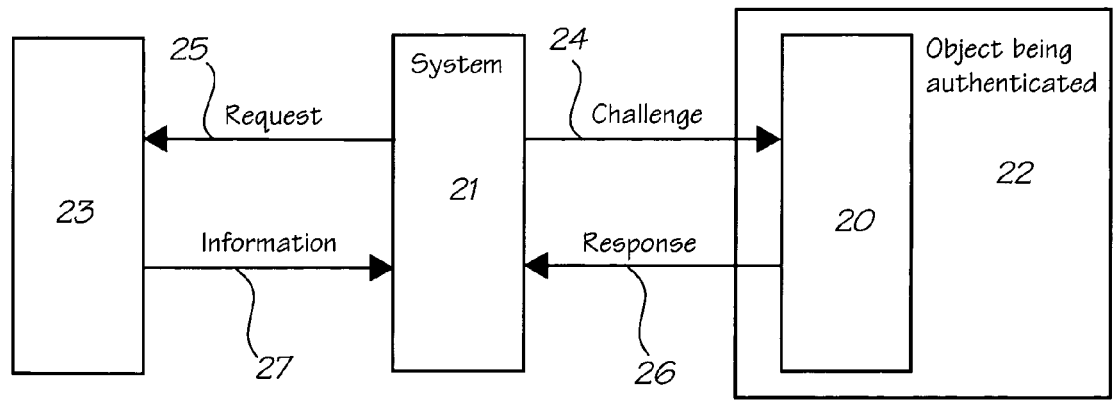
FIG. 2 is a data flow diagram for double chip authentication.

In double chip authentication protocols, System 21 can be software, hardware or a combination of both. However ChipT 23 must be a physical authentication chip. In some protocols ChipT 23 and ChipA 20 have the same internal structure, while in others ChipT 23 and ChipA 20 have different internal structures. The data flow can be seen in FIG. 2, and can be seen to involve a challenge 24 from system 21 to chipA 20 and a request 25 from system 21 to chipT 23, and a response 26 from chipA 20 to system 21 and information 27 from chipT 23 to system 21.

5.1 Presence Only Authentication (Insecure State Data)

For this level of consumable authentication we are only concerned about validating the presence of the authentication chip. Although the authentication chip can contain state information, the transmission of that state information would not be considered secure.

Three protocols are presented. Protocols P1 and P3 require two authentication chips, while Protocol P2 can be implemented using either one or two authentication chips.

5.1.1 Protocol P1

Protocol P1 is a double chip protocol (two authentication chips are required). Each authentication chip contains the following values:

K Key for $F_K[X]$. Must be secret.
R Current random number. Does not have to be secret, but must be seeded with a different initial value for each chip instance. Changes with each invocation of the Random function.

Each authentication chip contains the following logical functions:

Random[ ] Returns R, and advances R to next in sequence.
S[X] Returns $S_K[X]$, the result of applying a digital signature function S to X based upon the secret key K. The digital signature must be long enough to counter the chances of someone generating a random signature. The length depends on the signature scheme chosen (see below).

The protocol is as follows:
1. System 21 requests 30 Random[ ] from ChipT 23;
2. ChipT 23 returns 31 R to System 21;
3. System 21 requests 32 S[R] from ChipT 23 and also requests 33 it from ChipA 20;
4. ChipT 23 returns 34 $S_{KT}[R]$ to System 21;
5. ChipA 20 returns 35 $S_{KA}[R]$ to System 21;
6. System compares $S_{KT}[R]$ with $S_{KA}[R]$. If they are equal, then ChipA is considered valid. If not, then ChipA is considered invalid.

Figure 3:
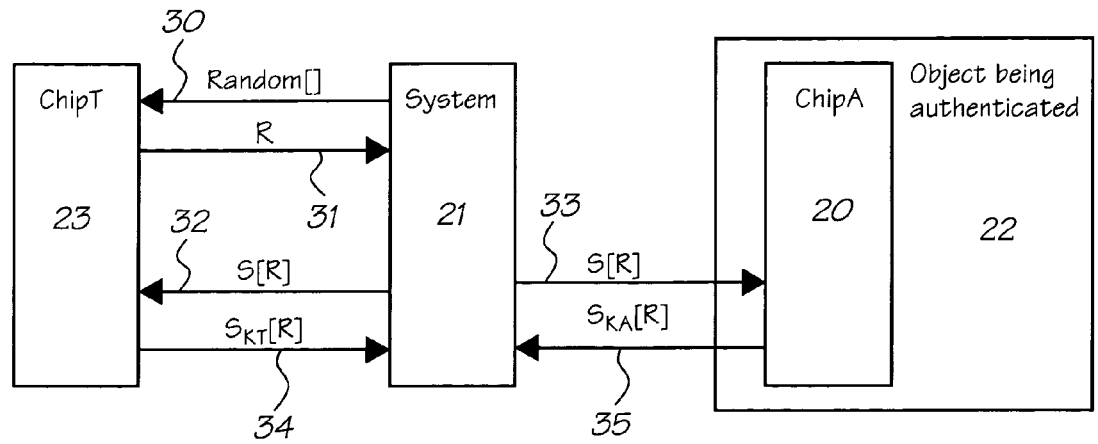
FIG. 3 is a data flow diagram for Protocol P1.

The data flow can be seen in FIG. 3:

Note that System 21 does not have to comprehend $S_K[R]$ messages. It must merely check that the responses from ChipA and ChipT are the same. The System 21 therefore does not require the key.

The security of Protocol P1 lies in two places:

The security of S[X]. Only authentication chips contain the secret key, so anything that can produce a digital signature S[X] from an X that matches the S[X] generated by a trusted authentication chip (ChipT) must be authentic.

The domain of R generated by all authentication chips must be large and non-deterministic. If the domain of R generated by all authentication chips is small, then there is no need for a clone manufacturer to crack the key. Instead, the clone manufacturer could incorporate a ROM in their chip that had a record of all of the responses from a genuine chip to the codes sent by the system. The Random function does not strictly have to be in the authentication chip, since System can potentially generate the same random number sequence. However it simplifies the design of System and ensures the security of the random number generator will be the same for all implementations that use the authentication chip, reducing possible error in system implementation.

Protocol P1 has several advantages:

K is not revealed during the authentication process
Given X, a clone chip cannot generate $S_K[X]$ without K or access to a real authentication Chip.
System is easy to design, especially in low cost systems such as ink-jet printers, as no encryption or decryption is required by System itself.
A wide range of keyed signature functions exists, including symmetric cryptography, random number sequences, and message authentication codes.
Keyed signature functions (such as one-way functions) require fewer gates and are easier to verify than asymmetric algorithms).
Secure key size for a keyed signature functions does not have to be as large as for an asymmetric (public key) algorithm. A key length of 128 bits provides adequate security if S is a symmetric cryptographic function, while a key length of 160 bits provides adequate security if S is HMAC-SHA1. However there are problems with this protocol:
It is susceptible to chosen text attack. An attacker can plug the chip into their own system, generate chosen Rs, and observe the output. In order to find the key, an attacker can also search for an R that will generate a specific S[R] since multiple authentication chips can be tested in parallel.
Depending on the one-way function chosen, key generation can be complicated. The method of selecting a good key depends on the algorithm being used. Certain keys are weak for a given algorithm.
The choice of the keyed one-way functions itself is non-trivial. Some require licensing due to patent protection.
A man-in-the middle could take action on the plaintext message R before passing it on to ChipA—it would be preferable if the man-in-the-middle did not see R until after ChipA had seen it. It would be even more preferable if a man-in-the-middle didn't see R at all.

If S is symmetric encryption, because of the 128-bit key size needed for adequate security, the chips could not be exported from the USA since they could be used as strong encryption devices.

If Protocol P1 is implemented with S as an asymmetric encryption algorithm, there is no advantage over the symmetric case—the keys needs to be longer and the encryption algorithm is more expensive in silicon.

Protocol P1 must be implemented with two authentication chips in order to keep the key secure. This means that each System requires an authentication chip and each consumable requires an authentication chip.

5.1.2 Protocol P2

In some cases, System may contain a large amount of processing power. Alternatively, for instances of systems that are manufactured in large quantities, integration of ChipT into System may be desirable. Use of an asymmetrical encryption algorithm allows the ChipT portion of System to be insecure. Protocol P2 therefore, uses asymmetric cryptography.

For this protocol, each chip contains the following values:

$K_T$ ChipT only. Public key for encrypting. Does not have to be secret.

$K_A$ ChipA only. Private key for decrypting. Must be secret.

R ChipT only. Current random number. Does not have to be secret, but must be seeded with a different initial value for each chip instance. Changes with each invocation of the Random function.

The following functions are defined:

E[X] ChipT only. Returns $E_{KT}[X]$ where E is asymmetric encrypt function E.

D[X] ChipA only. Returns $D_{KA}[X]$ where D is asymmetric decrypt function D.

Random[ ] ChipT only. Returns $R|E_K[R]$. Advances R to next in random number sequence.

The public key $K_T$ is in ChipT 23, while the secret key $K_A$ is in ChipA 20. Having $K_T$ in ChipT 23 has the advantage that ChipT can be implemented in software or hardware (with the proviso that the seed for R is different for each chip or system). Protocol P2 therefore can be implemented as a Single Chip Protocol or as a Double Chip Protocol.

Figure 4:
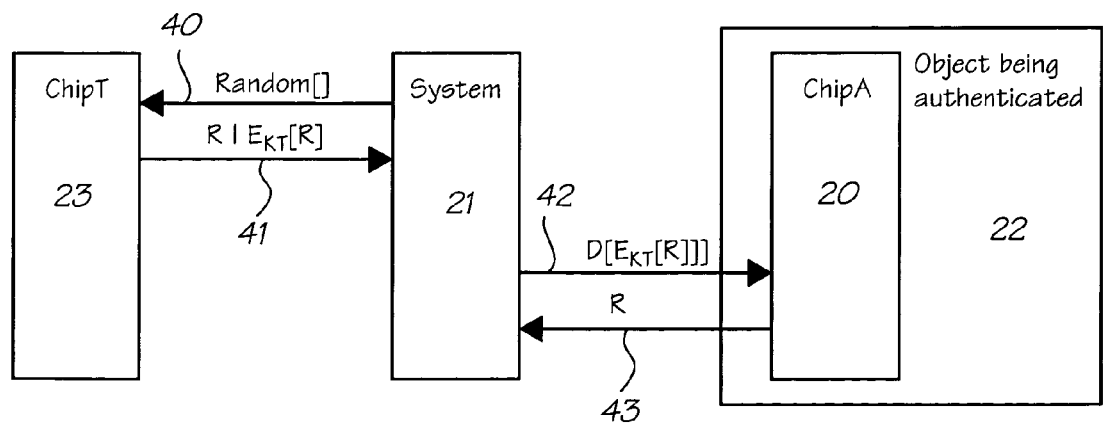
FIG. 4 is a data flow diagram for Protocol P2.

The protocol for authentication is as follows:
1. System 21 calls 40 ChipT's Random function;
2. ChipT 23 returns 41 $R|E_{KT}[R]$ to System 21;
3. System 21 calls 42 ChipA's D function, passing in $E_KT[R]$;
4. ChipA 20 returns 43 R, obtained by $D_{KA}[E_{KT}[R]]$;
5. System 21 compares R from ChipA 20 to the original R generated by ChipT 23. If they are equal, then ChipA 20 is considered valid. If not, ChipA 20 is invalid. The data flow can be seen in FIG. 4:

Protocol P2 has the following advantages:

$K_A$ (the secret key) is not revealed during the authentication process

Given $E_{KT}[X]$, a clone chip cannot generate X without $K_A$ or access to a real ChipA.

Since $K_T \neq K_A$, ChipT can be implemented completely in software or in insecure hardware, or as part of System. Only ChipA (in the consumable) is required to be a secure authentication chip.

If ChipT is a physical chip, System is easy to design.

There are a number of well-documented and cryptanalyzed asymmetric algorithms to chose from for implementation, including patent-free and license-free solutions.

However, Protocol P2 has a number of its own problems:

For satisfactory security, each key needs to be 2048 bits (compared to minimum 128 bits for symmetric cryptography in Protocol P1). The associated intermediate memory used by the encryption and decryption algorithms is correspondingly larger.

Key generation is non-trivial. Random numbers are not good keys.

If ChipT is implemented as a core, there may be difficulties in linking it into a given System ASIC.

If ChipT is implemented as software, not only is the implementation of System open to programming error and non-rigorous testing, but the integrity of the compiler and mathematics primitives must be rigorously checked for each implementation of System. This is more complicated and costly than simply using a well-tested chip.

Although many asymmetric algorithms are specifically strengthened to be resistant to differential cryptanalysis (which is based on chosen text attacks), the private key $K_A$ is susceptible to a chosen text attack It would be preferable to keep R hidden, but since $K_T$ and in fact all of ChipT is public, R must be public as well.

If ChipA and ChipT are instances of the same authentication chip, each chip must contain both asymmetric encrypt and decrypt functionality. Consequently each chip is larger, more complex, and more expensive than the chip required for Protocol P1.

If the authentication chip is broken into two chips to save cost and reduce complexity of design/test, two chips still need to be manufactured, reducing the economies of scale. This is offset by the relative numbers of systems to consumables, but must still be taken into account.

Protocol P2 authentication chips could not be exported from the USA, since they would be considered strong encryption devices.

5.1.3 Protocol P3

Protocol P3 attempts to solve one of the problems inherent in Protocols P1 and P2 in that pairs of X, $F_K[X]$ can be gathered by the attacker (where F is S or E). Protocol P1 is worse in that it is open to a chosen text attack. It is therefore desirable to pass the chosen random number R from ChipT to ChipA without the intermediate System knowing the value of R. Protocol P2 cannot do this since ChipT is public and hence R is not secret. In addition, since R is random, it is not enough to simply pass an encrypted version of R to ChipA, since a random sequence of bits could be substituted for a different random sequence of bits by the attacker.

The solution is to encrypt both R and R's digital signature so that ChipA can test if R was in fact generated by ChipT. Since we don't want to reveal R, P3 must be a Double Chip Protocol (ChipT cannot be incorporated into a software System or be included as an ASIC core). Symmetric encryption can therefore be safely used.

Protocol P3 therefore uses 2 sets of keys. The first key is used in ChipT to encrypt R and the signature of R. The encrypted R is sent to ChipA where R is extracted and verified by ChipA. If the R is valid, ChipA encrypts R using the second key, and outputs the result. The System sends the output from ChipA back to ChipT where it is compared against the known R encrypted with the second key.

For this protocol, each chip contains the following values:

$K_1$ Key for encrypting in ChipT and decrypting in ChipA. Must be secret.

$K_2$ Key for encrypting in ChipA and ChipT. Must be secret.

R Current random number. Must be secret and must be seeded with a different initial value for each chip instance. Changes with each successful call to the Test function.

The following functions are defined:

E[X] Internal function only. Returns $E_K[X]$ where E is symmetric encrypt function E.

D[X] Internal function ChipA only. Returns $D_K[X]$ where D is symmetric decrypt function D.

S[X] Internal function only. Returns S[X], the digital signature for X. The digital signature must be long enough to counter the chances of someone generating a random signature. 160 bits is the preferred size, giving someone 1 chance in $2^{160}$ of generating a valid signature by random.

Random[ ] ChipT only. Returns $E_{K1}[R|S[R]]$.

Test[X] ChipT only. Returns 1 and advances R if $E_{K2}[R]$=X. Otherwise returns 0. The time taken to return 0 must be identical for all bad inputs. The time taken to return 1 must be identical for all good inputs.

Prove[X] ChipA only. Calculates Y|Z from $D_{K1}[X]$. Returns $E_{K2}[Y]$ if S[Y]=Z. Otherwise returns 0. The time taken to return 0 must be identical for all bad inputs. The time taken to return $E_{K2}[Y]$ must be the same for all good inputs.

The protocol for authentication is as follows:
1. System 21 calls 50 ChipT's Random function;
2. ChipT 23 returns 51 $E_{K1}[R|S[R]]$ to System 21;
3. System 21 calls ChipA's Prove function, passing in $E_{K1}[R|S[R]]$;
4. ChipA 20 decrypts $E_{K1}[R|S[R]]$, and calculates its own S[R] based upon the decrypted R. If the two match, ChipA returns 53 $E_{K2}[R]$. Otherwise ChipA returns 0;
5. System 21 calls 54 ChipT's Test function, passing in the returned $E_{K2}[R]$. ChipT 23 generates its own $E_{K2}[R]$ and compares it against the input value. If they are equal, then ChipA is considered valid and a 1 is returned 55 to System 21. If not, ChipA is considered invalid and 0 is returned to System 21.

Figure 5:
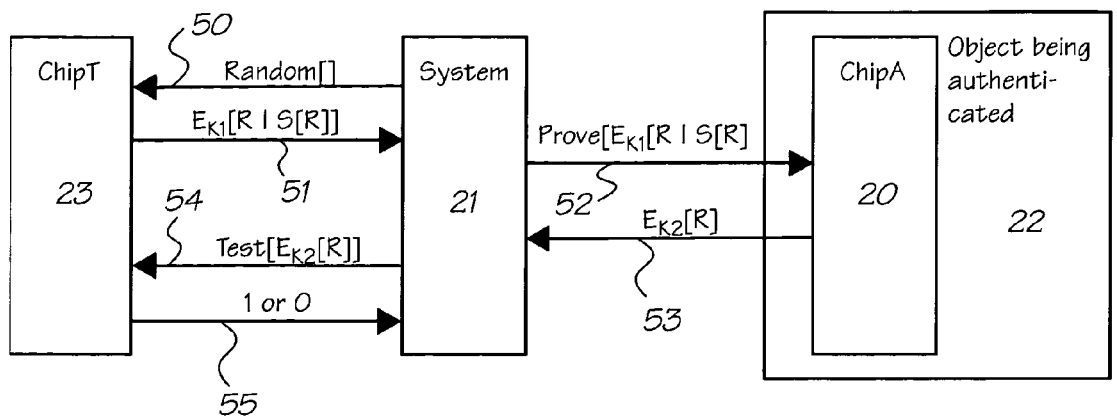
FIG. 5 is a data flow diagram for Protocol P3.

The data flow can be seen in FIG. 5:

Protocol P3 has the following advantages:
$K_1$ and $K_2$ (the secret keys) are not revealed during the authentication process The time varying challenge R is encrypted, so that it is not revealed during the authentication process. An attacker cannot build a table of X, $E_K[X]$ values for $K_1$ or $K_2$.

An attacker cannot call Prove without a valid R|S[R] pair encrypted with $K_1$. $K_2$ is therefore resistant to a chosen text attack. R only advances with a valid call to Test, so $K_1$ also not susceptible to a chosen text attack.

System is easy to design, especially in low cost systems such as ink-jet printers, as no encryption or decryption is required by System itself.

There are a number of well-documented and cryptanalyzed symmetric algorithms to chose from for implementation of E, including patent-free and license-free solutions.

A wide range of signature functions exists, from message authentication codes to random number sequences to key-based symmetric cryptography.

Signature functions and symmetric encryption algorithms require fewer gates and are easier to verify than asymmetric algorithms.

Secure key size for symmetric encryption does not have to be as large as for an asymmetric (public key) algorithm. A minimum of 128 bits can provide appropriate security for symmetric encryption.

However, Protocol P3 has a number of its own problems:
Although there are a large number of available functions for E and S, the choice of E and S is non-trivial. Some require licensing due to patent protection.

Depending on the chosen encryption algorithm, key generation can be complicated. The method of selecting a good key depends on the algorithm being used. Certain keys are weak for a given algorithm.

If ChipA and ChipT are instances of the same authentication chip, each chip must contain both symmetric encrypt and decrypt functionality. Consequently each chip is larger, more complex, and more expensive than the chip required for Protocol P1 which only has encrypt functionality.

If the authentication chip is broken into 2 chips to save cost and reduce complexity of design/test, two chips still need to be manufactured, reducing the economies of scale. Unfortunately, ChipA must contain both encrypt and decrypt, making the consumable authentication chip the larger of the two chips. Both chips must also contain signature functions, making them more complex than the chip required for Protocol P1.

Protocol P3 authentication chips could not be exported from the USA, since they would be considered strong encryption devices.

5.1.4 Additional Notes 5.1.4.1 General Comments

Protocol P3 is the most secure of the three Presence Only authentication protocols, since nothing is revealed about the challenge from the response. However, Protocol P3 requires implementation of encryption, decryption and signature functions, making it more expensive in silicon than Protocol P1. In addition, export regulations imposed by the United States make this protocol problematic.

With Protocol P2, even if the process of choosing a key was straightforward, Protocol P2 is impractical at the present time due to the high cost of silicon implementation (both key size and functional implementation).

Protocol P1 is therefore the current protocol of choice for Presence Only authentication. Eventually, as silicon costs come down with Moore's Law, and USA export regulations are relaxed, Protocol P3 will be preferable to Protocol P1. When silicon costs are negligible or tight integration is required, Protocol P2 may be preferable to Protocol P1, but the security protocol of choice would still remain Protocol P3.

5.1.4.2 Clone Consumable using Real Authentication Chip

Protocols P1, P2 and P3 only check that ChipA is a real authentication chip. They do not check to see if the consumable 22 itself is valid. The fundamental assumption for authentication is that if ChipA is valid, the consumable is valid.

It is therefore possible for a clone manufacturer to insert a real authentication chip into a clone consumable. There are two cases to consider:

In cases where state data is not written to the authentication chip, the chip is completely reusable. Clone manufacturers could therefore recycle a valid consumable into a clone consumable. This may be made more difficult by melding the authentication chip into the consumable's physical packaging, but it would not stop refill operators.

In cases where state data is written to the authentication chip, the chip may be new, partially used up, or completely used up. However this does not stop a clone manufacturer from using the piggyback attack, where the clone manufacturer builds a chip that has a real authentication chip as a piggyback. The attacker's chip (ChipE) is therefore a man-in-the-middle. At power up, ChipE reads all the memory state values from the real authentication chip into its own memory. ChipE then examines requests from System, and takes different actions depending on the request. Authentication requests can be passed directly to the real authentication chip, while read/write requests can be simulated by a memory that resembles real authentication chip behavior. In this way the authentication chip will always appear fresh at power-up. ChipE can do this because the data access is not authenticated.

Note that in both these cases, in order to fool System into thinking its data accesses were successful, ChipE still requires a real authentication chip, and in the second case, a clone chip is required in addition to a real authentication chip. Consequently any of these protocols can be useful in situations where it is not cost effective for a clone manufacturer to embed a real authentication chip into the consumable.

If the consumable cannot be recycled or refilled easily, it may be protection enough to use a Presence Only authentication protocol. For a clone operation to be successful each clone consumable must include a valid authentication chip. The chips would have to be stolen en masse, or taken from old consumables. The quantity of these reclaimed chips (as well as the effort in reclaiming them) should not be enough to base a business on, so the added protection of secure data transfer (see Protocols C1-C3) may not be useful.

5.1.4.3 Longevity of Key

A general problem of these two protocols is that once the authentication key is chosen, it cannot easily be changed. The effect depends on the application of the key. In some instances, if the key is compromised, the results are disastrous. In other cases, it is only a minor inconvenience.

For example, in a car/car-key System/Consumable scenario, the customer has only one set of car/car-keys. Each car has a different authentication key. Consequently the loss of a car-key only compromises the individual car. If the owner considers this a problem, they must get a new lock on the car by replacing the System chip inside the car's electronics. The owner's keys must be reprogrammed/replaced to work with the new car System authentication chip.

By contrast, a compromise of a key for a high volume consumable market (for example ink cartridges in printers) would allow a clone ink cartridge manufacturer to make their own authentication chips. The only solution for existing systems is to update the System authentication chips, which is a costly and logistically difficult exercise. In any case, consumers' Systems already work—they have no incentive to hobble their existing equipment.

5.2 Consumable Lifetime Authentication

In this level of consumable authentication we are concerned with validating the existence of the authentication chip, as well as ensuring that the authentication chip lasts only as long as the consumable. In addition to validating that an authentication chip is present, writes and reads of the authentication chip's memory space must be authenticated as well. In this section we assume that the authentication chip's data storage integrity is secure—certain parts of memory are Read Only, others are Read/Write, while others are Decrement Only (see Section 7 for more information).

Three protocols are presented. Protocols C1 and C3 requires two authentication chips, while Protocol C2 can be implemented using either one or two authentication chips.

5.2.1 Protocol C1

This protocol is a double chip protocol (two authentication chips are required). For this protocol, each authentication chip contains the following values:

$K_1$ Key for calculating $F_{K1}[X]$. Must be secret.
$K_2$ Key for calculating $F_{K2}[X]$. Must be secret.
R Current random number. Does not have to be secret, but must be seeded with a different initial value for each chip instance. Changes with each successful authentication as defined by the Test function.
M Memory vector of authentication chip. Part of this space should be different for each chip (does not have to be a random number). Each authentication chip contains the following logical functions:
S[X] Internal function only. Returns $S_K[X]$, the result of applying a digital signature function S to X based upon either secret key $K_1$ or $K_2$. The digital signature must be long enough to counter the chances of someone generating a random signature. The length depends on the signature scheme chosen (see below).
Random[ ] Returns R|$S_{K1}$[R].
Test[X, Y] Returns 1 and advances R if $S_{K2}$[R|X]=Y. Otherwise returns 0. The time taken to return 0 must be identical for all bad inputs. The time taken to return 1 must be identical for all good inputs.
Read[X, Y] Returns M|$S_{K2}$[X|M] if $S_{K1}$[X]=Y. Otherwise returns 0. The time taken to return 0 must be identical for all bad inputs. The time taken to return M|$S_{K2}$[X|M] must be identical for all good inputs.
Write[X] Writes X over those parts of M that can legitimately be written over.

To authenticate ChipA 20 and read ChipA's memory M:
1. System 21 calls 60 ChipT's Random function;
2. ChipT 23 produces R|$S_{K1}$[R] and returns 61 these to System;
3. System 21 calls 62 ChipA's Read function, passing in R, $S_{K1}$[R];
4. ChipA 20 returns 63 M and $S_{K2}$[R|M];
5. System 21 calls 64 ChipT's Test function, passing in M and $S_{K2}$[R|M];
6. System 21 checks response 65 from ChipT 23. If the response 65 is 1, then ChipA 20 is considered authentic. If 0, ChipA 20 is considered invalid.

To authenticate a write of $M_{new}$ to ChipA's memory M:
1. System calls ChipA's Write function, passing in $M_{new}$;
2. The authentication procedure for a Read is carried out;
3. If ChipA is authentic and $M_{new}$=M, the write succeeded. Otherwise it failed.

Figure 6:
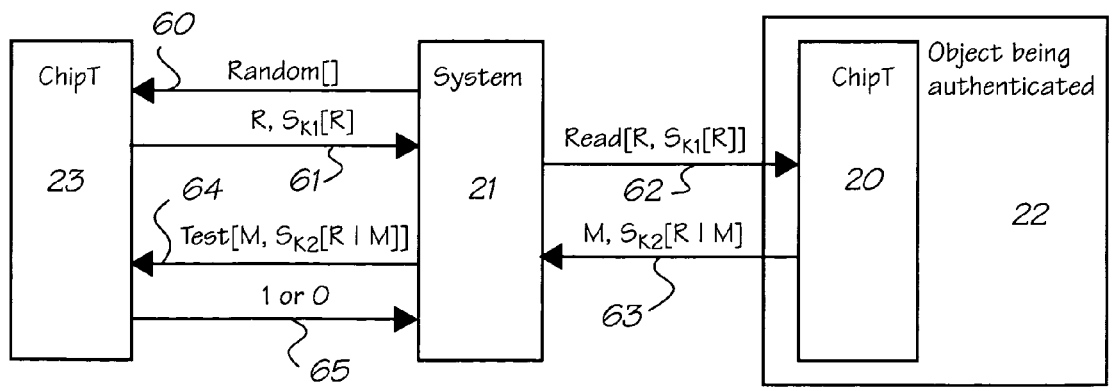
FIG. 6 is a data flow diagram for read authentication using Protocol C1.

The data flow for read authentication is shown in FIG. 6.

The first thing to note about Protocol C1 is that $S_K[X]$ cannot be called directly. Instead $S_K[X]$ is called indirectly by Random, Test and Read:

Random[ ] calls $S_{K1}$[X] X is not chosen by the caller. It is chosen by the Random function. An attacker must perform a brute force search using multiple calls to Random, Read, and Test to obtain a desired X, $S_{K1}$[X] pair.
Test[X,Y] calls $S_{K2}$[R|X] Does not return result directly, but compares the result to Y and then returns 1 or 0. Any attempt to deduce $K_2$ by calling Test multiple times trying different values of $S_{K2}$[R|X] for a given X is reduced to a brute force search where R cannot even be chosen by the attacker.
Read[X, Y] calls $S_{K1}$[X] X and $S_{K1}$[X] must be supplied by caller, so the caller must already know the X, $S_{K1}$[X] pair. Since the call returns 0 if Y≠$S_{K1}$[X], an attacker is able to use the Read function for a brute force attack on $K_1$.
Read[X, Y] calls $S_{K2}$[X|M], X is supplied by caller. However X can only be those values already given out by the Random function (since X and Y are validated via $K_1$). Thus a chosen text attack must first collect pairs from Random (effectively a brute force attack). In addition, only part of M can be used in a chosen text attack since some of M is constant (read-only) and the decrement-only part of M can only be used once per consumable. In the next consumable the read-only part of M will be different.

Having $S_K[X]$ being called indirectly prevents chosen text attacks on the authentication chip. Since an attacker can only obtain a chosen R, $S_{K1}[R]$ pair by calling Random, Read, and Test multiple times until the desired R appears, a brute force attack on $K_1$ is required in order to perform a limited chosen text attack on $K_2$. Any attempt at a chosen text attack on $K_2$ would be limited since the text cannot be completely chosen: parts of M are read-only, yet different for each authentication chip.

The second thing to note is that two keys are used. Given the small size of M (256 bits), two different keys $K_1$ and $K_2$ are used in order to ensure there is no correlation between $S_{K1}[R]$ and $S_{K2}[R|M]$. $K_1$ is therefore used to help protect $K_2$ against differential attacks. It is not enough to use a single longer key since in practice, S is likely to have limitations on key length (for example, if S is HMAC-SHA1, the key length is a maximum of 160 bits. Adding more bits to the key adds no protection). It is therefore safer to protect $K_2$ from differential attacks with $K_1$. Otherwise it is potentially possible that an attacker via some as-yet undiscovered technique, could determine the effect of the limited changes in M to particular bit combinations in R and thus calculate $S_{K2}[X|M]$ based on $S_{K1}[X]$.

As an added precaution, the Random and Test functions in ChipA should be disabled so that in order to generate R, $S_{K1}[R]$ pairs, an attacker must use instances of ChipT, each of which is more expensive than ChipA (since a system must be obtained for each ChipT). Similarly, there should be a minimum delay between calls to Random, Read and Test so that an attacker cannot call these functions at high speed. Thus each chip can only give a specific number of R, $S_{K1}[R]$ pairs away in a certain time period. For more information, see Section 7.

The only specific timing requirement of Protocol C1 is that the timing for good inputs must be the same regardless of the input value, and the return value of 0 (indicating a bad input) must be produced in the same amount of time regardless of where the error is in the input. Attackers can therefore not learn anything about what was bad about the input value. This is true for both Read and Test functions.

Another thing to note about Protocol C1 is that reading data from ChipA also requires authentication of ChipA. The System can be sure that the contents of memory (M) is what ChipA claims it to be if $S_{K2}[R|M]$ is returned correctly. A clone chip may pretend that M is a certain value (for example it may pretend that the consumable is full), but it cannot return $S_{K2}[R|M]$ for any R passed in by System. Thus the effective signature $S_{K2}[R|M]$ assures System that not only did an authentic ChipA send M, but also that M was not altered in between ChipA and System.

Finally, the Write function as defined does not authenticate the Write. To authenticate a write, the System must perform a Read after each Write.

There are some basic advantages with Protocol C1:

$K_1$ and $K_2$ are not revealed during the authentication process

Given X, a clone chip cannot generate $S_{K2}[X|M]$ without the key or access to a real authentication chip.

System is easy to design, especially in low cost systems such as ink-jet printers, as no encryption or decryption is required by System itself.

A wide range of key based signature exists, including symmetric cryptography, random number sequences, and message authentication codes.

Keyed signature and one-way functions require fewer gates and are easier to verify than asymmetric algorithms).

Secure key size for a keyed signature function does not have to be as large as for an asymmetric (public key) algorithm. A minimum key size of 128 bits provides appropriate security if S is a symmetric cryptographic function, while 160 bits provides adequate security if S is HMAC-SHA1.

Consequently, with Protocol C1, the only way to authenticate ChipA is to read the contents of ChipA's memory.

The security of this protocol depends on the underlying $S_K[X]$ scheme and the domain of R over the set of all Systems.

Although $S_K[X]$ can be any keyed signature function, there is no advantage to implement it as asymmetric encryption. The keys for asymmetric algorithms need to be longer and the encryption algorithm is more expensive in silicon. This leads to a second protocol for use with asymmetric algorithms—Protocol C2.

The primary disadvantage of Protocol C1 is that the value for R is known during the protocol. Consequently R, $S_{K1}[R]$ pairs can be collected and analyzed in a form of differential attack. It would be preferable if R were unknown, as is the case with Protocol C3.

Protocol C1 must be implemented with two authentication chips in order to keep the keys secure. This means that each System requires an authentication chip and each consumable requires an authentication chip.

5.2.2 Protocol C2

In some cases, System may contain a large amount of processing power. Alternatively, for instances of systems that are manufactured in large quantities, integration of ChipT into System may be desirable. Use of an asymmetrical encryption algorithm can allow the ChipT portion of System to be insecure. Protocol C2 therefore, uses asymmetric cryptography.

For this protocol, each chip contains the following values:

KT ChipT only. Public key for encrypting. Does not have to be secret.

KA ChipA only. Private key for decrypting and encrypting. Must be secret.

R ChipT only. Current random number. Does not have to be secret, but must be seeded with a different initial value for each chip instance. Changes with each successful authentication as defined by the Test function.

M Memory vector of authentication chip. Part of this space should be different for each chip (does not have to be a random number).

There is no point in verifying anything in the Read function, since anyone can encrypt using a public key. Consequently the following functions are defined:

E[X] Internal function only. Returns $E_K[X]$ where E is asymmetric encrypt function E.

D[X] Internal function only. Returns $D_K[X]$ where D is asymmetric decrypt function D.

Random[ ] ChipT only. Returns $E_{KT}[R]$.

Test[X, Y] Returns 1 and advances R if $D_{KT}[R|X]=Y$. Otherwise returns 0. The time taken to return 0 must be identical for all bad inputs, and the time taken to return 1 must be the same for all good inputs.

Read[X] ChipA only. Returns $M|E_{KA}[R|M]$ where $R=D_{KA}[X]$ (does not test input since ChipT is effectively public).

Write[X] Writes X over those parts of M that can legitimately be written over.

The public key $K_T$ is in ChipT, while the secret key $K_A$ is in ChipA. Having $K_T$ in ChipT has the advantage that ChipT can be implemented in software or hardware (with the proviso that R is seeded with a different random number for each system).

Protocol C2 requires that $D_{K_A}[E_{K_T}[X]]=X$ and $D_{K_T}[E_{K_A}[X]]=X$.

To authenticate ChipA and read ChipA's memory M:
1. System 21 calls 70 ChipT's Random function;
2. ChipT 23 produces and returns 71 $E_{K_T}[R]$ to System;
3. System 21 calls 72 ChipA's Read function, passing in $E_{K_T}[R]$;
4. ChipA 20 returns 73 M|$E_{K_A}$[R|M], first obtaining R by $D_{K_A}[E_{K_T}[R]]$;
5. System 21 calls 74 ChipT's Test function, passing in M and $E_{K_A}$[R|M];
6. ChipT 23 calculates $D_{K_T}[E_{K_A}$[R|M]] and compares it to R|M.
7. System 21 checks response 75 from ChipT 23. If the response 75 is 1, then ChipA 20 is considered authentic. If 0, ChipA 20 is considered invalid.

To authenticate a write of $M_{new}$ to ChipA's memory M:
1. System calls ChipA's Write function, passing in $M_{new}$;
2. The authentication procedure for a Read is carried out;
3. If ChipA is authentic and $M_{new}$=M, the write succeeded. Otherwise it failed.

Figure 7:
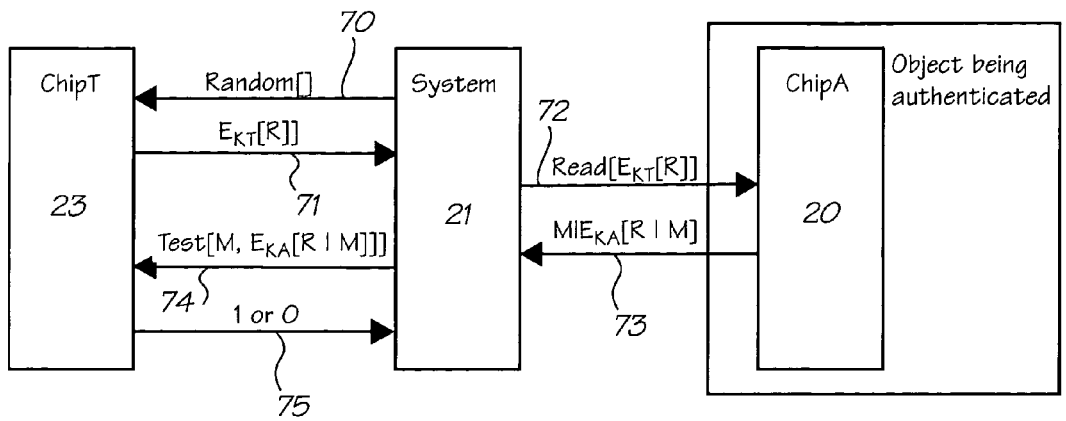
FIG. 7 is a data flow diagram for read authentication using Protocol C2.

The data flow for read authentication is shown in FIG. 7:

Only a valid ChipA would know the value of R, since R is not passed into the authenticate function (it is passed in as an encrypted value). R must be obtained by decrypting E[R], which can only be done using the secret key $K_A$. Once obtained, R must be appended to M and then the result re-encoded. ChipT can then verify that the decoded form of $E_{K_A}$[R|M]=R|M and hence ChipA is valid. Since $K_T \neq K_A$, $E_{K_T}[R] \neq E_{K_A}[R]$.

Protocol C2 has the following advantages:
- $K_A$ (the secret key) is not revealed during the authentication process
- Given $E_{K_T}[R]$, a clone chip cannot generate R without $K_A$ or access to a real ChipA.
- Since $K_T \neq K_A$, ChipT can be implemented completely in software or in insecure hardware or as part of System. Only ChipA is required to be a secure authentication chip.
- Since ChipT and ChipA contain different keys, intense testing of ChipT will reveal nothing about $K_A$.
- If ChipT is a physical chip, System is easy to design.
- There are a number of well-documented and cryptanalyzed asymmetric algorithms to chose from for implementation, including patent-free and license-free solutions.
- Even if System could be rewired so that ChipA requests were directed to ChipT, ChipT could never answer for ChipA since $K_T \neq K_A$. The attack would have to be directed at the System ROM itself to bypass the authentication protocol. However, Protocol C2 has a number of disadvantages:
- All authentication chips need to contain both asymmetric encrypt and decrypt functionality. Consequently each chip is larger, more complex, and more expensive than the chip required for Protocol C2.
- For satisfactory security, each key needs to be 2048 bits (compared to a minimum of 128 bits for symmetric cryptography in Protocol C1). The associated intermediate memory used by the encryption and decryption algorithms is correspondingly larger.
- Key generation is non-trivial. Random numbers are not good keys.
- If ChipT is implemented as a core, there may be difficulties in linking it into a given System ASIC.
- If ChipT is implemented as software, not only is the implementation of System open to programming error and non-rigorous testing, but the integrity of the compiler and mathematics primitives must be rigorously checked for each implementation of System. This is more complicated and costly than simply using a well-tested chip.
- Although many asymmetric algorithms are specifically strengthened to be resistant to differential cryptanalysis (which is based on chosen text attacks), the private key $K_A$ is susceptible to a chosen text attack
- It would be preferable to keep R hidden, but since KT and in fact all of ChipT is effectively public, R must be public as well.
- Protocol C2 authentication chips could not be exported from the USA, since they would be considered strong encryption devices.

As with Protocol C1, the only specific timing requirement of Protocol C2 is for returning values based on good or bad inputs. The time taken to return a value if the input is good must be the same regardless of the value of the input. The same is true if the value is bad. The time taken to process good and bad inputs does not have to be the same however. Attackers can therefore not learn anything about what was bad (or good) about the input value. This is true for both Read and Test functions.

5.2.3 Protocol C3

Protocol C3 attempts to solve one of the problems inherent in Protocols C1 and C2 in that pairs of R, $F_{K_T}[R]$ can be gathered by the attacker (where F is S or E). These pairs can be used to mount a limited chosen text attack on $K_2$, and can be used for differential analysis of $K_1$. It is therefore desirable to pass the chosen random number R from ChipT to ChipA without the intermediate System knowing the value of R. Protocol C2 cannot do this since ChipT is public and hence R is not secret. In addition, since R is random, it is not enough to simply pass an encrypted version of R to ChipA (as in Protocol C2), since a random sequence of bits could be substituted for a different random sequence of bits by the attacker.

The solution is to encrypt both R and R's digital signature so that ChipA can test if R was in fact generated by ChipT. Since we don't want to reveal R, C3 must be a Double Chip Protocol (ChipT cannot be incorporated into a software System or be included as an ASIC core). A keyed one-way function is not enough, since ChipA must recover R and R's signature. Symmetric encryption can therefore be safely used.

Protocol C3 therefore uses two keys. The first key is used in ChipT to encrypt R and the signature of R. The encrypted R and signature is sent to ChipA where R is extracted and verified by ChipA. If the R is valid, ChipA encrypts M|R using the second key, and outputs the result. The System sends the output from ChipA back to ChipT where it is verified against the known R encrypted with the second key.

For this protocol, each chip contains the following values:
- $K_1$ Key for encrypting in ChipT and decrypting in ChipA. Must be secret.
- $K_2$ Key for encrypting in both ChipA and ChipT. Must be secret.
- R Current random number. Must be secret and must be seeded with a different initial value for each chip instance. Changes with each successful call to the Test function.
- M Memory vector of authentication chip. Part of this space should be different for each chip (does not have to be a random number).

The following functions are defined:
- E[X] Internal function only. Returns $E_K[X]$ where E is symmetric encrypt function E.

D[X] Internal function ChipA only. Returns $D_K[X]$ where D is symmetric decrypt function D.

S[X] Internal function only. Returns S[X], the digital signature for X. The digital signature must be long enough to counter the chances of someone generating a random signature. 128 bits is a satisfactory size if S is symmetric encryption, while 160 bits is a satisfactory size if S is HMAC-SHA1.

Random[ ] ChipT only. Returns $E_{K1}[R|S[R]]$.

Test[X, Y] ChipT only. Returns 1 and advances R if $E_{K2}[X|R]$=Y. Otherwise returns 0. The time taken to return 0 must be identical for all bad inputs. The time taken to return 1 must be identical for all good inputs.

Read[X] ChipA only. Calculates Y|Z from $D_{K1}[X]$. Returns $M|E_{K2}[M|Y]$ if S[Y]=Z. Otherwise returns 0. The time taken to return 0 must be identical for all bad inputs. The time taken to return $M|E_{K2}[M|Y]$ must be the same for all good inputs.

The protocol for authentication is as follows:
1. System 21 calls 80 ChipT's Random function;
2. ChipT 23 returns 81 $E_{K1}[R|S[R]]$ to System 21;
3. System 21 calls 82 ChipA's Read function, passing in $E_{K1}[R|S[R]]$;
4. ChipA 20 decrypts $E_{K1}[R|S[R]]$, and calculates its own S[R] based upon the decrypted R. If the two match, ChipA 20 returns 83 M, $E_{K2}[M|R]$. Otherwise ChipA 20 returns 0;
5. System 21 calls 84 ChipT's Test function, passing in the returned M and $E_{K2}[M|R]$. ChipT 23 generates its own $E_{K2}[M|R]$ and compares it against the input value. If they are equal, then ChipA 20 is considered valid and a 1 is returned 85 to System 21. If not, ChipA is invalid and 0 is returned 85 to System 21.

Figure 8:
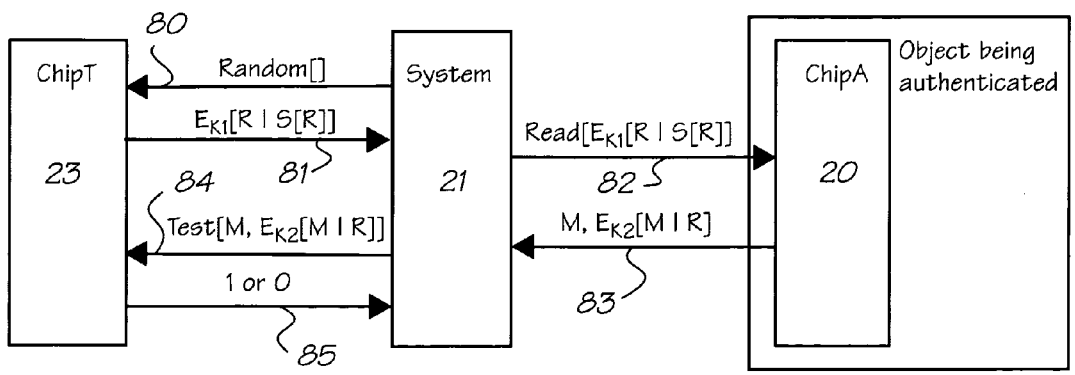
FIG. 8 is a data flow diagram for read authentication using Protocol C3.

The data flow can be seen in FIG. 8:

Protocol C3 has the following advantages:
- $K_1$ and $K_2$ (the secret keys) are not revealed during the authentication process
- The time varying challenge R is encrypted, so that it is not revealed during the authentication process. An attacker cannot build a table of X, $E_K[X]$ values for $K_1$ or $K_2$.
- An attacker cannot call Read without a valid R|S[R] pair encrypted with $K_1$. $K_2$ is therefore resistant to a chosen text attack. R only advances with a valid call to Test, so $K_1$ also is not susceptible to a chosen text attack. It is true that the $E_{K1}[R|S[R]]$ values can be collected by an attacker, but there is no correlation between these values and the output value from the Read function since there are two unknowns—R and $K_2$.
- System is easy to design, especially in low cost systems such as ink-jet printers, as no encryption or decryption is required by System itself.
- There are a number of well-documented and cryptanalyzed symmetric algorithms to chose from for implementation of E, including patent-free and license-free solutions.
- A wide range of signature functions exists, from message authentication codes to random number sequences to key-based symmetric cryptography.
- Signature functions and symmetric encryption algorithms require fewer gates and are easier to verify than asymmetric algorithms.
- Secure key size for symmetric encryption does not have to be as large as for an asymmetric (public key) algorithm. A minimum of 128 bits can provide appropriate security for symmetric encryption.

However, Protocol C3 has a number of its own problems:
- Although there are a large number of available functions for E and S, the choice of E and S is non-trivial. Some require licensing due to patent protection.
- Depending on the chosen encryption algorithm, key generation can be complicated. The method of selecting a good key depends on the algorithm being used. Certain keys are weak for a given algorithm.
- If ChipA and ChipT are instances of the same authentication chip, each chip must contain both symmetric encrypt and decrypt functionality. Consequently each chip is larger, more complex, and more expensive than the chip required for Protocol $P_1$ which only has encrypt functionality.
- If the authentication chip is broken into two chips to save cost and reduce complexity of design/test, two chips still need to be manufactured, reducing the economies of scale. Unfortunately, ChipA must contain both encrypt and decrypt, making the consumable authentication chip the larger of the two chips. Both chips must also contain signature functions, making them more complex than the chip required for Protocol C1.
- Protocol C3 authentication chips could not be exported from the USA, since they are considered strong encryption devices.

5.2.4 Additional Notes 5.2.4.1 General Comments

Protocol C3 is the most secure of the three Consumable Lifetime authentication protocols, since nothing is revealed about the challenge from the response. However, Protocol C3 requires implementation of encryption, decryption and signature functions, making it more expensive in silicon than Protocol C1. In addition, export regulations imposed by the United States make this protocol problematic.

With Protocol C2, even if the process of choosing a key was straightforward, Protocol C2 is impractical at the present time due to the high cost of silicon implementation (both key size and functional implementation).

Protocol C1 is therefore the current protocol of choice for Consumable Lifetime authentication. Eventually, as silicon costs come down with Moore's Law, and USA export regulations are relaxed, Protocol C3 will be preferable to Protocol C1. When silicon costs are negligible or tight integration is required, Protocol C2 may be preferable to Protocol C1, but the security protocol of choice would still remain Protocol C3.

5.2.4.2 Variation on Call to Test[ ]

If there are two authentication chips used, it is theoretically possible for a clone manufacturer to replace the System authentication chip with one that returns 1 (success) for each call to Test. The System can test for this by calling Test a number of times—N times with a wrong hash value, and expect the result to be 0. The final time that Test is called, the true returned value from ChipA is passed, and the return value is trusted. The question then arises of how many times to call Test. The number of calls must be random, so that a clone chip manufacturer cannot know the number ahead of time.

If System has a clock, bits from the clock can be used to determine how many false calls to Test should be made. Otherwise the returned value from ChipA can be used. In the latter case, an attacker could still rewire the System to permit a clone ChipT to view the returned value from ChipA, and thus know which hash value is the correct one.

The worst case of course, is that the System can be completely replaced by a clone System that does not require authenticated consumables—this is the limit case of rewiring and changing the System. For this reason, the variation on calls to Test is optional, depending on the System, the Consumable, and how likely modifications are to be made. Adding such logic to System (for example in the case of a small desktop printer) may be considered not worthwhile, as the System is made more complicated. By contrast, adding such logic to a camera may be considered worthwhile.

5.2.4.3 Clone Consumable Using Real Authentication Chip

It is important to decrement the amount of consumable remaining before use that consumable portion. If the consumable is used first, a clone consumable could fake a loss of contact during a write to the special known address and then appear as a fresh new consumable. It is important to note that this attack still requires a real authentication chip in each consumable.

5.2.4.4 Longevity of Key

A general problem of these two protocols is that once the authentication keys are chosen, it cannot easily be changed. In some instances the compromise of a key could be disastrous, while in other cases it is not a problem. See Section 5.1.4 for more information.

5.3 Choosing a Protocol

As described in Section 5.1.4.1 and Section 5.2.4.1, Protocols P1 and C1 are the protocols of choice. Eventually, as silicon costs come down with Moore's Law, and USA export regulations are relaxed, Protocols P3 and C3 will be preferable to Protocols P1 and C1.

However, Protocols P1 and C1 contain much of the same components:
both require read and write access;
both require implementation of a keyed one-way function; and
both require random number generation functionality Protocol C1 requires an additional key ($K_2$) as well as some minimal state machine changes:
a state machine alteration to enable $F_{K1}[X]$ to be called during Random;
a Test function which calls $F_{K2}[X]$
a state machine alteration to the Read function to call $F_{K1}[X]$ and $F_{K2}[X]$ Protocol C1 only requires minimal changes over Protocol P1. It is more secure and can be used in all places where Presence Only authentication is required (Protocol P1). It is therefore the protocol of choice. Given that Protocols P1 and C1 both make use of keyed signature functions, the choice of function is examined in more detail here. Table 2 outlines the attributes of the applicable choices (see Section 3.3 and Section 3.6 for more information). The attributes are phrased so that the attribute is seen as an advantage.

An examination of Table 2 shows that the choice is effectively between the 3 HMAC constructs and the Random Sequence. The problem of key size and key generation eliminates the Random Sequence. Given that a number of attacks have already been carried out on MD5 and since the hash result is only 128 bits, HMAC-MD5 is also eliminated. The choice is therefore between HMAC-SHA1 and HMAC-RIPEMD160.

RIPEMD-160 is relatively new, and has not been as extensively cryptanalyzed as SHA-1. However, SHA-1 was designed by the NSA.

SHA-1 is preferred for the HMAC construct for the following reasons:
SHA-1 was designed by the NSA;
SHA-1 has been more extensively cryptanalyzed without being broken;
SHA-1 requires slightly less intermediate storage than RIPE-MD-160;
SHA-1 is algorithmically less complex than RIPE-MD-160;

Although SHA-1 is slightly faster than RIPE-MD-160, this was not a reason for choosing SHA-1.

Protocol C1 using HMAC-SHA1 is therefore the protocol of choice. It is examined in more detail in Section 6.

5.4 Choosing a Random Number Generator

Each of the described protocols requires a random number generator. The generator must be "good" in the sense that the random numbers generated over the life of all Systems cannot be predicted.

If the random numbers were the same for each System, an attacker could easily record the correct responses from a real authentication chip, and place the responses into a ROM lookup for a clone chip. With such an attack there is no need to obtain $K_1$ or $K_2$.

Therefore the random numbers from each System must be different enough to be unpredictable, or non-deterministic. As such, the initial value for R (the random seed) should be programmed with a physically generated random number gathered from a physically random phenomenon, one where there is no information about whether a particular bit will be 1 or 0. The seed for R must NOT be generated with a computer-run random number generator. Otherwise the generator algorithm and seed may be compromised enabling an attacker to generate and therefore know the set of all R values in all Systems.

TABLE 2

Summary of Symbolic Nomenclature

| | Triple DES | Blowfish | RC5 | IDEA | Random Sequences | HMAC-MD5 | HMAC-SHA1 | HMAC-RIPEMD160 |
|---|---|---|---|---|---|---|---|---|
| Free of patents | • | • | | | • | • | • | • |
| Random key generation | | | | | | • | • | • |
| Can be exported from the USA | | | | | • | • | • | • |
| Fast | | • | | | | • | • | • |
| Preferred Key Size (bits) for use in this application | 168[a] | 128 | 128 | 128 | 512 | 128 | 160 | 160 |
| Block size (bits) | 64 | 64 | 64 | 64 | 256 | 512 | 512 | 512 |
| Cryptanalysis Attack-Free (apart from weak keys) | • | • | | | • | | • | • |
| Output size given input size N | $\geq N$ | $\geq N$ | $\geq N$ | $\geq N$ | 128 | 128 | 160 | 160 |
| Low storage requirements | | | | | | • | • | • |
| Low silicon complexity | | | | | | • | • | • |
| NSA designed | | • | | | | | • | |

[a]Only gives protection equivalent to 112-bit DES

Having a different R seed in each authentication chip means that the first R will be both random and unpredictable across all chips. The question therefore arises of how to generate subsequent R values in each chip.

The base case is not to change R at all. Consequently R and $F_{K1}[R]$ will be the same for each call to Random[ ]. If they are the same, then $F_{K1}[R]$ can be a constant rather than calculated. An attacker could then use a single valid authentication chip to generate a valid lookup table, and then use that lookup table in a clone chip programmed especially for that System. A constant R is not secure.

The simplest conceptual method of changing R is to increment it by 1. Since R is random to begin with, the values across differing systems are still likely to be random. However given an initial R, all subsequent R values can be determined directly (there is no need to iterate 10,000 times—R will take on values from $R_0$ to $R_0+10000$). An incrementing R is immune to the earlier attack on a constant R. Since R is always different, there is no way to construct a lookup table for the particular System without wasting as many real authentication chips as the clone chip will replace.

Rather than increment using an adder, another way of changing R is to implement it as an LFSR (Linear Feedback Shift Register). This has the advantage of an attacker not being able to directly determine the range of R for a particular System, since an LFSR value-domain is determined by sequential access. To determine which values a given initial R will generate, an attacker must iterate through the possibilities and enumerate them. The advantages of a changing R are also evident in the LFSR solution. Since R is always different, there is no way to construct a lookup table for the particular System without using up as many real authentication chips as the clone chip will replace (and only for that System). There is therefore no advantage in having a more complex function to change R. Regardless of the function, it will always be possible for an attacker to iterate through the lifetime set of values in a simulation. The primary security lies in the initial randomness of R. Using an LFSR to change R simply has the advantage of not being restricted to a consecutive numeric range (i.e. knowing R, $R_N$ cannot be directly calculated; an attacker must iterate through the LFSR N times).

Figure 9:
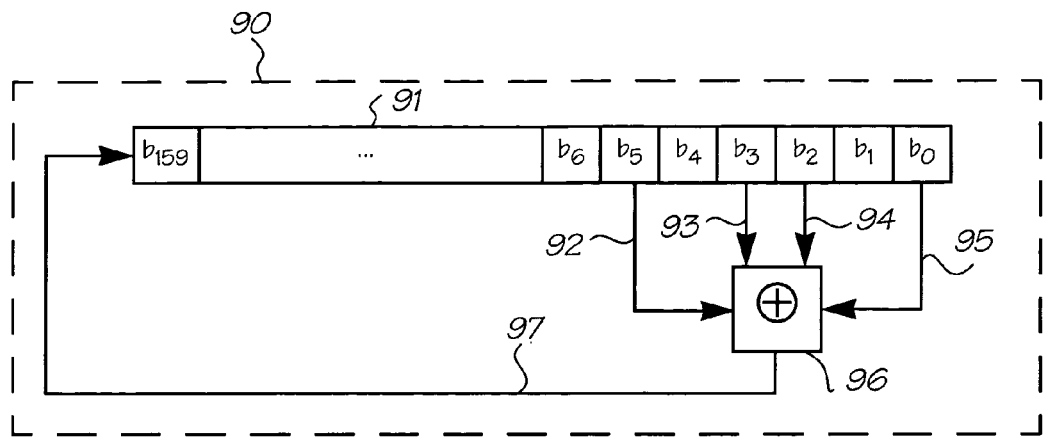
FIG. 9 is a block diagram of a 160-bit maximal-period LFSR random number generator.

The Random number generator 90 within the authentication chip is therefore an LFSR 91 with 160 bits and four taps 92, 93, 94 and 95, which feed an exclusive-OR gate 96, which in turn feeds back 97 to $bit_{159}$. Tap selection of the 160 bits for a maximal-period LFSR (i.e. the LFSR will cycle through all $2^{160}-1$ states, 0 is not a valid state) yields $bit_5$, $bit_3$, $bit_2$, and $bit_0$ [78], as shown in FIG. 9. The example LFSR is sparse, in that not many bits are used for feedback (only 4 out of 160 bits are used), although maximal-period LFSR with more taps offers slightly more protection against differential cryptanalysis on collected R, F[R] pairs.

The 160-bit seed value for R can be any random number except 0, since an LFSR filled with 0s will produce a never-ending stream of 0s.

Since the LFSR described is a maximal-period LFSR, all 160 bits can be used directly as R.

After each successful call to Test, the random number (R) must be advanced by XORing bits 0, 2, 3, and 5, and shifting the result into the high order bit. The new R and corresponding $F_{K1}[R]$ can be retrieved on the next call to Random.

5.5 Holding Out Against Logical Attacks

Protocol C1 is the authentication scheme used by the authentication chip. As such, it should be resistant to defeat by logical means. While the effect of various types of attacks on Protocol C1 have been mentioned in discussion, this section details each type of attack in turn with reference to Protocol C1.

5.5.1 Brute Force Attack

A brute force attack is guaranteed to break Protocol C1 (or in fact, any protocol). However the length of the key means that the time for an attacker to perform a brute force attack is too long to be worth the effort.

An attacker only needs to break $K_2$ to build a clone authentication chip. $K_1$ is merely present to strengthen $K_2$ against other forms of attack. A brute force attack on $K_2$ must therefore break a 160-bit key.

An attack against $K_2$ requires a maximum of $2^{160}$ attempts, with a 50% chance of finding the key after only $2^{159}$ attempts. Assuming an array of a trillion processors, each running one million tests per second, $2^{159}$ ($7.3 \times 10^{47}$) tests takes $2.3 \times 10^{22}$ years, which is longer than the total lifetime of the universe. There are around 100 million personal computers in the world. Even if these were all connected in an attack (e.g. via the Internet), this number is still 10,000 times smaller than the trillion-processor attack described. Further, if the manufacture of one trillion processors becomes a possibility in the age of nanocomputers, the time taken to obtain the key is still longer than the total lifetime of the universe.

5.5.2 Guessing the Key Attack

It is theoretically possible that an attacker can simply "guess the key". In fact, given enough time, and trying every possible number, an attacker will obtain the key. This is identical to the brute force attack described above, where $2^{159}$ attempts must be made before a 50% chance of success is obtained.

The chances of someone simply guessing the key on the first try is $2^{160}$. For comparison, the chance of someone winning the top prize in a U.S. state lottery and being killed by lightning in the same day is only 1 in $2^{61}$ [78]. The chance of someone guessing the authentication chip key on the first go is 1 in $2^{160}$, which is comparable to two people choosing exactly the same atoms from a choice of all the atoms in the Earth i.e. extremely unlikely.

5.5.3 Quantum Computer Attack

To break $K_2$, a quantum computer containing 160 qubits embedded in an appropriate algorithm must be built. As described in Section 3.8.1.7, an attack against a 160-bit key is not feasible. An outside estimate of the possibility of quantum computers is that 50 qubits may be achievable within 50 years. Even using a 50 qubit quantum computer, $2^{110}$ tests are required to crack a 160 bit key. Assuming an array of 1 billion 50 qubit quantum computers, each able to try $2^{50}$ keys in 1 microsecond (beyond the current wildest estimates) finding the key would take an average of 18 billion years.

5.5.4 Ciphertext Only Attack

An attacker can launch a ciphertext only attack on $K_1$ by monitoring calls to Random and Read, and on $K_2$ by monitoring calls to Read and Test. However, given that all these calls also reveal the plaintext as well as the hashed form of the plaintext, the attack would be transformed into a stronger form of attack—a known plaintext attack.

5.5.5 Known Plaintext Attack

It is easy to connect a logic analyzer to the connection between the System and the authentication chip, and thereby monitor the flow of data. This flow of data results in known plaintext and the hashed form of the plaintext, which can therefore be used to launch a known plaintext attack against both $K_1$ and $K_2$.

To launch an attack against $K_1$, multiple calls to Random and Test must be made (with the call to Test being successful, and therefore requiring a call to Read on a valid chip). This is straightforward, requiring the attacker to have both a system authentication chip and a consumable authentication chip. For each $K_1$: X, $S_{K1}$[X] pair revealed, a $K_2$: Y, $S_{K2}$[Y] pair is also revealed. The attacker must collect these pairs for further analysis.

The question arises of how many pairs must be collected for a meaningful attack to be launched with this data. An example of an attack that requires collection of data for statistical analysis is differential cryptanalysis (see Section 5.5.13). However, there are no known attacks against SHA-1 or HMAC-SHA1 [7][56][78], so there is no use for the collected data at this time.

Note that Protocol C3 is not susceptible to a plaintext attack.

5.5.6 Chosen Plaintext Attacks

Given that the cryptanalyst has the ability to modify subsequent chosen plaintexts based upon the results of previous experiments, $K_2$ is open to a partial form of the adaptive chosen plaintext attack, which is certainly a stronger form of attack than a simple chosen plaintext attack.

A chosen plaintext attack is not possible against $K_1$, since there is no way for a caller to modify R, which used as input to the Random function (the only function to provide the result of hashing with $K_1$).

5.5.7 Adaptive Chosen Plaintext Attacks

This kind of attack is not possible against $K_1$, since $K_1$ is not susceptible to chosen plaintext attacks. However, a partial form of this attack is possible against $K_2$, especially since both System and consumables are typically available to the attacker (the System may not be available to the attacker in some instances, such as a specific car).

The HMAC construct provides security against all forms of chosen plaintext attacks [7]. This is primarily because the HMAC construct has two secret input variables (the result of the original hash, and the secret key). Thus finding collisions in the hash function itself when the input variable is secret is even harder than finding collisions in the plain hash function. This is because the former requires direct access to SHA-1 (not permitted in Protocol C1) in order to generate pairs of input/output from SHA-1.

The only values that can be collected by an attacker are HMAC[R] and HMAC[R|M]. These are not attacks against the SHA-1 hash function itself, and reduce the attack to a differential cryptanalysis attack (see Section 5.5.13), examining statistical differences between collected data. Given that there is no differential cryptanalysis attack known against SHA-1 or HMAC, Protocol C1 is resistant to the adaptive chosen plaintext attacks. Note that Protocol C3 is not susceptible to this attack.

5.5.8 Purposeful Error Attack

An attacker can only launch a purposeful error attack on the Test and Read functions, since these are the only functions that validate input against the keys.

With both the Test and Read functions, a 0 value is produced if an error is found in the input—no further information is given. In addition, the time taken to produce the 0 result is independent of the input, giving the attacker no information about which bit(s) were wrong.

A purposeful error attack is therefore fruitless.

5.5.9 Chaining Attack

Any form of chaining attack assumes that the message to be hashed is over several blocks, or the input variables can somehow be set. The HMAC-SHA1 algorithm used by Protocol C1 only ever hashes a single 512-bit block at a time. Consequently chaining attacks are not possible against Protocol C1.

5.5.10 Birthday Attack

The strongest attack known against HMAC is the birthday attack, based on the frequency of collisions for the hash function [7][51]. However this is totally impractical for minimally reasonable hash functions such as SHA-1. And the birthday attack is only possible when the attacker has control over the message that is hashed.

Protocol C1 uses hashing as a form of digital signature. The System sends a number that must be incorporated into the response from a valid authentication chip. Since the authentication chip must respond with HMAC[R|M], but has no control over the input value R, the birthday attack is not possible. This is because the message has effectively already been generated and signed. An attacker must instead search for a collision message that hashes to the same value (analogous to finding one person who shares your birthday).

The clone chip must therefore attempt to find a new value $R_2$ such that the hash of $R_2$ and a chosen $M_2$ yields the same hash value as H[R|M]. However the System authentication chip does not reveal the correct hash value (the Test function only returns 1 or 0 depending on whether the hash value is correct). Therefore the only way of finding out the correct hash value (in order to find a collision) is to interrogate a real authentication chip. But to find the correct value means to update M, and since the decrement-only parts of M are one-way, and the read-only parts of M cannot be changed, a clone consumable would have to update a real consumable before attempting to find a collision. The alternative is a brute force attack search on the Test function to find a success (requiring each clone consumable to have access to a System consumable). A brute force search, as described above, takes longer than the lifetime of the universe, in this case, per authentication.

Due to the fact that a timely gathering of a hash value implies a real consumable must be decremented, there is no point for a clone consumable to launch this kind of attack.

5.5.11 Substitution with a Complete Lookup Table

The random number seed in each System is 160 bits. The worst case situation for an authentication chip is that no state data is changed. Consequently there is a constant value returned as M. However a clone chip must still return $S_{K2}$[R|M], which is a 160 bit value.

Assuming a 160-bit lookup of a 160-bit result, this requires $2.9 \times 10^{49}$ bytes, or $2.6 \times 10^{37}$ terabytes, certainly more space than is feasible for the near future. This of course does not even take into account the method of collecting the values for the ROM. A complete lookup table is therefore completely impossible.

5.5.12 Substitution with a Sparse Lookup Table

A sparse lookup table is only feasible if the messages sent to the authentication chip are somehow predictable, rather than effectively random.

The random number R is seeded with an unknown random number, gathered from a naturally random event. There is no possibility for a clone manufacturer to know what the possible range of R is for all Systems, since each bit has an unrelated chance of being 1 or 0.

Since the range of R in all systems is unknown, it is not possible to build a sparse lookup table that can be used in all systems. The general sparse lookup table is therefore not a possible attack.

However, it is possible for a clone manufacturer to know what the range of R is for a given System. This can be accomplished by loading a LFSR with the current result from a call to a specific System authentication chip's Random function, and iterating some number of times into the future. If this is done, a special ROM can be built which will only contain the responses for that particular range of R, i.e. a ROM specifically for the consumables of that particular System. But the attacker still needs to place correct information in the ROM. The attacker will therefore need to find a valid authentication chip and call it for each of the values in R.

Suppose the clone authentication chip reports a full consumable, and then allows a single use before simulating loss of connection and insertion of a new full consumable. The clone consumable would therefore need to contain responses for authentication of a full consumable and authentication of a partially used consumable. The worst case ROM contains entries for full and partially used consumables for R over the lifetime of System. However, a valid authentication chip must be used to generate the information, and be partially used in the process. If a given System only produces n R-values, the sparse lookup-ROM required is 20n bytes (20=160/8) multiplied by the number of different values for M. The time taken to build the ROM depends on the amount of time enforced between calls to Read.

After all this, the clone manufacturer must rely on the consumer returning for a refill, since the cost of building the ROM in the first place consumes a single consumable. The clone manufacturer's business in such a situation is consequently in the refills.

The time and cost then, depends on the size of R and the number of different values for M that must be incorporated in the lookup. In addition, a custom clone consumable ROM must be built to match each and every System, and a different valid authentication chip must be used for each System (in order to provide the full and partially used data). The use of an authentication chip in a System must therefore be examined to determine whether or not this kind of attack is worthwhile for a clone manufacturer.

As an example, of a camera system that has about 10,000 prints in its lifetime. Assume it has a single Decrement Only value (number of prints remaining), and a delay of 1 second between calls to Read. In such a system, the sparse table will take about 3 hours to build, and consumes 100K. Remember that the construction of the ROM requires the consumption of a valid authentication chip, so any money charged must be worth more than a single consumable and the clone consumable combined. Thus it is not cost effective to perform this function for a single consumable (unless the clone consumable somehow contained the equivalent of multiple authentic consumables).

If a clone manufacturer is going to go to the trouble of building a custom ROM for each owner of a System, an easier approach would be to update System to completely ignore the authentication chip. For more information, see Section 10.2.4.

Consequently, this attack is possible as a per-System attack, and a decision must be made about the chance of this occurring for a given System/Consumable combination. The chance will depend on the cost of the consumable and authentication chips, the longevity of the consumable, the profit margin on the consumable, the time taken to generate the ROM, the size of the resultant ROM, and whether customers will come back to the clone manufacturer for refills that use the same clone chip etc.

5.5.13 Differential Cryptanalysis

Existing differential attacks are heavily dependent on the structure of S boxes, as used in DES and other similar algorithms. Although other algorithms such as HMAC-SHA1 used in Protocol C1 have no S boxes, an attacker can undertake a differential-like attack by undertaking statistical analysis of:

Minimal-difference inputs, and their corresponding outputs

Minimal-difference outputs, and their corresponding inputs

To launch an attack of this nature, sets of input/output pairs must be collected. The collection from Protocol C1 can be via known plaintext, or from a partially adaptive chosen plaintext attack. Obviously the latter, being chosen, will be more useful.

Hashing algorithms in general are designed to be resistant to differential analysis. SHA-1 in particular has been specifically strengthened, especially by the 80 word expansion (see Section 6) so that minimal differences in input will still produce outputs that vary in a larger number of bit positions (compared to 128 bit hash functions). In addition, the information collected is not a direct SHA-1 input/output set, due to the nature of the HMAC algorithm. The HMAC algorithm hashes a known value with an unknown value (the key), and the result of this hash is then rehashed with a separate unknown value. Since the attacker does not know the secret value, nor the result of the first hash, the inputs and outputs from SHA-1 are not known, making any differential attack extremely difficult.

There are no known differential attacks against SHA-1 or HMAC-SHA-1 [56][78]. Even if this does not change by the time Protocol C3 can be affordably included in an authentication chip, a move to the Protocol C3 will eliminate this attack, and is therefore attractive.

The following is a more detailed discussion of minimally different inputs and outputs from the authentication chip based on Protocol C1.

5.5.13.1 Minimal Difference Inputs

This is where an attacker takes a set of X, $S_K[X]$ values where the X values are minimally different, and examines the statistical differences between the outputs $S_K[X]$. The attack relies on X values that only differ by a minimal number of bits. The question then arises as to how to obtain minimally different X values in order to compare the $S_K[X]$ values.

$K_1$ With $K_1$, the attacker needs to statistically examine minimally different X, $S_{K1}[X]$ pairs. However the attacker cannot choose any X value and obtain a related $S_{K1}[X]$ value. Since X, $S_{K1}[X]$ pairs can only be generated by calling the Random function on a System authentication chip, the attacker must call Random multiple times, recording each observed pair in a table. A search must then be made through the observed values for enough minimally different X values to undertake a statistical analysis of the $S_{K1}$[X] values.

$K_2$ With $K_2$, the attacker needs to statistically examine minimally different X, $S_{K2}[X]$ pairs. The only way of generating X, $S_{K2}[X]$ pairs is via the Read function, which produces $S_{K2}[X]$ for a given Y, $S_{K1}[Y]$ pair, where X=Y|M. This means that Y and the changeable part of M can be chosen to a limited extent by an attacker. The amount of choice must therefore be limited as much as possible.

The first way of limiting an attacker's choice is to limit Y, since Read requires an input of the format Y, $S_{K1}[Y]$. Although a valid pair can be readily obtained from the Random function, it is a pair of Random's choosing. An attacker can only provide their own Y if they have obtained the appropriate pair from Random, or if they know $K_1$. Obtaining the appropriate pair from Random requires a brute force search. Knowing $K_1$ is only logically possible by performing cryptanalysis on pairs obtained from the Random function—effectively a known text attack. Although Random can only be called so many times per second, $K_1$ is common across System chips. Therefore known pairs can be generated in parallel.

The second way to limit an attacker's choice is to limit M, or at least the attacker's ability to choose M. The limiting of M is done by making some parts of M Read Only, yet different for each authentication chip, and other parts of M Decrement Only. The Read Only parts of M should ideally be different for each authentication chip, so could be information such as serial numbers, batch numbers, or random numbers. The Decrement Only parts of M mean that for an attacker to try a different M, they can only decrement those parts of M so many times—after the Decrement Only parts of M have been reduced to 0 those parts cannot be changed again. Obtaining a new authentication chip provides a new M, but the Read Only portions will be different from the previous authentication chip's Read Only portions, thus reducing an attacker's ability to choose M even further.

Consequently an attacker can only gain a limited number of chances at choosing values for Y and M.

5.5.13.2 Minimal Difference Outputs

This is where an attacker takes a set of X, $S_K[X]$ values where the $S_K[X]$ values are minimally different, and examines the statistical differences between the X values. The attack relies on $S_K[X]$ values that only differ by a minimal number of bits.

For both $K_1$ and $K_2$, there is no way for an attacker to generate an X value for a given $S_K[X]$. To do so would violate the fact that S is a one-way function (HMAC-SHA1). Consequently the only way for an attacker to mount an attack of this nature is to record all observed X, $S_K[X]$ pairs in a table. A search must then be made through the observed values for enough minimally different $S_K[X]$ values to undertake a statistical analysis of the X values. Given that this requires more work than a minimally different input attack (which is extremely limited due to the restriction on M and the choice of R), this attack is not fruitful.

5.5.14 Message Substitution Attacks

In order for this kind of attack to be carried out, a clone consumable must contain a real authentication chip, but one that is effectively reusable since it never gets decremented. The clone authentication chip would intercept messages, and substitute its own. However this attack does not give success to the attacker.

A clone authentication chip may choose not to pass on a Write command to the real authentication chip. However the subsequent Read command must return the correct response (as if the Write had succeeded). To return the correct response, the hash value must be known for the specific R and M. As described in the birthday attack section, an attacker can only determine the hash value by actually updating M in a real Chip, which the attacker does not want to do. Even changing the R sent by System does not help since the System authentication chip must match the R during a subsequent Test.

A Message substitution attack would therefore be unsuccessful. This is only true if System updates the amount of consumable remaining before it is used.

5.5.15 Reverse Engineering the Key Generator

If a pseudo-random number generator is used to generate keys, there is the potential for a clone manufacture to obtain the generator program or to deduce the random seed used. This was the way in which the security layer of the Netscape browser was initially broken [33].

5.5.16 Bypassing the Authentication Process

Protocol C1 requires the System to update the consumable state data before the consumable is used, and follow every write by a read (to authenticate the write). Thus each use of the consumable requires an authentication. If the System adheres to these two simple rules, a clone manufacturer will have to simulate authentication via a method above (such as sparse ROM lookup).

5.5.17 Reuse of Authentication Chips

As described above, Protocol C1 requires the System to update the consumable state data before the consumable is used, and follow every write by a read (to authenticate the write). Thus each use of the consumable requires an authentication.

If a consumable has been used up, then its authentication chip will have had the appropriate state-data values decremented to 0. The chip can therefore not be used in another consumable.

Note that this only holds true for authentication chips that hold Decrement-Only data items. If there is no state data decremented with each usage, there is nothing stopping the reuse of the chip. This is the basic difference between Presence-Only authentication and Consumable Lifetime authentication. Protocol C1 allows both.

The bottom line is that if a consumable has Decrement Only data items that are used by the System, the authentication chip cannot be reused without being completely reprogrammed by a valid programming station that has knowledge of the secret key.

5.5.18 Management Decision to Omit Authentication to Save Costs

Although not strictly an external attack, a decision to omit authentication in future Systems in order to save costs will have widely varying effects on different markets.

In the case of high volume consumables, it is essential to remember that it is very difficult to introduce authentication after the market has started, as systems requiring authenticated consumables will not work with older consumables still in circulation. Likewise, it is impractical to discontinue authentication at any stage, as older Systems will not work with the new, unauthenticated, consumables. In the second case, older Systems can be individually altered by replacing the System authentication chip by a simple chip that has the same programming interface, but whose Test function always succeeds. Of course the System may be programmed to test for an always-succeeding Test function, and shut down.

Without any form of protection, illegal cloning of high volume consumables is almost certain. However, with the patent and copyright protection, the probability of illegal cloning may be, say 50%. However, this is not the only loss possible. If a clone manufacturer were to introduce clone consumables which caused damage to the System (e.g. clogged nozzles in a printer due to poor quality ink), then the loss in market acceptance, and the expense of warranty repairs, may be significant.

In the case of a specialized pairing, such as a car/car-keys, or door/door-key, or some other similar situation, the omission of authentication in future systems is trivial and without repercussions. This is because the consumer is sold the entire set of System and Consumable authentication chips at the one time.

5.5.19 Garrote/Bribe Attack

This form of attack is only successful in one of two circumstances:

$K_1$, $K_2$, and R are already recorded by the chip-programmer, or the attacker can coerce future values of $K_1$, $K_2$, and R to be recorded.

If humans or computer systems external to the Programming Station do not know the keys, there is no amount of force or bribery that can reveal them. The programming of authentication chips, described in Section 9, (and in [85], which covers the process in more detail) is specifically designed to reduce this possibility.

The level of security against this kind of attack is ultimately a decision for the System/Consumable owner, to be made according to the desired level of service.

For example, a car company may wish to keep a record of all keys manufactured, so that a person can request a new key to be made for their car. However this allows the potential compromise of the entire key database, allowing an attacker to make keys for any of the manufacturer's existing cars. It does not allow an attacker to make keys for any new cars. Of course, the key database itself may also be encrypted with a further key that requires a certain number of people to combine their key portions together for access. If no record is kept of which key is used in a particular car, there is no way to make additional keys should one become lost. Thus an owner will have to replace his car's authentication chip and all his car-keys. This is not necessarily a bad situation.

By contrast, in a consumable such as a printer ink cartridge, the one key combination is used for all Systems and all consumables. Certainly if no backup of the keys is kept, there is no human with knowledge of the key, and therefore no attack is possible. However, a no-backup situation is not desirable for a consumable such as ink cartridges, since if the key is lost no more consumables can be made. The manufacturer should therefore keep a backup of the key information in several parts, where a certain number of people must together combine their portions to reveal the full key information. This may be required if case the chip programming station needs to be reloaded.

In any case, none of these attacks are against Protocol C1 itself, since no humans are involved in the authentication process. Instead, it is an attack against the programming stage of the chips. See Section 9 and [85] for more details.

6 HMAC-SHA1

The mechanism for authentication is the HMAC-SHA1 algorithm, acting on one of:

HMAC-SHA1 (R, $K_1$), or

HMAC-SHA1 (R|M, $K_2$)

This part examines the HMAC-SHA1 algorithm in greater detail than covered so far, and describes an optimization of the algorithm that requires fewer memory resources than the original definition.

6.1 HMAC

The HMAC algorithm is described in Section 3.6.4.1. In summary, given the following definitions:

H=the hash function (e.g. MD5 or SHA-1)

n=number of bits output from H (e.g. 160 for SHA-1, 128 bits for MD5)

M=the data to which the MAC function is to be applied

K=the secret key shared by the two parties ipad=0x36 repeated 64 times opad=0x5C repeated 64 times The HMAC algorithm is as follows:

1. Extend K to 64 bytes by appending 0x00 bytes to the end of K
2. XOR the 64 byte string created in (1) with ipad
3. Append data stream M to the 64 byte string created in (2)
4. Apply H to the stream generated in (3)
5. XOR the 64 byte string created in (1) with opad
6. Append the H result from (4) to the 64 byte string resulting from (5)
7. Apply H to the output of (6) and output the result Thus:

$$HMAC[M]=H[(K \oplus opad)|H[(K \oplus ipad)|M]]$$

HMAC-SHA1 algorithm is simply HMAC with H=SHA-1.

6.2 SHA-1

The SHA1 hashing algorithm is described in the context of other hashing algorithms in Section 3.6.3.3, and completely defined in [27]. The algorithm is summarized here.

Nine 32-bit constants are defined in Table 3. There are 5 constants used to initialize the chaining variables, and there are 4 additive constants.

TABLE 3

| Constants used in SHA-1 | | | |
|---|---|---|---|
| Initial Chaining Values | | Additive Constants | |
| h1 | 0x67452301 | y1 | 0x5A827999 |
| h2 | 0xEFCDAB89 | y2 | 0x6ED9EBA1 |
| h3 | 0x98BADCFE | y3 | 0x8F1BBCDC |
| h4 | 0x10325476 | y4 | 0xCA62C1D6 |
| h5 | 0xC3D2E1F0 | | |

Non-optimized SHA-1 requires a total of 2912 bits of data storage:

Five 32-bit chaining variables are defined: $H_1$, $H_2$, $H_3$, $H_4$ and $H_5$.

Five 32-bit working variables are defined: A, B, C, D, and E.

One 32-bit temporary variable is defined: t.

Eighty 32-bit temporary registers are defined: $X_{0-79}$.

The following functions are defined for SHA-1:

TABLE 4

| Functions used in SHA-1 | |
|---|---|
| Symbolic Nomenclature | Description |
| + | Addition modulo $2^{32}$ |
| X ◄ Y | Result of rotating X left through Y bit positions |
| f(X, Y, Z) | $(X \wedge Y) \vee (\neg X \wedge Z)$ |
| g(X, Y, Z) | $(X \wedge Y) \vee (X \wedge Z) \vee (Y \wedge Z)$ |
| h(X, Y, Z) | $X \oplus Y \oplus Z$ |

The hashing algorithm consists of firstly padding the input message to be a multiple of 512 bits and initializing the chaining variables$_{H1-5}$ with $h_{1-5}$. The padded message is then processed in 512-bit chunks, with the output hash value being the final 160-bit value given by the concatenation of the chaining variables: $H1|H_2|H_3|H_4|H_5$.

The steps of the SHA-1 algorithm are now examined in greater detail.

6.2.1 Step 1. Preprocessing

The first step of SHA-1 is to pad the input message to be a multiple of 512 bits as follows and to initialize the chaining variables.

TABLE 5

Steps to follow to preprocess the input message

| | |
|---|---|
| Pad the input message | Append a 1 bit to the message<br>Append 0 bits such that the length of the padded message is 64-bits short of a multiple of 512 bits.<br>Append a 64-bit value containing the length in bits of the original input message. Store the length as most significant bit through to least significant bit. |
| Initialize the chaining variables | $H_1 \leftarrow h_1, H_2 \leftarrow h_2, H_3 \leftarrow h_3, H_4 \leftarrow h_4,$<br>$H_5 \leftarrow h_5$ |

6.2.2 Step 2. Processing

The padded input message can now be processed.

We process the message in 512-bit blocks. Each 512-bit block is in the form of 16×32-bit words, referred to as InputWord$_{0-15}$.

TABLE 6

Steps to follow for each 512 bit block (InputWord$_{0-15}$)

| | |
|---|---|
| Copy the 512 input bits into $X_{0-15}$ | For j=0 to 15<br>$X_j$ = InputWord$_j$ |
| Expand $X_{0-15}$ into $X_{16-79}$ | For j=16 to 79<br>$X_j \leftarrow ((X_{j-3} \oplus X_{j-8} \oplus X_{j-14} \oplus X_{j-16}) \lll 1)$ |
| Initialize working variables | $A \leftarrow H_1, B \leftarrow H_2, C \leftarrow H_3, D \leftarrow H_4,$<br>$E \leftarrow H_5$ |
| Round 1 | For j=0 to 19<br>$t \leftarrow ((A \lll 5) + \mathbf{f}(B, C, D) + E + X_j + y_1)$<br>$E \leftarrow D, D \leftarrow C, C \leftarrow (B \lll 30),$<br>$B \leftarrow A, A \leftarrow t$ |
| Round 2 | For j=20 to 39<br>$t \leftarrow ((A \lll 5) + \mathbf{h}(B, C, D) + E + X_j + y_2)$<br>$E \leftarrow D, D \leftarrow C, C \leftarrow (B \lll 30),$<br>$B \leftarrow A, A \leftarrow t$ |
| Round 3 | For j=40 to 59 t<br>$t \leftarrow ((A \lll 5) + \mathbf{g}(B, C, D) + E + X_j + y_3)$<br>$E \leftarrow D, D \leftarrow C, C \leftarrow (B \lll 30),$<br>$B \leftarrow A, A \leftarrow t$ |
| Round 4 | For j=60 to 79<br>$t \leftarrow ((A \lll 5) + \mathbf{h}(B, C, D) + E + X_j + y_4)$<br>$E \leftarrow D, D \leftarrow C, C \leftarrow (B \lll 30),$<br>$B \leftarrow A, A \leftarrow t$ |
| Update chaining variables | $H_1 \leftarrow {}_{H1} + A, H_2 \leftarrow H_2 + B,$<br>$H_3 \leftarrow H_3 + C, H_4 \leftarrow H_4 + D,$<br>$H_5 \leftarrow H_5 + E$ |

The bold text is to emphasize the differences between each round.

6.2.3 Step 3. Completion

After all the 512-bit blocks of the padded input message have been processed, the output hash value is the final 160-bit value given by: $H_1|H_2|H_3|H_4|H_5$.

6.2.4 Optimization for Hardware Implementation

The SHA-1 Step 2 procedure is not optimized for hardware. In particular, the 80 temporary 32-bit registers use up valuable silicon on a hardware implementation. This section describes an optimization to the SHA-1 algorithm that only uses 16 temporary registers. The reduction in silicon is from 2560 bits down to 512 bits, a saving of over 2000 bits. It may not be important in some applications, but in the authentication chip storage space must be reduced where possible.

The optimization is based on the fact that although the original 16-word message block is expanded into an 80-word message block, the 80 words are not updated during the algorithm. In addition, the words rely on the previous 16 words only, and hence the expanded words can be calculated on-the-fly during processing, as long as we keep 16 words for the backward references. We require rotating counters to keep track of which register we are up to using, but the effect is to save a large amount of storage.

Rather than index X by a single value j, we use a 5 bit counter to count through the iterations. This can be achieved by initializing a 5-bit register with either 16 or 20, and decrementing it until it reaches 0. In order to update the 16 temporary variables as if they were 80, we require 4 indexes, each a 4-bit register. All 4 indexes increment (with wraparound) during the course of the algorithm.

TABLE 7

Optimised Steps to follow for each 512 bit block (InputWord$_{0-15}$)

| | |
|---|---|
| Initialize working variables | $A \leftarrow H_1, B \leftarrow H_2, C \leftarrow H_3, D \leftarrow H_4, E \leftarrow H_5$<br>$N_1 \leftarrow 13, N_2 \leftarrow 8, N_3 \leftarrow 2, N_4 \leftarrow 0$ |
| Round 0<br>Copy the 512 input bits into $X_{0-15}$ | Do 16 times<br>$X_{N4}$ = InputWordN$_4$<br>$[\Uparrow N_1, \Uparrow N_2, \Uparrow N_3]_{optional} \Uparrow N_4$ |
| Round 1A | Do 16 times<br>$t \leftarrow ((A \lll 5) + \mathbf{f}(B, C, D) + E + X_{N4} + y_1) [\Uparrow N_1, \Uparrow N_2,$<br>$\Uparrow N_3]_{optional} \Uparrow N_4$<br>$E \leftarrow D, D \leftarrow C, C \leftarrow (B \lll 30), B \leftarrow A, A \leftarrow t$ |
| Round 1B | Do 4 times<br>$X_{N4} \leftarrow ((XN1 \oplus XN2 \oplus XN3 \oplus XN4) \lll 1)$<br>$t \leftarrow ((A \lll 5) + \mathbf{f}(B, C, D) + E + X_{N4} + y_1)$<br>$\Uparrow N_1, \Uparrow N_2, \Uparrow N_3, \Uparrow N_4$<br>$E \leftarrow D, D \leftarrow C, C \leftarrow (B \lll 30), B \leftarrow A, A \leftarrow t$ |
| Round 2 | Do 20 times<br>$X_{N4} \leftarrow ((XN1 \oplus XN2 \oplus XN3 \oplus XN4) \lll 1)$<br>$t \leftarrow ((A \lll 5) + \mathbf{h}(B, C, D) + E + XN4 + y_2)$<br>$\Uparrow N_1, \Uparrow N_2, \Uparrow N_3, \Uparrow N_4$<br>$E \leftarrow D, D \leftarrow C, C \leftarrow (B \lll 30), B \leftarrow A, A \leftarrow t$ |
| Round 3 | Do 20 times<br>$XN4 \leftarrow ((XN1 \oplus XN2 \oplus XN3 \oplus XN4) \lll 1)$<br>$t \leftarrow ((A \lll 5) + \mathbf{g}(B, C, D) + E + X_{N4} + y_3)$<br>$\Uparrow N_1, \Uparrow N_2, \Uparrow N_3, \Uparrow N_4$<br>$E \leftarrow D, D \leftarrow C, C \leftarrow (B \lll 30), B \leftarrow A, A \leftarrow t$ |
| Round 4 | Do 20 times<br>$X_{N4} \leftarrow ((XN1 \oplus XN2 \oplus XN3 \oplus XN4) \lll 1)$<br>$t \leftarrow ((A \lll 5) + \mathbf{h}(B, C, D) + E + X_{N4} + y_4)$<br>$\Uparrow N_1, \Uparrow N_2, \Uparrow N_3, \Uparrow N_4$<br>$E \leftarrow D, D \leftarrow C, C \leftarrow (B \lll 30), B \leftarrow A, A \leftarrow t$ |
| Update chaining variables | $H_1 \leftarrow H_1 + A, H_2 \leftarrow H_2 + B,$<br>$H_3 \leftarrow H_3 + C, H_4 \leftarrow H_4 + D,$<br>$H_5 \leftarrow H_5 + E$ |

The bold text is to emphasize the differences between each round.

The incrementing of $N_1$, $N_2$, and $N_3$ during Rounds 0 and 1A is optional. A software implementation would not increment them, since it takes time, and at the end of the 16 times through the loop, all 4 counters will be their original values. Designers of hardware may wish to increment all 4 counters together to save on control logic. Round 0 can be completely omitted if the caller loads the 512 bits of $X_{0-15}$.

6.3 HMAC-SHA1

In the authentication chip implementation, the HMAC-SHA1 unit only ever performs hashing on two types of inputs: on R using $K_1$ and on R|M using $K_2$. Since the inputs are two constant lengths, rather than have HMAC and SHA-1 as separate entities on chip, they can be combined and the hardware optimized. The HMAC-SHA1 test cases described by Cheng and Glenn [14] will remain valid.

The padding of messages in SHA-1 Step 1 (a 1 bit, a string of 0 bits, and the length of the message) is necessary to ensure that different messages will not look the same after padding. Since we only deal with 2 types of messages, our padding can be constant 0s.

In addition, the optimized version of the SHA-1 algorithm is used, where only 16 32-bit words are used for temporary storage. These 16 registers are loaded directly by the optimized HMAC-SHA1 hardware.

The Nine 32-bit constants $h_{1-5}$ and $y_{1-4}$ are still required, although the fact that they are constants is an advantage for hardware implementation.

Hardware optimized HMAC-SHA-1 requires a total of 1024 bits of data storage:

Five 32-bit chaining variables are defined: $H_1$, $H_2$, $H_3$, $H_4$ and $H_5$.

Five 32-bit working variables are defined: A, B, C, D, and E.

Five 32-bit variables for temporary storage and final result: $Buff160_{1-5}$

One 32 bit temporary variable is defined: t.

Sixteen 32-bit temporary registers are defined: $X_{0-15}$.

The following two sections describe the steps for the two types of calls to HMAC-SHA1.

6.3.1 H[R, $K_1$]

In the case of producing the keyed hash of R using $K_1$, the original input message R is a constant length of 160 bits. We can therefore take advantage of this fact during processing. Rather than load $X_{0-15}$ during the first part of the SHA-1 algorithm, we load $X_{0-15}$ directly, and thereby omit Round 0 of the optimized Process Block (Step 2) of SHA-1. The pseudocode takes on the following steps:

TABLE 8

Calculating H[R, $K_1$]

| Step | Description | Action |
|---|---|---|
| 1 | Process K ⊕ ipad | $X_{0-4} \leftarrow K_1 \oplus$ 0x363636... |
| 2 | | $X_{5-15} \leftarrow$ 0x363636... |
| 3 | | $H_{1-5} \leftarrow h_{1-5}$ |
| 4 | | Process Block |
| 5 | Process R | $X_{0-4} \leftarrow R$ |
| 6 | | $X_{5-15} \leftarrow 0$ |
| 7 | | Process Block |
| 8 | | $Buff160_{1-5} \leftarrow H_{1-5}$ |
| 9 | Process K ⊕ opad | $X_{0-4} \leftarrow K_1 \oplus$ 0x5C5C5C... |
| 10 | | $X_{5-15} \leftarrow$ 0x5C5C5C... |
| 11 | | $H_{1-5} \leftarrow h_{1-5}$ |
| 12 | | Process Block |
| 13 | Process previous H[x] | $X_{0-4} \leftarrow$ Result |
| 14 | | $X_{5-15} \leftarrow 0$ |
| 15 | | Process Block |
| 16 | Get results | $Buff160_{1-5} \leftarrow H_{1-5}$ |

6.3.2 G[R|M, $K_2$]

In the case of producing the keyed hash of R|M using $K_2$, the original input message is a constant length of 416 (256+ 160) bits. We can therefore take advantage of this fact during processing. Rather than load $X_{0-15}$ during the first part of the SHA-1 algorithm, we load $X_{0-15}$ directly, and thereby omit Round 0 of the optimized Process Block (Step 2) of SHA-1. The pseudocode takes on the following steps:

TABLE 9

Calculating H[R | M, $K_2$]

| Step | Description | Action |
|---|---|---|
| 1 | Process K ⊕ ipad | $X_{0-4} \leftarrow K_2 \oplus$ 0x363636... |
| 2 | | $X_{5-15} \leftarrow$ 0x363636... |
| 3 | | $H_{1-5} \leftarrow h_{1-5}$ |
| 4 | | Process Block |
| 5 | Process R | M | $X_{0-4} \leftarrow R$ |
| 6 | | $X_{5-12} \leftarrow M$ |
| 7 | | $X_{13-15} \leftarrow 0$ |
| 8 | | Process Block |
| 9 | | Temp $\leftarrow H_{1-5}$ |
| 10 | Process K ⊕ opad | $X_{0-4} \leftarrow K_2 \oplus$ 0x5C5C5C... |
| 11 | | $X_{5-15} \leftarrow$ 0x5C5C5C... |
| 12 | | $H_{1-5} \leftarrow h_{1-5}$ |
| 13 | | Process Block |
| 14 | Process previous H[x] | $X_{0-4} \leftarrow$ Temp |
| 15 | | $X_{5-15} \leftarrow 0$ |
| 16 | | Process Block |
| 17 | Get results | Result $\leftarrow H_{1-5}$ |

7 Data Storage Integrity

Each authentication chip contains some non-volatile memory in order to hold the variables required by Authentication Protocol C1.

The following non-volatile variables are defined:

TABLE 10

Non volatile variables required by Protocol C1

| Variable Name | Size (in bits) | Description |
|---|---|---|
| M[0..15] | 256 | 16 words (each 16 bits) containing state data such as serial numbers, media remaining etc. |
| $K_1$ | 160 | Key used to transform R during authentication |
| $K_2$ | 160 | Key used to transform M during authentication |
| R | 160 | Current random number |
| AccessMode[0..15] | 32 | The 16 sets of 2-bit AccessMode values for M[n] |
| Checksum | 160 | $S[K_1 | K_2]$. Used to verify that $K_1$ and $K_2$ have not been tampered with. |
| MinTicks | 32 | The minimum number of clock ticks between calls to key-based functions |
| SIWritten | 1 | If set, the secret key information ($K_1$, $K_2$, and R) has been written to the chip. If clear, the secret information has not been written yet. |
| IsTrusted | 1 | If set, the RND and TST functions can be called, but RD and WR functions cannot be called. If clear, the RND and TST functions cannot be called, but RD and WR functions can be called. |
| Total bits | 962 | |

Note that if these variables are in Flash memory, it is not a simple matter to write a new value to replace the old. The memory must be erased first, and then the appropriate bits set. This has an effect on the algorithms used to change Flash memory based variables. For example, Flash memory cannot easily be used as shift registers. To update a Flash memory variable by a general operation, it is necessary to follow these steps:

1. Read the entire N bit value into a general purpose register;
2. Perform the operation on the general purpose register;
3. Erase the Flash memory corresponding to the variable; and 4. Set the bits of the Flash memory location based on the bits set in the general-purpose register.

A RESET of the authentication chip has no effect on these non-volatile variables.

7.1 M and Accessmode

Variables M[0] through M[15] are used to hold consumable state data, such as serial numbers, batch numbers, and amount of consumable remaining. Each M[n] register is 16 bits, making the entire M vector 256 bits (32 bytes). Clients cannot read from or written to individual M[n] variables. Instead, the entire vector, referred to as M, is read or written in a single logical access.

M can be read using the RD (read) command, and written to via the WR (write) command. The commands only succeed if $K_1$ and $K_2$ are both defined (SIWritten=1) and the authentication chip is a consumable non-trusted chip (IsTrusted=0).

Although M may contain a number of different data types, they differ only in their write permissions. Each data type can always be read. Once in client memory, the 256 bits can be interpreted in any way chosen by the client. The entire 256 bits of M are read at one time instead of in smaller amounts for reasons of security, as described in Section 5. The different write permissions are outlined in Table 11:

TABLE 11

Write Permissions

| Data Type | Access Mode |
|---|---|
| Read Only | Can never be written to |
| ReadWrite | Can always be written to |
| Decrement Only | Can only be written to if the new value is less than the old value. Decrement Only values are typically 16-bit or 32-bit values, but can be any multiple of 16 bits. |

To accomplish the protection required for writing, a 2-bit access mode value is defined for each M[n]. The following table defines the interpretation of the 2-bit access mode bit-pattern:

TABLE 12

| Bits | Op | Interpretation | Action taken during Write command |
|---|---|---|---|
| 00 | RW | ReadWrite | The new 16-bit value is always written to M[n]. |
| 01 | MSR | Decrement Only (Most Significant Region) | The new 16-bit value is only written to M[n] if it is less than the value currently in M[n]. This is used for access to the Most Significant 16 bits of a Decrement Only number. |
| 10 | NMSR | Decrement Only (Not the Most Significant Region) | The new 16-bit value is only written to M[n] if M[n+1] can also be written. The NMSR access mode allows multiple precision values of 32 bits and more (multiples of 16 bits) to decrement. |
| 11 | RO | Read Only | The new 16-bit value is ignored. M[n] is left unchanged. |

The 16 sets of access mode bits for the 16 M[n] registers are gathered together in a single 32-bit AccessMode register. The 32 bits of the AccessMode register correspond to M[n] with n as follows:

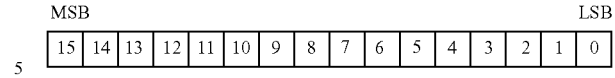

Each 2-bit value is stored in hi/lo format. Consequently, if M[0-5] were access mode MSR, with M[6-15] access mode RO, the 32-bit AccessMode register would be:

11-11-11-11-11-11-11-11-11-11-01-01-01-01-01-01

During execution of a WR (write) command, AccessMode [n] is examined for each M[n], and a decision made as to whether the new M[n] value will replace the old.

The AccessMode register is set using the authentication chip's SAM (Set Access Mode) command.

Note that the Decrement Only comparison is unsigned, so any Decrement Only values that require negative ranges must be shifted into a positive range. For example, a consumable with a Decrement Only data item range of −50 to 50 must have the range shifted to be 0 to 100. The System must then interpret the range 0 to 100 as being −50 to 50. Note that most instances of Decrement Only ranges are N to 0, so there is no range shift required.

For Decrement Only data items, arrange the data in order from most significant to least significant 16-bit quantities from M[n] onward. The access mode for the most significant 16 bits (stored in M[n]) should be set to MSR. The remaining registers (M[n+1], M[n+2] etc.) should have their access modes set to NMSR.

If erroneously set to NMSR, with no associated MSR region, each NMSR region will be considered independently instead of being a multi-precision comparison.

Examples of allocating M and AccessMode bits can be found in Section 9.

7.2 $K_1$ $K_1$ is the 160-bit secret key used to transform R during the authentication protocol. $K_1$ is programmed along with $K_2$, Checksum and R with the authentication chip's SSI (Set Secret Information) command. Since $K_1$ must be kept secret, clients cannot directly read $K_1$.

The commands that make use of $K_1$ are RND and RD. RND returns a pair R, $SK_1[R]$ where R is a random number, while RD requires an X, $S_{K1}[X]$ pair as input.

$K_1$ is used in the keyed one-way hash function HMAC-SHA1. As such it should be programmed with a physically generated random number, gathered from a physically random phenomenon. $K_1$ must NOT be generated with a computer-run random number generator. The security of the authentication chips depends on $K_1$, $K_2$ and R being generated in a way that is not deterministic. For example, to set $K_1$, a person can toss a fair coin 160 times, recording heads as 1, and tails as 0.

$K_1$ is automatically cleared to 0 upon execution of a CLR command. It can only be programmed to a non-zero value by the SSI command.

7.3 $K_2$ $K_2$ is the 160-bit secret key used to transform M|R during the authentication protocol. $K_2$ is programmed along with $K_1$, Checksum and R with the authentication chip's SSI (Set Secret Information) command. Since $K_2$ must be kept secret, clients cannot directly read $K_2$.

The commands that make use of $K_2$ are RD and TST. RD returns a pair M, $S_{K2}[M|X]$ where X was passed in as one of the parameters to the RD function. TST requires an M, $S_{K2}$[M|R] pair as input, where R was obtained from the authentication chip's RND function.

$K_2$ is used in the keyed one-way hash function HMAC-SHA1. As such it should be programmed with a physically generated random number, gathered from a physically random phenomenon. $K_2$ must NOT be generated with a computer-run random number generator. The security of the authentication chips depends on $K_1$, $K_2$ and R being generated in a way that is not deterministic. For example, to set $K_2$, a person can toss a fair coin 160 times, recording heads as 1, and tails as 0.

$K_2$ is automatically cleared to 0 upon execution of a CLR command. It can only be programmed to a non-zero value by the SSI command.

7.4 Checksum

The Checksum register is a 160-bit number used to verify that $K_1$ and $K_2$ have not been altered by an attacker. Checksum is programmed along with $K_1$, $K_2$ and R with the authentication chip's SSI (Set Secret Information) command. Since Checksum must be kept secret, clients cannot directly read Checksum.

The commands that make use of Checksum are any that make use of $K_1$ and $K_2$—namely RND, RD, and TST. Before calculating any revealed value based on $K_1$ or $K_2$ a checksum on $K_1$ and $K_2$ is calculated and compared against the stored Checksum value. The checksum calculated is the 160-bit value $S[K_1|K_2]$.

If $K_1$ and $K_2$ are stored as multilevel Flash memory, the full multi-level Flash values should be used for the verification process instead of just the subset used to represent valid values.

Checksum is automatically cleared to 0 upon execution of a CLR command. It can only be programmed to a non-zero value by the SSI command.

7.5 R and IsTrusted

R is a 160-bit random number seed that is programmed along with $K_1$ and $K_2$ with the SSI (Set Secret Information) command. R does not have to be kept secret, since it is given freely to callers via the RND command. However R must be changed only by the authentication chip, and not set to any chosen value by a caller.

R is used during the TST command to ensure that the R from the previous call to RND was used to generate the $S_{K2}$[M|R] value in the non-trusted authentication chip (ChipA). Both RND and TST are only used in trusted authentication chips (ChipT).

IsTrusted is a 1-bit flag register that determines whether or not the authentication chip is a trusted chip (ChipT):

If the IsTrusted bit is set, the chip is considered to be a trusted chip, and hence clients can call RND and TST functions (but not RD or WR).

If the IsTrusted bit is clear, the chip is not considered to be trusted. Therefore RND and TST functions cannot be called (but RD and WR functions can be called instead). System never needs to call RND or TST on the consumable (since a clone chip would simply return 1 to a function such as TST, and a constant value for RND).

The IsTrusted bit has the added advantage of reducing the number of available R, $S_{K1}$[R] pairs obtainable by an attacker, yet still maintain the integrity of the Authentication protocol. To obtain valid R, $S_{K1}$[R] pairs, an attacker requires a System authentication chip, which is more expensive and less readily available than the consumables.

Both R and the IsTrusted bit are cleared to 0 by the CLR command. They are both written to by the issuing of the SSI command. The IsTrusted bit can only set by storing a non-zero seed value in R via the SSI command (R must be non-zero to be a valid LFSR state, so this is quite reasonable). R is changed via a 160-bit maximal period LFSR with taps on bits 0, 2, 3, and 5, and is changed only by a successful call to TST (where 1 is returned).

Authentication chips destined to be trusted Chips used in Systems (ChipT) should have their IsTrusted bit set during programming, and authentication chips used in Consumables (ChipA) should have their IsTrusted bit kept clear (by storing 0 in R via the SSI command during programming). There is no command to read or write the IsTrusted bit directly.

The logical security of the authentication chip does not only rely upon the randomness of $K_1$ and $K_2$ and the strength of the HMAC-SHA1 algorithm. To prevent an attacker from building a sparse lookup table, the security of the authentication chip also depends on the range of R over the lifetime of all Systems. What this means is that an attacker must not be able to deduce what values of R there are in produced and future Systems. As such R should be programmed with a physically generated random number, gathered from a physically random phenomenon. R must NOT be generated with a computer-run random number generator. The generation of R must not be deterministic. For example, to generate an R for use in a trusted System chip, a person can toss a fair coin 160 times, recording heads as 1, and tails as 0.0 is the only non-valid initial value for a trusted R is 0 (or the IsTrusted bit will not be set).

7.6 SIWritten

The SIWritten (Secret Information Written) 1-bit register holds the status of the secret information stored within the authentication chip. The secret information is $K_1$, $K_2$ and R.

A client cannot directly access the SIWritten bit. Instead, it is cleared via the CLR command (which also clears $K_1$, $K_2$ and R). When the authentication chip is programmed with secret keys and random number seed using the SSI command (regardless of the value written), the SIWritten bit is set automatically. Although R is strictly not secret, it must be written together with $K_1$ and $K_2$ to ensure that an attacker cannot generate their own random number seed in order to obtain chosen R, $S_{K1}$[R] pairs.

The SIWritten status bit is used by all functions that access $K_1$, $K_2$, or R. If the SIWritten bit is clear, then calls to RD, WR, RND, and TST are interpreted as calls to CLR.

7.7 MinTicks

There are two mechanisms for preventing an attacker from generating multiple calls to TST and RD functions in a short period of time. The first is a clock limiting hardware component that prevents the internal clock from operating at a speed more than a particular maximum (e.g. 10 MHz). The second mechanism is the 32-bit MinTicks register, which is used to specify the minimum number of clock ticks that must elapse between calls to key-based functions.

The MinTicks variable is cleared to 0 via the CLR command. Bits can then be set via the SMT (Set MinTicks) command. The input parameter to SMT contains the bit pattern that represents which bits of MinTicks are to be set. The practical effect is that an attacker can only increase the value in MinTicks (since the SMT function only sets bits). In addition, there is no function provided to allow a caller to read the current value of this register.

The value of MinTicks depends on the operating clock speed and the notion of what constitutes a reasonable time between key-based function calls (application specific). The duration of a single tick depends on the operating clock speed. This is the maximum of the input clock speed and the authentication chip's clock-limiting hardware. For example, the authentication chip's clock-limiting hardware may be set at 10 MHz (it is not changeable), but the input clock is 1 MHz. In this case, the value of 1 tick is based on 1 MHz, not 10 MHz. If the input clock was 20 MHz instead of 1 MHz, the value of 1 tick is based on 10 MHz (since the clock speed is limited to 10 MHz).

Once the duration of a tick is known, the MinTicks value can to be set. The value for MinTicks is the minimum number of ticks required to pass between calls to the key-based RD and TST functions. The value is a real-time number, and divided by the length of an operating tick.

Suppose the input clock speed matches the maximum clock speed of 10 MHz. If we want a minimum of 1 second between calls to key based functions, the value for MinTicks is set to 10,000,000. Consider an attacker attempting to collect X, $S_{K1}[X]$ pairs by calling RND, RD and TST multiple times. If the MinTicks value is set such that the amount of time between calls to TST is 1 second, then each pair requires 1 second to generate. To generate $2^{25}$ pairs (only requiring 1.25 GB of storage), an attacker requires more than 1 year. An attack requiring $2^{64}$ pairs would require $5.84 \times 10^{11}$ years using a single chip, or 584 years if 1 billion chips were used, making such an attack completely impractical in terms of time (not to mention the storage requirements!).

With regards to $K_1$, it should be noted that the MinTicks variable only slows down an attacker and causes the attack to cost more since it does not stop an attacker using multiple System chips in parallel. However MinTicks does make an attack on $K_2$ more difficult, since each consumable has a different M (part of M is random read-only data). In order to launch a differential attack, minimally different inputs are required, and this can only be achieved with a single consumable (containing an effectively constant part of M). Minimally different inputs require the attacker to use a single chip, and MinTicks causes the use of a single chip to be slowed down. If it takes a year just to get the data to start searching for values to begin a differential attack this increases the cost of attack and reduces the effective market time of a clone consumable.

8 Authentication Chip Commands

The System communicates with the authentication chips via a simple operation command set. This section details the actual commands and parameters necessary for implementation of Protocol C1.

The authentication chip is defined here as communicating to System via a serial interface as a minimum implementation. It is a trivial matter to define an equivalent chip that operates over a wider interface (such as 8, 16 or 32 bits).

Each command is defined by 3-bit opcode. The interpretation of the opcode can depend on the current value of the IsTrusted bit and the current value of the IsWritten bit.

The following operations are defined:

TABLE 13

Authentication Chip Commands

| Op[a] | T[b] | W[c] | Mn[d] | Input | Output | Description |
|---|---|---|---|---|---|---|
| 000 | — | — | CLR | — | — | Clear |
| 001 | 0 | 0 | SSI | [160, 160, 160, 160] | — | Set Secret Information |
| 010 | 0 | 1 | RD | [160, 160] | [256, 160] | Read M securely |
| 010 | 1 | 1 | RND | — | [160, 160] | Random |
| 011 | 0 | 1 | WR | [256] | — | Write M |

TABLE 13-continued

Authentication Chip Commands

| Op[a] | T[b] | W[c] | Mn[d] | Input | Output | Description |
|---|---|---|---|---|---|---|
| 011 | 1 | 1 | TST | [256, 160] | [1] | Test |
| 100 | 0 | 1 | SAM | [32] | [32] | Set Access Mode |
| 101 | — | 1 | GIT | — | [1] | Get IsTrusted |
| 110 | — | 1 | SMT | [32] | — | Set MinTicks |

[a]Opcode
[b]IsTrusted value
[c]IsWritten value
[d]Mnemonic
[e][n] = numer of bis requied for parameter Any command not defined in this table (for example opcode 111) is interpreted as NOP (No Operation). This is is regardless of the IsTrusted or IsWritten value, and includes any opcode other than SSI when IsWritten=0.

Note that the opcodes for RD and RND are the same, as are the opcodes for WR and TST. The actual command run upon receipt of the opcode will depend on the current value of the IsTrusted bit (as long as IsWritten is 1). Where the IsTrusted bit is clear, RD and WR functions will be called. Where the IsTrusted bit is set, RND and TST functions will be called. The two sets of commands are mutually exclusive between trusted and non-trusted authentication chips, and the same opcodes enforces this relationship.

Each of the commands is examined in detail in the subsequent sections. Note that some algorithms are specifically designed because Flash memory is assumed for the implementation of non-volatile variables.

8.1 CLR—CLEAR
Input: None
Output: None
Changes: All

The CLR (Clear) Command is designed to completely erase the contents of all authentication chip memory. This includes all keys and secret information, access mode bits, and state data. After the execution of the CLR command, an authentication chip will be in a programmable state, just as if it had been freshly manufactured. It can be reprogrammed with a new key and reused.

A CLR command consists of simply the CLR command opcode. Since the authentication chip is serial, this must be transferred one bit at a time. The bit order is LSB to MSB for each command component. A CLR command is therefore sent as bits 0-2 of the CLR opcode. A total of 3 bits are transferred.

The CLR command can be called directly at any time.

The order of erasure is important. SIWritten must be cleared first, to disable further calls to key access functions (such as RND, TST, RD and WR). If the AccessMode bits are cleared before SIWritten, an attacker could remove power at some point after they have been cleared, and manipulate M, thereby have a better chance of retrieving the secret information with a partial chosen text attack.

The CLR command is implemented with the following steps:

TABLE 14

Steps in CLR command

| Step | Action |
|---|---|
| 1 | Erase SIWritten, IsTrusted, $K_1$, $K_2$, R, M |
| 2 | Erase AccessMode, MinTicks |

Once the chip has been cleared it is ready for reprogramming and reuse. A blank chip is of no use to an attacker, since although they can create any value for M (M can be read from and written to), key-based functions will not provide any information as $K_1$ and $K_2$ will be incorrect.

It is not necessary to consume any input parameter bits if CLR is called for any opcode other than CLR. An attacker will simply have to RESET the chip. The reason for calling CLR is to ensure that all secret information has been destroyed, making the chip useless to an attacker.

8.2 SSI—Set Secret Information

Input: $K_1$, $K_2$, Checksum, R=[160 bits, 160 bits, 160 bits, 160 bits]
Output: None
Changes: $K_1$, $K_2$, Checksum, R, SIWritten, IsTrusted The SSI (Set Secret Information) command is used to load the $K_1$, $K_2$ and associated Checksum variable, the R variable, and to set SIWritten and IsTrusted flags for later calls to RND, TST, RD and WR commands. An SSI command consists of the SSI command opcode followed by the secret information to be stored in the $K_1$, $K_2$, Checksum and R registers. Since the authentication chip is serial, this must be transferred one bit at a time. The bit order is LSB to MSB for each command component. An SSI command is therefore sent as: bits 0-2 of the SSI opcode, followed by bits 0-159 of the new value for $K_1$, bits 0-159 of the new value for $K_2$, bits 0-159 of the new value for Checksum, and finally bits 0-159 of the seed value for R. A total of 643 bits are transferred.

The $K_1$, $K_2$, Checksum, R, SIWritten, and IsTrusted registers are all cleared to 0 with a CLR command. They can only be set using the SSI command.

The SSI command uses the flag SIWritten to store the fact that data has been loaded into $K_1$, $K_2$, Checksum and R. If the SIWritten and IsTrusted flags are clear (this is the case after a CLR instruction), then $K_1$, $K_2$, Checksum and R are loaded with the new values. If either flag is set, an attempted call to SSI results in a CLR command being executed, since only an attacker or an erroneous client would attempt to change keys or the random seed without calling CLR first.

The SSI command also sets the IsTrusted flag depending on the value for R. If R=0, then the chip is considered untrustworthy, and therefore IsTrusted remains at 0. If R≠0, then the chip is considered trustworthy, and therefore IsTrusted is set to 1. Note that the setting of the IsTrusted bit only occurs during the SSI command.

If an authentication chip is to be reused, the CLR command must be called first. The keys can then be safely reprogrammed with an SSI command, and fresh state information loaded into M using the SAM and WR commands.

The SSI command is implemented with the following steps:

TABLE 15

Steps in SSI command

| Step | Action |
|---|---|
| 1 | CLR |
| 2 | $K_1$ ← Read 160 bits from client |
| 3 | $K_2$ ← Read 160 bits from client |
| 4 | Checksum ← Read 160 bits from client |
| 5 | R ← Read 160 bits from client |
| 6 | IF (R ≠ 0) |
|   | IsTrusted ← 1 |
| 7 | SIWritten ← 1 |

8.3 RD—Read

Input: X, $S_{K1}[X]$=[160 bits, 160 bits]
Output: M, $S_{K2}[X|M]$=[256 bits, 160 bits]
Changes: R The RD (Read) command is used to securely read the entire 256 bits of state data (M) from a non-trusted authentication chip. Only a valid authentication chip will respond correctly to the RD request. The output bits from the RD command can be fed as the input bits to the TST command on a trusted authentication chip for verification, with the first 256 bits (M) stored for later use if (as we hope) TST returns 1.

Since the authentication chip is serial, the command and input parameters must be transferred one bit at a time. The bit order is LSB to MSB for each command component. A RD command is therefore: bits 0-2 of the RD opcode, followed by bits 0-159 of X, and bits 0-159 of $S_{K1}[X]$. 323 bits are transferred in total. X and $S_{K1}[X]$ are obtained by calling the trusted authentication chip's RND command. The 320 bits output by the trusted chip's RND command can therefore be fed directly into the non-trusted chip's RD command, with no need for these bits to be stored by System.

The RD command can only be used when the following conditions have been met:

SIWritten=1 indicating that $K_1$, $K_2$, Checksum and R have been set up via the SSI command; and IsTrusted=0 indicating the chip is not trusted since it is not permitted to generate random number sequences;.

In addition, calls to RD must wait for the MinTicksRemaining register to reach 0. Once it has done so, the register is reloaded with MinTicks to ensure that a minimum time will elapse between calls to RD.

Once MinTicksRemaining has been reloaded with MinTicks, the RD command verifies that the keys have not been tampered with. This is accomplished by internally generating $S[K_1|K_2]$ and comparing against Checksum. This generation and comparison must take the same amount of time regardless of whether the keys are correct or not. If the times are not the same, an attacker can gain information about which bits are incorrect. If the internal verification fails, the CLR function is called to clear all the key information and effectively destroy the chip. If $K_1$ and $K_2$ are stored as multilevel Flash memory, the full multi-level Flash values should be used for the verification process instead of just the subset used to represent valid values. For example, if 2-bit multi-level Flash is used, $K_1$ and $K_2$ are effectively 320 bits each instead of 160 for a total of 640 bits.

Once the internal keys are known to be safe, the RD command checks to see if the input parameters are valid. This is accomplished by internally generating $S_{K1}[X]$ for the input X, and then comparing the result against the input $S_{K1}[X]$. This generation and comparison must take the same amount of time regardless of whether the input parameters are correct or not. If the times are not the same, an attacker can gain information about which bits of $S_{K1}[X]$ are incorrect.

The only way for the input parameters to be invalid is an erroneous System (passing the wrong bits), a case of the wrong consumable in the wrong System, a bad trusted chip (generating bad pairs), or an attack on the authentication chip. A constant value of 0 is returned when the input parameters are wrong. The time taken for 0 to be returned must be the same for all bad inputs so that attackers can learn nothing about what was invalid.

Once the input parameters have been verified the output values are calculated. The 256 bit content of M are transferred in the following order: bits 0-15 of M[0], bits 0-15 of M[1], through to bits 0-15 of M[15]. $S_{K2}[X|M]$ is calculated and output as bits 0-159.

The R register is used to store the X value during the validation of the X, $SK_1[X]$ pair. This is because RND and RD are mutually exclusive.

The RD command is implemented with the following steps:

TABLE 16

Steps in RD command

| Step | Action |
|---|---|
| 1 | IF (MinTicksRemaining ≠ 0) GOTO 1 |
| 2 | MinTicksRemaining ← MinTicks |
| 3 | Hash ← Calculate $S_{K1}[K_1 \mid K_2]$ |
| 4 | OK ← (Hash = Checksum) Note that this operation must take constant time so an attacker cannot determine anything about the validity of particular bits of Hash. |
| 5 | IF (¬OK) GOTO CLR |
| 6 | R ← Read 160 bits from client |
| 7 | Hash ← Calculate $S_{K1}[R]$ |
| 8 | OK ← (Hash = next 160 bits from client) Note that this operation must take constant time so an attacker cannot determine how much of their guess is correct. |
| 9 | IF (OK) Output 256 bits of M to client ELSE Output 256 bits of 0 to client |
| 10 | Hash ← Calculate $S_{K2}[R \mid M]$ |
| 11 | IF (OK) Output 160 bits of Hash to client ELSE Output 160 bits of 0 to client |

8.4 RND—Random

Input: None
Output: R, $S_{K1}[R]$=[160 bits, 160 bits]
Changes: None

The RND (Random) command is used by a client to obtain a valid R, $S_{K1}[R]$ pair for use in a subsequent authentication via the RD and TST commands. Since there are no input parameters, an RND command is therefore simply bits 0-2 of the RND opcode.

The RND command can only be used when the following conditions have been met:

SIWritten=1 indicating that $K_1$, $K_2$, Checksum and R have been set up via the SSI command; and
IsTrusted=1 indicating the chip is permitted to generate random number sequences.

RND returns both R and $S_{K1}[R]$ to the caller.

The 288-bit output of the RND command can be fed straight into the non-trusted chip's RD command as the input parameters. There is no need for the client to store them at all, since they are not required again. However the TST command will only succeed if the random number passed into the RD command was obtained first from the RND command.

If a caller only calls RND multiple times, the same R, $S_{K1}[R]$ pair will be returned each time. R will only advance to the next random number in the sequence after a successful call to TST. See TST for more information.

Before returning any information, the RND command checks to ensure that the keys have not been tampered with by calculating $S[K_1 \mid K_2]$ and comparing against Checksum. If the keys have been tampered with the checksum will fail and CLR is called to erase any key information. If $K_1$ and $K_2$ are stored as multilevel Flash memory, the full multi-level Flash values should be used for the verification process instead of just the subset used to represent valid values. For example, if 2-bit multi-level Flash is used, $K_1$ and $K_2$ are effectively 320 bits each instead of 160 for a total of 640 bits The RND command is implemented with the following steps:

TABLE 17

Steps in RND command

| Step | Action |
|---|---|
| 1 | Hash ← Calculate $S_{K1}[K_1 \mid K_2]$ |
| 2 | OK ← (Hash = Checksum) Note that this operation must take constant time so an attacker cannot determine anything about the validity of particular bits of Hash. |
| 3 | IF (¬OK) GOTO CLR |
| 4 | Output 160 bits of R to client |
| 5 | Hash ← Calculate $S_{K1}[R]$ |
| 6 | Output 160 bits of Hash to client |

8.5 TST—Test

Input: X, $S_{K2}[R \mid X]$=[256 bits, 160 bits]
Output: 1 or 0=[1 bit]
Changes: M, R and MinTicksRemaining (or all registers if attack detected).

The TST (Test) command is used to authenticate a read of M from a non-trusted authentication chip. The TST (Test) command consists of the TST command opcode followed by input parameters: X and $S_{K2}[R \mid X]$. Since the authentication chip is serial, this must be transferred one bit at a time. The bit order is LSB to MSB for each command component.

A TST command is therefore: bits 0-2 of the TST opcode, followed by bits 0-255 of M, bits 0-159 of $S_{K2}[R \mid M]$. 419 bits are transferred in total. Since the last 416 input bits are obtained as the output bits from a RD command to a non-trusted authentication chip, the entire data does not even have to be stored by the client. Instead, the bits can be passed directly to the trusted authentication chip's TST command. Only the 256 bits of M should be kept from a RD command.

The TST command can only be used when the following conditions have been met:

SIWritten=1 indicating that $K_1$, $K_2$, Checksum and R have been set up via the SSI command; and
IsTrusted=1 indicating the chip is permitted to generate random number sequences.

In addition, calls to TST must wait for the MinTicksRemaining register to reach 0. Once it has done so, the register is reloaded with MinTicks to ensure that a minimum time will elapse between calls to TST.

The TST command then checks to make sure that the keys have not ben tampered. This is accomplished by internally generating $S[K_1 \mid K_2]$ and comparing against Checksum. This generation and comparison must take the same amount of time regardless of whether the keys are correct or not. If the times are not the same, an attacker can gain information about which bits are incorrect. If the internal verification fails, the CLR function is called to clear all the key information and effectively destroy the chip. If $K_1$ and $K_2$ are stored as multi-level Flash memory, the full multi-level Flash values should be used for the verification process instead of just the subset used to represent valid values. For example, if 2-bit multi-level Flash is used, $K_1$ and $K_2$ are effectively 320 bits each instead of 160 for a total of 640 bits TST causes the internal M value to be replaced by the input M value. $S_{K2}[M \mid R]$ is then calculated, and compared against the 160 bit input hash value. A single output bit is produced: 1 if they are the same, and 0 if they are different. The use of the internal M value is to save space on chip, and is the reason why RD and TST are mutually exclusive commands. If the output bit is 1, R is updated to be the next random number in the sequence. This forces the caller to use a new random number each time RD and TST are called.

The resultant output bit is not output until the entire input string has been compared, so that the time to evaluate the comparison in the TST function is always the same. Thus no attacker can compare execution times or number of bits processed before an output is given.

The next random number is generated from R using a 160-bit maximal period LFSR (tap selections on bits 5, 3, 2, and 0). The initial 160-bit value for R is set up via the SSI command, and can be any random number except 0 (an LFSR filled with 0s will produce a never-ending stream of 0s). R is transformed by XORing bits 0, 2, 3, and 5 together, and shifting all 160 bits right 1 bit using the XOR result as the input bit to $b_{159}$. The new R will be returned on the next call to RND. The LFSR is the same as that shown in FIG. 9.

Note that the time taken for 0 to be returned from TST must be the same for all bad inputs so that attackers can learn nothing about what was invalid about the input.

The TST command is implemented with the following steps:

TABLE 18

Steps in TST command

| Step | Action |
|---|---|
| 1 | IF (MinTicksRemaining ≠ 0)<br>GOTO 1 |
| 2 | MinTicksRemaining ← MinTicks |
| 3 | Hash ← Calculate $S_{K1}[K_1 \mid K_2]$ |
| 4 | OK ← (Hash = Checksum)<br>Note that this operation must take constant time so an attacker cannot determine anything about the validity of particular bits of Hash |
| 5 | IF ((¬OK) OR (R = 0))<br>GOTO CLR |
| 6 | M ← Read 256 bits from client |
| 7 | Hash ← Calculate $S_{K2}[R \mid M]$ |
| 8 | Hash ¨ (Hash = next 160 bits from client)<br>Note that this operation must take constant time so an attacker cannot determine how much of their guess is correct. |
| 9 | IF (OK)<br>Temp ← R<br>Erase ← R<br>Advance TEMP via LFSR<br>R ← Temp |
| 10 | Output 1 bit of OK to client |

Note that we can't simply advance R directly in Step 9 since R is Flash memory, and must be erased in order for any set bit to become 0. If power is removed from the authentication chip during Step 9 after erasing the old value of R, but before the new value for R has been written, then R will be erased but not reprogrammed. We therefore have the situation of IsTrusted=1, yet R=0, a situation only possible due to an attacker. Step 5 detects this event (as well as the check of $K_1$ and $K_2$), and takes action if the attack is detected.

The problem can be avoided by having a second 160-bit Flash register for R and a Validity Bit, toggled after the new value has been loaded. It has not been included in this implementation for reasons of space, but if chip space allows it, an extra 160-bit Flash register would be useful for this purpose.

8.6 WR—Write

Input: $M_{new}$=[256 bits]

Output: None

Changes: M

A WR (Write) command is used to update the writable parts of M containing authentication chip state data. The WR command by itself is not secure. It must be followed by an authenticated read of M (via a RD command) to ensure that the change was made as specified.

The WR command is called by passing the WR command opcode followed by the new 256 bits of data to be written to M. Since the authentication chip is serial, the new value for M must be transferred one bit at a time. The bit order is LSB to MSB for each command component. A WR command is therefore: bits 0-2 of the WR opcode, followed by bits 0-15 of M[0], bits 0-15 of M[1], through to bits 0-15 of M[15]. 259 bits are transferred in total.

The WR command can only be used when SIWritten=1, indicating that $K_1$, $K_2$, Checksum and R have been set up via the SSI command (if SIWritten is 0, then $K_1$, $K_2$, Checksum and R have not been setup yet, and the CLR command is called instead).

The ability to write to a specific M[n] is governed by the corresponding Access Mode bits as stored in the AccessMode register. The AccessMode bits can be set using the SAM command.

When writing the new value to M[n] the fact that M[n] is Flash memory must be taken into account. All the bits of M[n] must be erased, and then the appropriate bits set. Since these two steps occur on different cycles, it leaves the possibility of attack open. An attacker can remove power after erasure, but before programming with the new value. However, there is no advantage to an attacker in doing this:

A Read/Write M[n] changed to 0 by this means is of no advantage since the attacker could have written any value using the WR command anyway.

A Read Only M[n] changed to 0 by this means allows an additional known text pair (where the M[n] is 0 instead of the original value). For future use M[n] values, they are already 0, so no information is given.

A Decrement Only M[n] changed to 0 simply speeds up the time in which the consumable is used up. It does not give any new information to an attacker that using the consumable would give.

The WR command is implemented with the following steps:

TABLE 19

Steps in WR command

| Step | Action |
|---|---|
| 1 | DecEncountered ← 0<br>EqEncountered ← 0<br>n ← 15 |
| 2 | Temp ← Read 16 bits from client |
| 3 | AM ← AccessMode[¬n]<br>Compare to the previous value |
| 5 | LT ← (Temp < M[¬n])[comparison is unsigned]<br>EQ ← (Temp = M[¬n]) |
| 6 | WE ← (AM = RW) ∨<br>((AM = MSR) ∧ LT) ∨<br>((AM = NMSR) Ÿ(DecEncountered / LT)) |
| 7 | DecEncountered ← ((AM = MSR) ∧ LT) ∨<br>((AM = NMSR) ∧ DecEncountered) ∨<br>((AM = NMSR) ∧ EqEncountered ∧ LT)<br>EqEncountered ← ((AM = MSR) ∧ EQ) ∨<br>((AM = NMSR) ∧ EqEncountered ∧ EQ)<br>Advance to the next Access Mode set and write the new M[¬n] if applicable |
| 8 | IF (WE)<br>Erase M[¬n]<br>M[¬n] ← Temp |
| 9 | ⇓n |
| 10 | IF (n ≠ 0)<br>GOTO 2 |

8.7 SAM—Set AccessMode

Input: AccessMode$_{new}$=[32 bits]
Output: AccessMode=[32 bits]
Changes: AccessMode The SAM (Set Access Mode) command is used to set the 32 bits of the AccessMode register, and is only available for use in consumable authentication chips (where the IsTrusted flag=0).

The SAM command is called by passing the SAM command opcode followed by a 32-bit value that is used to set bits in the AccessMode register. Since the authentication chip is serial, the data must be transferred one bit at a time. The bit order is LSB to MSB for each command component. A SAM command is therefore: bits 0-2 of the SAM opcode, followed by bits 0-31 of bits to be set in AccessMode. 35 bits are transferred in total.

The AccessMode register is only cleared to 0 upon execution of a CLR command. Since an access mode of 00 indicates an access mode of RW (read/write), not setting any AccessMode bits after a CLR means that all of M can be read from and written to.

The SAM command only sets bits in the AccessMode register. Consequently a client can change the access mode bits for M[n] from RW to RO (read only) by setting the appropriate bits in a 32-bit word, and calling SAM with that 32-bit value as the input parameter. This allows the programming of the access mode bits at different times, perhaps at different stages of the manufacturing process. For example, the read only random data can be written to during the initial key programming stage, while allowing a second programming stage for items such as consumable serial numbers.

Since the SAM command only sets bits, the effect is to allow the access mode bits corresponding to M[n] to progress from RW to either MSR, NMSR, or RO. It should be noted that an access mode of MSR can be changed to RO, but this would not help an attacker, since the authentication of M after a write to a doctored authentication chip would detect that the write was not successful and hence abort the operation. The setting of bits corresponds to the way that Flash memory works best.

The only way to clear bits in the AccessMode register, for example to change a Decrement Only M[n] to be Read/Write, is to use the CLR command. The CLR command not only erases (clears) the AccessMode register, but also clears the keys and all of M.

Thus the AccessMode[n] bits corresponding to M[n] can only usefully be changed once between CLR commands.

The SAM command returns the new value of the AccessMode register (after the appropriate bits have been set due to the input parameter). By calling SAM with an input parameter of 0, AccessMode will not be changed, and therefore the current value of AccessMode will be returned to the caller.

The SAM command is implemented with the following steps:

TABLE 20

Steps in SAM command

| Step | Action |
|---|---|
| 1 | Temp ← Read 32 bits from client |
| 2 | SetBits(AccessMode, Temp) |
| 3 | Output 32 bits of AccessMode to client |

8.8 GIT—Get IsTrusted

Input: None
Output: IsTrusted=[1 bit]
Changes: None

The GIT (Get IsTrusted) command is used to read the current value of the IsTrusted bit on the authentication chip. If the bit returned is 1, the authentication chip is a trusted System authentication chip. If the bit returned is 0, the authentication chip is a consumable authentication chip.

A GIT command consists of simply the GIT command opcode. Since the authentication chip is serial, this must be transferred one bit at a time. The bit order is LSB to MSB for each command component. A GIT command is therefore sent as bits 0-2 of the GIT opcode. A total of 3 bits are transferred.

The GIT command is implemented with the following step:

TABLE 21

Steps in GIT command

| Step | Action |
|---|---|
| 1 | Output IsTrusted bit to client |

8.9 SMT—Set MinTicks

Input: MinTicks$_{new}$=[32 bits]
Output: None
Changes: MinTicks

The SMT (Set MinTicks) command is used to set bits in the MinTicks register and hence define the minimum number of ticks that must pass in between calls to TST and RD. The SMT command is called by passing the SMT command opcode followed by a 32-bit value that is used to set bits in the MinTicks register. Since the authentication chip is serial, the data must be transferred one bit at a time. The bit order is LSB to MSB for each command component. An SMT command is therefore: bits 0-2 of the SMT opcode, followed by bits 0-31 of bits to be set in MinTicks. 35 bits are transferred in total.

The MinTicks register is only cleared to 0 upon execution of a CLR command. A value of 0 indicates that no ticks need to pass between calls to key-based functions. The functions may therefore be called as frequently as the clock speed limiting hardware allows the chip to run.

Since the SMT command only sets bits, the effect is to allow a client to set a value, and only increase the time delay if further calls are made. Setting a bit that is already set has no effect, and setting a bit that is clear only serves to slow the chip down further. The setting of bits corresponds to the way that Flash memory works best.

The only way to clear bits in the MinTicks register, for example to change a value of 10 ticks to a value of 4 ticks, is to use the CLR command. However the CLR command clears the MinTicks register to 0 as well as clearing all keys and M. It is therefore useless for an attacker.

Thus the MinTicks register can only usefully be changed once between CLR commands.

The SMT command is implemented with the following steps:

TABLE 22

Steps in SMT command

| Step | Action |
|---|---|
| 1 | Temp ← Read 32 bits from client |
| 2 | SetBits(MinTicks, Temp) |

9 Programming Authentication Chips

Authentication chips must be programmed with logically secure information in a physically secure environment. Consequently the programming procedures cover both logical and physical security.

Logical security is the process of ensuring that $K_1$, $K_2$, R, and the random M[n] values are generated by a physically random process, and not by a computer. It is also the process of ensuring that the order in which parts of the chip are programmed is the most logically secure.

Physical security is the process of ensuring that the programming station is physically secure, so that $K_1$ and $K_2$ remain secret, both during the key generation stage and during the lifetime of the storage of the keys. In addition, the programming station must be resistant to physical attempts to obtain or destroy the keys. The authentication chip has its own security mechanisms for ensuring that $K_1$, $K_2$, and Checksum are kept secret, but the Programming Station must also keep $K_1$ and $K_2$ safe. The physical security of the programming station is mentioned briefly here, but has an entire document of its own [85].

9.1 Overview

After manufacture, an authentication chip must be programmed before it can be used. In all chips values for $K_1$ and $K_2$ must be established. If the chip is destined to be a System authentication chip, the initial value for R must be determined. If the chip is destined to be a consumable authentication chip, R must be set to 0, and initial values for M and AccessMode must be set up.

The following stages are therefore identified:
0. Manufacture
1. Determine Interaction between Systems and Consumables
2. Determine Keys for Systems and Consumables
3. Determine MinTicks for Systems and Consumables
4. Program Keys, Random Seed, MinTicks and Unused M
5. Program State Data and Access Modes Once the consumable or system is no longer required, the attached authentication chip can be reused. This is easily accomplished by reprogrammed the chip starting at Stage 4 again.

Each of the stages is examined in the subsequent sections.

9.2 Stage 0: Manufacture

Although the manufacture of authentication chips is outlined in Section 10, a number of points can be made here.

The algorithms and chip process is not special, and requires no special security. Standard Flash processes are used.

At the end of the manufacturing stage, the authentication chips are tested by being programmed with particular test programs. There is no JTAG test mechanism.

A theft of authentication chips between the chip manufacturer and programming station would only provide the clone manufacturer with blank chips. This merely compromises the sale of authentication chips, not anything authenticated by authentication chips. Since the programming station is the only mechanism with consumable and system product keys, a clone manufacturer would not be able to program the chips with the correct key. Clone manufacturers would be able to program the blank chips for their own systems and consumables, but it would be difficult to place these items on the market without detection. In addition, a single theft would be difficult to base a business around.

9.3 Stage 1: Determine Interaction Between Systems and Consumables

The decision of what is a System and what is a Consumable needs to be determined before any authentication chips can be programmed. A decision needs to be made about which Consumables can be used in which Systems, since all connected Systems and Consumables must share the same key information. They also need to share state-data usage mechanisms even if some of the interpretations of that data have not yet been determined.

A simple example is that of a car and car-keys. The car itself is the System, and the car-keys are the consumables. There are several car-keys for each car, each containing the same key information as the specific car. However each car (System) would contain a different key (shared by its car-keys), since we don't want car-keys from one car working in another.

Another example is that of a photocopier that requires a particular toner cartridge. In simple terms the photocopier is the System, and the toner cartridge is the consumable. However the decision must be made as to what compatibility there is to be between cartridges and photocopiers. The decision has historically been made in terms of the physical packaging of the toner cartridge: certain cartridges will or won't fit in a new model photocopier based on the design decisions for that copier. When authentication chips are used, the components that must work together must share the same key information.

In addition, each type of consumable requires a different way of dividing M (the state data). Although the way in which M is used will vary from application to application, the method of allocating M[n] and AccessMode[n] will be the same:

Define the consumable state data for specific use

Set some M[n] registers aside for future use (if required). Set these to be 0 and Read Only. The value can be tested for in Systems to maintain compatibility.

Set the remaining M[n] registers (at least one, but it does not have to be M[15]) to be Read Only, with the contents of each M[n] completely random. This is to make it more difficult for a clone manufacturer to attack the authentication keys (see Section 5).

The following examples show ways in which the state data may be organized.

9.3.1 EXAMPLE 1

Suppose we have a car with associated car-keys. A 16-bit key number is more than enough to uniquely identify each car-key for a given car.

The 256 bits of M could be divided up as follows:

TABLE 23

Car's 256 M bits

| M[n] | Access | Description |
|---|---|---|
| 0 | RO | Key number (16 bits) |
| 1-4 | RO | Car engine number (64 bits) |
| 5-8 | RO | For future expansion = 0 (64 bits) |
| 9-15 | RO | Random bit data (112 bits) |

If the car manufacturer keeps all logical keys for all cars, it is a trivial matter to manufacture a new physical car-key for a given car should one be lost. The new car-key would contain a new Key Number in M[0], but have the same $K_1$ and $K_2$ as the car's authentication chip.

Car Systems could allow specific key numbers to be invalidated (for example if a key is lost). Such a system might require Key 0 (the master key) to be inserted first, then all valid keys, then Key 0 again. Only those valid keys would now work with the car. In the worst case, for example if all car-keys are lost, then a new set of logical keys could be generated for the car and its associated physical car-keys if desired.

The Car engine number would be used to tie the key to the particular car.

Future use data may include such things as rental information, such as driver/renter details.

9.3.2 EXAMPLE 2

Suppose we have a photocopier image unit which should be replaced every 100,000 copies. 32 bits are required to store the number of pages remaining.

The 256 bits of M could be divided up as follows:

TABLE 24

| Photocopier's 256 M bits | | |
| --- | --- | --- |
| M[n] | Access | Description |
| 0 | RO | Serial number (16 bits) |
| 1 | RO | Batch number (16 bits) |
| 2 | MSR | Page Count Remaining (32 bits, hi/lo) |
| 3 | NMSR | |
| 4-7 | RO | For future expansion = 0 (64 bits) |
| 8-15 | RO | Random bit data (128 bits) |

If a lower quality image unit is made that must be replaced after only 10,000 copies, the 32-bit page count can still be used for compatibility with existing photocopiers. This allows several consumable types to be used with the same system.

9.3.3 EXAMPLE 3

Consider a Polaroid camera consumable containing 25 photos. A 16-bit countdown is all that is required to store the number of photos remaining.

The 256 bits of M could be divided up as follows:

TABLE 25

| Camera 256 M bits | | |
| --- | --- | --- |
| M[n] | Access | Description |
| 0 | RO | Serial number (16 bits) |
| 1 | RO | Batch number (16 bits) |
| 2 | MSR | Photos Remaining (16 bits) |
| 3-6 | RO | For future expansion = 0 (64 bits) |
| 7-15 | RO | Random bit data (144 bits) |

The Photos Remaining value at M[2] allows a number of consumable types to be built for use with the same camera System. For example, a new consumable with 36 photos is trivial to program.

Suppose 2 years after the introduction of the camera, a new type of camera was introduced. It is able to use the old consumable, but also can process a new film type. M[3] can be used to define Film Type. Old film types would be 0, and the new film types would be some new value. New Systems can take advantage of this. Original systems would detect a non-zero value at M[3] and realize incompatibility with new film types. New Systems would understand the value of M[3] and so react appropriately. To maintain compatibility with the old consumable, the new consumable and System needs to have the same key information as the old one. To make a clean break with a new System and its own special consumables, a new key set would be required.

9.3.4 EXAMPLE 4

Consider a printer consumable containing 3 inks: cyan, magenta, and yellow. Each ink amount can be decremented separately.

The 256 bits of M could be divided up as follows:

TABLE 26

| Printer's 256 M bits | | |
| --- | --- | --- |
| M[n] | Access | Description |
| 0 | RO | Serial number (16 bits) |
| 1 | RO | Batch number (16 bits) |
| 2 | MSR | Cyan Remaining (32 bits, hi/lo) |
| 3 | NMSR | |
| 4 | MSR | Magenta Remaining (32 bits, hi/lo) |
| 5 | NMSR | |
| 6 | MSR | Yellow Remaining (32 bits, hi/lo) |
| 7 | NMSR | |
| 8-11 | RO | For future expansion = 0 (64 bits) |
| 12-15 | RO | Random bit data (64 bits) |

9.4 Stage 2: Determine Keys for Systems and Consumables

Once the decision has been made as to which Systems and consumables are to share the same keys, those keys must be defined. The values for $K_1$, $K_2$ and their corresponding Checksum must therefore be determined.

In most cases, $K_1$ and $K_2$ will be generated once for all time. All Systems and consumables that have to work together (both now and in the future) need to have the same $K_1$ and $K_2$ values. $K_1$ and $K_2$ must therefore be kept secret since the entire security mechanism for the System/Consumable combination is made void if the keys are compromised. If the keys are compromised, the damage depends on the number of systems and consumables, and the ease to which they can be reprogrammed with new non-compromised keys:

In the case of a photocopier with toner cartridges, the worst case is that a clone manufacturer could then manufacture their own authentication chips (or worse, buy them), program the chips with the known keys, and then insert them into their own consumables.

In the case of a car with car-keys, each car has a different set of keys. This leads to two possible general scenarios. The first is that after the car and car-keys are programmed with the keys, $K_1$ and $K_2$ are deleted so no record of their values are kept, meaning that there is no way to compromise $K_1$ and $K_2$. However no more car-keys can be made for that car without reprogramming the car's authentication chip. The second scenario is that the car manufacturer keeps $K_1$ and $K_2$, and new keys can be made for the car. A compromise of $K_1$ and $K_2$ means that someone could make a car-key specifically for a particular car.

The keys and random data used in the authentication chips must therefore be generated by a means that is non-deterministic (a completely computer generated pseudo-random number cannot be used because it is deterministic—knowledge of the generator's seed gives all future numbers). $K_1$ and $K_2$ should be generated by a physically random process, and not by a computer.

However, random bit generators based on natural sources of randomness are subject to influence by external factors and also to malfunction. It is imperative that such devices be tested periodically for statistical randomness.

A simple yet useful source of random numbers is the Lavarand® system from SGI [55]. This generator uses a digital camera to photograph six lava lamps every few minutes. Lava lamps contain chaotic turbulent systems. The resultant digital images are fed into an SHA-1 implementation that produces a 7-way hash, resulting in a 160-bit value from every 7th byte from the digitized image. These 7 sets of 160 bits total 140 bytes. The 140 byte value is fed into a BBS generator (see Section 3.6.2 for more information on the Blum-Blum-Shub generator) to position the start of the output bitstream. The output 160 bits from the BBS would be the key or the authentication chip.

An extreme example of a non-deterministic random process is someone flipping a coin 160 times for $K_1$ and 160 times for $K_2$ in a clean room. With each head or tail, a 1 or 0 is entered on a panel of a Key Programmer Device. The process must be undertaken with several observers (for verification) in silence (someone may have a hidden microphone). The point to be made is that secure data entry and storage is not as simple as it sounds. The physical security of the Key Programmer Device and accompanying Programming Station requires an entire document of its own [85].

Once keys $K_1$ and $K_2$ have been determined, and the checksum calculated, they must be kept for as long as authentication chips need to be made that use the key. In the first car/car-key scenario $K_1$ and $K_2$ are destroyed after a single System chip and a few consumable chips have been programmed. In the case of the photocopier/toner cartridge, $K_1$ and $K_2$ must be retained for as long as the toner-cartridges are being made for the photocopiers. The keys must be kept securely. See [85] for more information.

9.5 Stage 3: Determine MinTicks for Systems and Consumables

The value of MinTicks depends on the operating clock speed of the authentication chip (System specific) and the notion of what constitutes a reasonable time between RD or TST function calls (application specific). The duration of a single tick depends on the operating clock speed. This is the maximum of the input clock speed and the authentication chip's clock-limiting hardware. For example, the authentication chip's clock-limiting hardware may be set at 10 MHz (it is not changeable), but the input clock is 1 MHz. In this case, the value of 1 tick is based on 1 MHz, not 10 MHz. If the input clock was 20 MHz instead of 1 MHz, the value of 1 tick is based on 10 MHz (since the clock speed is limited to 10 MHz).

Once the duration of a tick is known, the MinTicks value can be set. The value for MinTicks is the minimum number of ticks required to pass between calls to RD or RND key-based functions.

Suppose the input clock speed matches the maximum clock speed of 10 MHz. If we want a minimum of 1 second between calls to TST, the value for MinTicks is set to 10,000,000. Even a value such as 2 seconds might be a completely reasonable value for a System such as a printer (one authentication per page, and one page produced every 2 or 3 seconds).

9.6 Stage 4: Program Keys, Random Seed, MinTicks and Unused M

Authentication chips are in an unknown state after manufacture. Alternatively, they have already been used in one consumable, and must be reprogrammed for use in another. Each authentication chip must be physically validated (to ensure it is not a Trojan horse authentication chip—see Section 10.2.20), cleared, and programmed with new keys and new state data.

Validation, clearing and subsequent programming of authentication chips must take place in a secure Programming Station environment. See [85] for more information about the physical nature of the programming environment. For this section, the Programming Station is considered physically secure.

9.6.1 Programming a Trusted System Authentication Chip

If the chip is to be a trusted System chip, a seed value for R must be generated. It must be a random number derived from a physically random process, and must not be 0. The following tasks must be undertaken, in the following order, and in a secure programming environment:
1. RESET the chip
2. CLR[ ]
3. Load R (160 bit register) with physically random data
4. SSI[$K_1$, $K_2$, Checksum, R]
5. SMT[MinTicks$_{System}$]

The authentication chip is now ready for insertion into a System. It has been completely programmed.

If the System authentication chips are stolen at this point, a clone manufacturer could use them to generate R, $F_{K1}[R]$ pairs in order to launch a known text attack on $K_1$, or to use for launching a partially chosen-text attack on $K_2$. This is no different to the purchase of a number of Systems, each containing a trusted authentication chip. The security relies on the strength of the Authentication protocols and the randomness of $K_1$ and $K_2$.

9.6.2 Programming a Non-Trusted Consumable Authentication Chip

If the chip is to be a non-trusted Consumable authentication chip, the programming is slightly different to that of the trusted System authentication chip. Firstly, the seed value for R must be 0. It must have additional programming for M and the AccessMode values. The future use M[n] must be programmed with 0, and the random M[n] must be programmed with random data. The following tasks must be undertaken, in the following order, and in a secure programming environment:
1. RESET the chip
2. CLR[ ]
3. Load R (160 bit register) with 0
4. SSI[$K_1$, $K_2$, Checksum, R]
5. Load X (256 bit register) with 0
6. Set bits in X corresponding to appropriate M[n] with physically random data
7. WR[X]
8. Load Y (32 bit register) with 0
9. Set bits in Y corresponding to appropriate M[n] with Read Only Access Modes
10. SAM[Y]
11. SMT[MinTicks$_{Consumable}$]

The non-trusted consumable chip is now ready to be programmed with the general state data.

If the authentication chips are stolen at this point, an attacker could perform a limited chosen text attack. In the best situation, parts of M are Read Only (0 and random data), with the remainder of M completely chosen by an attacker (via the WR command). A number of RD calls by an attacker obtains $F_{K2}[M|R]$ for a limited M. In the worst situation, M can be completely chosen by an attacker (since all 256 bits are used for state data). In both cases however, the attacker cannot choose any value for R since it is supplied by calls to RND from a System authentication chip. The only way to obtain a chosen R is by a brute force attack.

It should be noted that if Stages 4 and 5 are carried out on the same Programming Station (the preferred and ideal situation), authentication chips cannot be removed in between the stages. Hence there is no possibility of the authentication chips being stolen at this point. The decision to program the authentication chips at one or two times depends on the requirements of the System/Consumable manufacturer. This decision is examined more in Stage 5, and in [85].

9.7 Stage 5: Program State Data and Access Modes

This stage is only required for consumable authentication chips, since M and AccessMode registers cannot be altered on System authentication chips.

The future use and random values of M[n] have already been programmed in Stage 4. The remaining state data values need to be programmed and the associated Access Mode values need to be set. Bear in mind that the speed of this stage will be limited by the value stored in the MinTicks register.

This stage is separated from Stage 4 on account of the differences either in physical location or in time between where/when Stage 4 is performed, and where/when Stage 5 is performed. Ideally, Stages 4 and 5 are performed at the same time in the same Programming Station.

Stage 4 produces valid authentication chips, but does not load them with initial state values (other than 0). This is to allow the programming of the chips to coincide with production line runs of consumables. Although Stage 5 can be run multiple times, each time setting a different state data value and Access Mode value, it is more likely to be run a single time, setting all the remaining state data values and setting all the remaining Access Mode values. For example, a production line can be set up where the batch number and serial number of the authentication chip is produced according to the physical consumable being produced. This is much harder to match if the state data is loaded at a physically different factory.

The Stage 5 process involves first checking to ensure the chip is a valid consumable chip, which includes a RD to gather the data from the authentication chip, followed by a WR of the initial data values, and then a SAM to permanently set the new data values. The steps are outlined here:
1. IsTrusted=GIT[ ]
2. If (IsTrusted), exit with error (wrong kind of chip!)
3. Call RND on a valid System chip to get a valid input pair
4. Call RD on chip to be programmed, passing in valid input pair
5. Load X (256 bit register) with results from a RD of authentication chip
6. Call TST on valid System chip to ensure X and consumable chip are valid
7. If (TST returns 0), exit with error (wrong consumable chip for system)
8. Set bits of X to initial state values
9. WR[X]
10. Load Y (32 bit register) with 0
11. Set bits of Y corresponding to Access Modes for new state values
12. SAM[Y]

Of course the validation (Steps 1 to 7) does not have to occur if Stage 4 and 5 follow on from one another on the same Programming Station. But it should occur in all other situations where Stage 5 is run as a separate programming process from Stage 4.

If these authentication chips are now stolen, they are already programmed for use in a particular consumable. An attacker could place the stolen chips into a clone consumable. Such a theft would limit the number of cloned products to the number of chips stolen. A single theft should not create a supply constant enough to provide clone manufacturers with a cost-effective business. The alternative use for the chips is to save the attacker from purchasing the same number of consumables, each with an authentication chip, in order to launch a partially chosen text attack or brute force attack. There is no special security breach of the keys if such an attack were to occur.

10 Manufacture

This part makes some general comments about the manufacture and implementation of authentication chips. While the comments presented here are general, see [84] for a detailed description of an authentication chip for Protocol C1.

The authentication chip algorithms do not constitute a strong encryption device. The net effect is that they can be safely manufactured in any country (including the USA) and exported to anywhere in the world.

The circuitry of the authentication chip must be resistant to physical attack. A summary of manufacturing implementation guidelines is presented, followed by specification of the chip's physical defenses (ordered by attack).

Note that manufacturing comments are in addition to any legal protection undertaken, such as patents, copyright, and license agreements (for example, penalties if caught reverse engineering the authentication chip).

10.1 Guidelines for Manufacturing

The following are general guidelines for implementation of an authentication chip in terms of manufacture (see [84] for a detailed description of an authentication chip based on Protocol C1). No special security is required during the manufacturing process.
Standard process
Minimum size (if possible)
Clock Filter
Noise Generator
Tamper Prevention and Detection circuitry
Protected memory with tamper detection
Boot circuitry for loading program code
Special implementation of FETs for key data paths
Data connections in polysilicon layers where possible
OverUnderPower Detection Unit
No test circuitry
Transparent epoxy packaging Finally, as a general note to manufacturers of Systems, the data line to the System authentication chip and the data line to the Consumable authentication chip must not be the same line. See Section 10.2.3.

10.1.1 Standard Process

The authentication chip should be implemented with a standard manufacturing process (such as Flash). This is necessary to:
allow a great range of manufacturing location options
take advantage of well-defined and well-behaved technology
reduce cost Note that the standard process still allows physical protection mechanisms.

10.1.2 Minimum Size

The authentication chip must have a low manufacturing cost in order to be included as the authentication mechanism for low cost consumables. It is therefore desirable to keep the chip size as low as reasonably possible.

Each authentication chip requires 962 bits of non-volatile memory. In addition, the storage required for optimized HMAC-SHA1 is 1024 bits. The remainder of the chip (state machine, processor, CPU or whatever is chosen to implement Protocol C1) must be kept to a minimum in order that the number of transistors is minimized and thus the cost per chip is minimized. The circuit areas that process the secret key information or could reveal information about the key should also be minimized (see Section 10.1.8 for special data paths).

10.1.3 Clock Filter

The authentication chip circuitry is designed to operate within a specific clock speed range. Since the user directly supplies the clock signal, it is possible for an attacker to attempt to introduce race-conditions in the circuitry at specific times during processing. An example of this is where a high clock speed (higher than the circuitry is designed for) may prevent an XOR from working properly, and of the two inputs, the first may always be returned. These styles of transient fault attacks can be very efficient at recovering secret key information, and have been documented in [5] and [1]. The lesson to be learned from this is that the input clock signal cannot be trusted.

Since the input clock signal cannot be trusted, it must be limited to operate up to a maximum frequency. This can be achieved a number of ways.

In clock filter 100 an edge detect unit 101 passes the edge on to a delay 102, which in turn enables a gate 103 so that the clock signal is able to pass from the input port 104 to the output 105.

Figure 10:
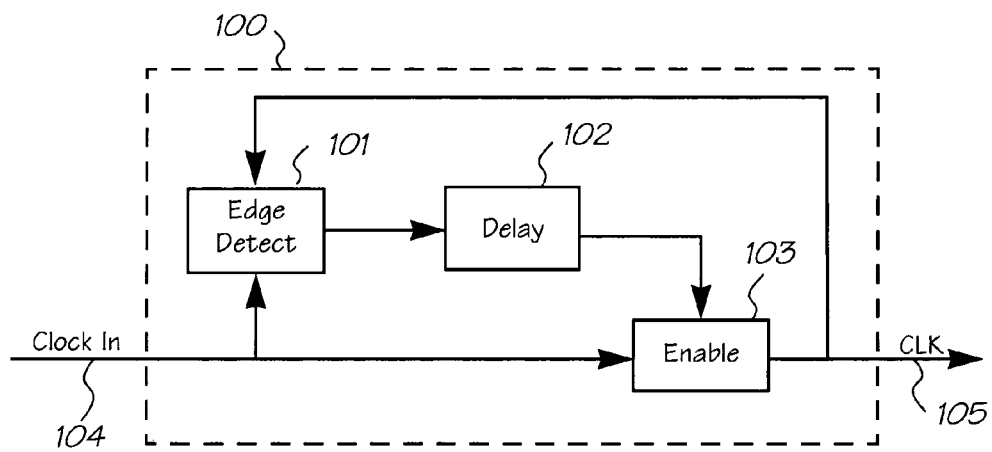
FIG. 10 is a block diagram of a clock filter.

FIG. 10 shows the Clock Filter:

The delay should be set so that the maximum clock speed is a particular frequency (e.g. about 4 MHz). Note that this delay is not programmable—it is fixed.

The filtered clock signal would be further divided internally as required.

10.1.4 Noise Generator

Each authentication chip should contain a noise generator that generates continuous circuit noise. The noise will interfere with other electromagnetic emissions from the chip's regular activities and add noise to the Idd signal. Placement of the noise generator is not an issue on an authentication chip due to the length of the emission wavelengths.

The noise generator is used to generate electronic noise, multiple state changes each clock cycle, and as a source of pseudo-random bits for the Tamper Prevention and Detection circuitry (see Section 10.1.5).

A simple implementation of a noise generator is a 64-bit maximal period LFSR seeded with a non-zero number. The clock used for the noise generator should be running at the maximum clock rate for the chip in order to generate as much noise as possible.

10.1.5 Tamper Prevention and Detection Circuitry

A set of circuits is required to test for and prevent physical attacks on the authentication chip. However what is actually detected as an attack may not be an intentional physical attack. It is therefore important to distinguish between these two types of attacks in an authentication chip:

- where you can be certain that a physical attack has occurred.
- where you cannot be certain that a physical attack has occurred.

The two types of detection differ in what is performed as a result of the detection. In the first case, where the circuitry can be certain that a true physical attack has occurred, erasure of Flash memory key information is a sensible action. In the second case, where the circuitry cannot be sure if an attack has occurred, there is still certainly something wrong. Action must be taken, but the action should not be the erasure of secret key information. A suitable action to take in the second case is a chip RESET. If what was detected was an attack that has permanently damaged the chip, the same conditions will occur next time and the chip will RESET again. If, on the other hand, what was detected was part of the normal operating environment of the chip, a RESET will not harm the key.

A good example of an event that circuitry cannot have knowledge about, is a power glitch. The glitch may be an intentional attack, attempting to reveal information about the key. It may, however, be the result of a faulty connection, or simply the start of a power-down sequence. It is therefore best to only RESET the chip, and not erase the key. If the chip was powering down, nothing is lost. If the System is faulty, repeated RESETs will cause the consumer to get the System repaired. In both cases the consumable is still intact.

A good example of an event that circuitry can have knowledge about, is the cutting of a data line within the chip. If this attack is somehow detected, it could only be a result of a faulty chip (manufacturing defect) or an attack. In either case, the erasure of the secret information is a sensible step to take.

Consequently each authentication chip should have 2 Tamper Detection Lines—one for definite attacks, and one for possible attacks. Connected to these Tamper Detection Lines would be a number of Tamper Detection test units, each testing for different forms of tampering. In addition, we want to ensure that the Tamper Detection Lines and Circuits themselves cannot also be tampered with.

At one end of the Tamper Detection Line 110 is a source of pseudo-random bits 111 (clocking at high speed compared to the general operating circuitry). The Noise Generator circuit described above is an adequate source. The generated bits pass through two different paths—one 112 carries the original data, and the other 113 carries the inverse of the data; it having passed through an inverter 114. The wires carrying these bits are in the layer above the general chip circuitry (for example, the memory, the key manipulation circuitry etc.). The wires must also cover the random bit generator. The bits are recombined at a number of places via an XOR gate 115. If the bits are different (they should be), a 1 is output, and used by the particular unit (for example, each output bit from a memory read should be ANDed with this bit value). The lines finally come together at the Flash memory Erase circuit, where a complete erasure is triggered by a 0 from the XOR. Attached to the line is a number of triggers, each detecting a physical attack on the chip. Each trigger has oversize nMOS transistors, such as 116, attached to GND. The Tamper Detection Line physically goes through these nMOS transistors. If the test fails, the trigger causes the Tamper Detect Line to become 0. The XOR test will therefore fail on either this clock cycle or the next one (on average), thus RESETing or erasing the chip.

Figure 11:
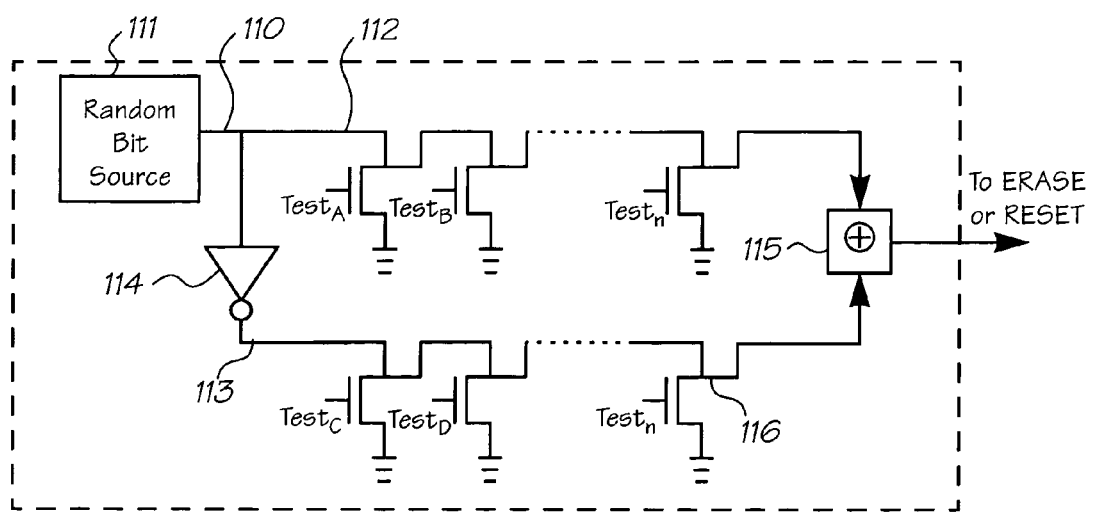
FIG. 11 is a circuit diagram of a tamper detection line.

FIG. 11 illustrates the basic circuitry of a Tamper Detection Line with its output connected to either the Erase or RESET circuitry.

Figure 12:
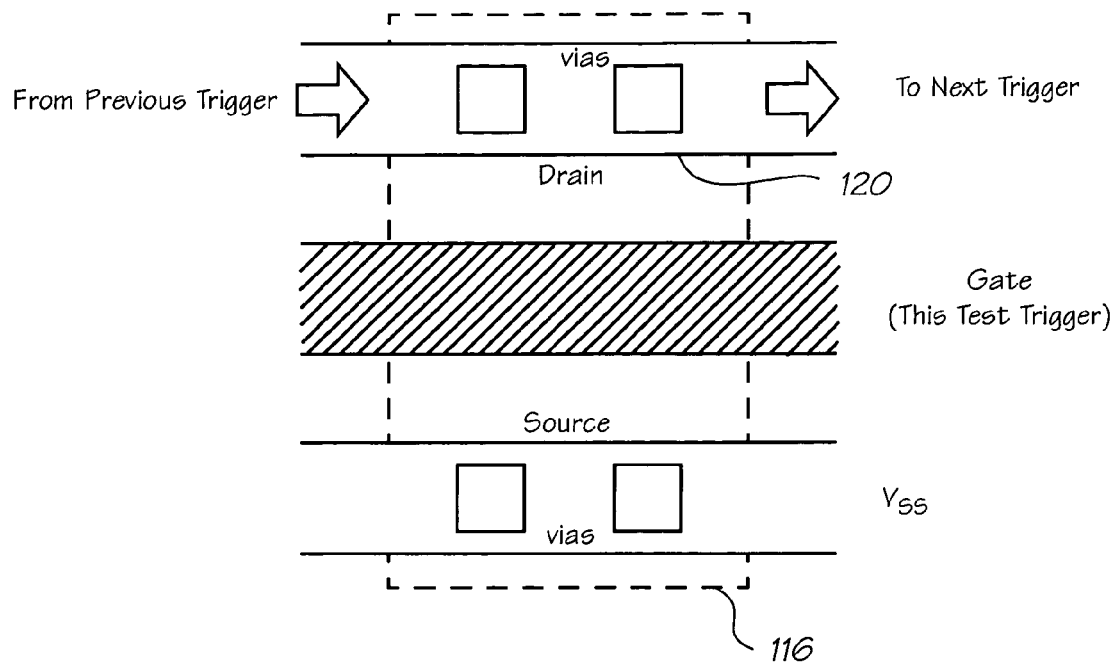
FIG. 12 is a layout diagram of an oversize nMOS transistor used as test transistors in the tamper detection line of FIG. 11.

The Tamper Detection Line must go through the drain 120 of an output transistor 116 for each test, as illustrated by FIG. 12:

It is not possible to break the Tamper Detect Line since this would stop the flow of 1s and 0s from the random source. The XOR tests would therefore fail. As the Tamper Detect Line physically passes through each test, it is not possible to eliminate any particular test without breaking the Tamper Detect Line.

Figure 13:
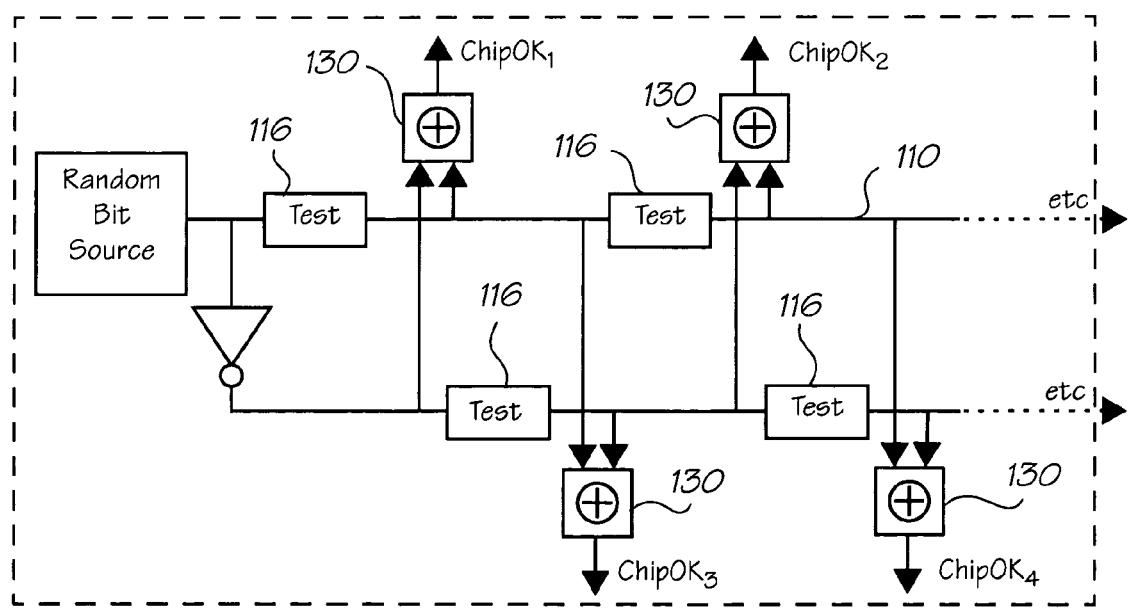
FIG. 13 is a circuit diagram of part of the tamper detection line of FIG. 11 including XOR gates between the two paths.

It is important that the XORs take values from a variety of places along the Tamper Detect Lines in order to reduce the chances of an attack. FIG. 13 illustrates the taking of multiple XORs, indicated generally at 130, from the Tamper Detect Line 110 to be used in the different parts of the chip. Each of these XORs 130 can be considered to be generating a ChipOK bit that can be used within each unit or sub-unit.

A sample usage would be to have an OK bit in each unit that is ANDed with a given ChipOK bit each cycle. The OK bit is loaded with 1 on a RESET. If OK is 0, that unit will fail until the next RESET. If the Tamper Detect Line is functioning correctly, the chip will either RESET or erase all key information. If the RESET or erase circuitry has been destroyed, then this unit will not function, thus thwarting an attacker.

The destination of the RESET and Erase line and associated circuitry is very context sensitive. It needs to be protected in much the same way as the individual tamper tests. There is no point generating a RESET pulse if the attacker can simply cut the wire leading to the RESET circuitry. The actual implementation will depend very much on what is to be cleared at RESET, and how those items are cleared.

The Tamper Lines cover the noise generator circuitry of the chip. The generator and NOT gate are on one level, while the Tamper Detect Lines run on a level above the generator.

10.1.6 Protected Memory with Tamper Detection

It is not enough to simply store secret information or program code in Flash memory. The Flash memory and RAM must be protected from an attacker who would attempt to modify (or set) a particular bit of program code or key information. The mechanism used must conform to being used in the Tamper Detection Circuitry (described above).

The first part of the solution is to ensure that the Tamper Detection Line passes directly above each Flash or RAM bit. This ensures that an attacker cannot probe the contents of Flash or RAM. A breach of the covering wire is a break in the Tamper Detection Line. The breach causes the Erase signal to be set, thus deleting any contents of the memory. The high frequency noise on the Tamper Detection Line also obscures passive observation.

The second part of the solution for Flash is to use multi-level data storage, but only to use a subset of those multiple levels for valid bit representations. Normally, when multi-level Flash storage is used, a single floating gate holds more than one bit. For example, a 4-voltage-state transistor can represent two bits. Assuming a minimum and maximum voltage representing 00 and 11 respectively, the two middle voltages represent 01 and 10. In the authentication chip, we can use the two middle voltages to represent a single bit, and consider the two extremes to be invalid states. If an attacker attempts to force the state of a bit one way or the other by closing or cutting the gate's circuit, an invalid voltage (and hence invalid state) results.

The second part of the solution for RAM is to use a parity bit. The data part of the register can be checked against the parity bit (which will not match after an attack).

The bits coming from Flash and RAM can therefore be validated by a number of test units (one per bit) connected to the common Tamper Detection Line. The Tamper Detection circuitry would be the first circuitry the data passes through (thus stopping an attacker from cutting the data lines).

While the multi-level Flash protection is enough for non-secret information, such as program code, R, and MinTicks, it is not sufficient for protecting $K_1$ and $K_2$. If an attacker adds electrons to a gate (see Section 3.8.2.15) representing a single bit of $K_1$, and the chip boots up yet doesn't activate the Tamper Detection Line, the key bit must have been a 0. If it does activate the Tamper Detection Line, it must have been a 1. For this reason, all other non-volatile memory can activate the Tamper Detection Line, but $K_1$ and $K_2$ must not. Consequently Checksum is used to check for tampering of $K_1$ and $K_2$. A signature of the expanded form of $K_1$ and $K_2$ (i.e. 320 bits instead of 160 bits for each of $K_1$ and $K_2$) is produced, and the result compared against the Checksum. Any non-match causes a clear of all key information.

10.1.7 Boot Circuitry for Loading Program Code

Program code should be kept in multi-level Flash instead of ROM, since ROM is subject to being altered in a non-testable way. A boot mechanism is therefore required to load the program code into Flash memory (Flash memory is in an indeterminate state after manufacture).

The boot circuitry must not be in ROM—a small state-machine would suffice. Otherwise the boot code could be modified in an undetectable way.

The boot circuitry must erase all Flash memory, check to ensure the erasure worked, and then load the program code. Flash memory must be erased before loading the program code. Otherwise an attacker could put the chip into the boot state, and then load program code that simply extracted the existing keys. The state machine must also check to ensure that all Flash memory has been cleared (to ensure that an attacker has not cut the Erase line) before loading the new program code.

The loading of program code must be undertaken by the secure Programming Station before secret information (such as keys) can be loaded. This step must be undertaken as the first part of the programming process described in Section 9.6.

10.1.8 Special Implementation of FETs for Key Data Paths

Figure 14:
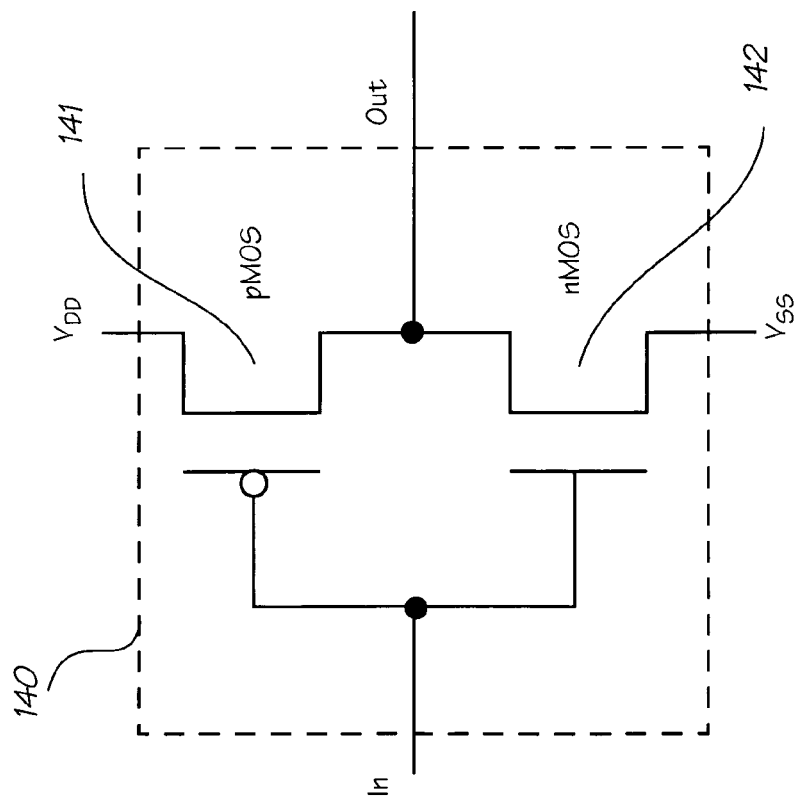
FIG. 14 is a circuit diagram of the normal FET implementation of a CMOS inverter.

The normal situation for FET implementation for the case of a CMOS Inverter 140, which involves a pMOS transistor 141 combined with an nMOS transistor 142 as shown in FIG. 14.

Figure 15:
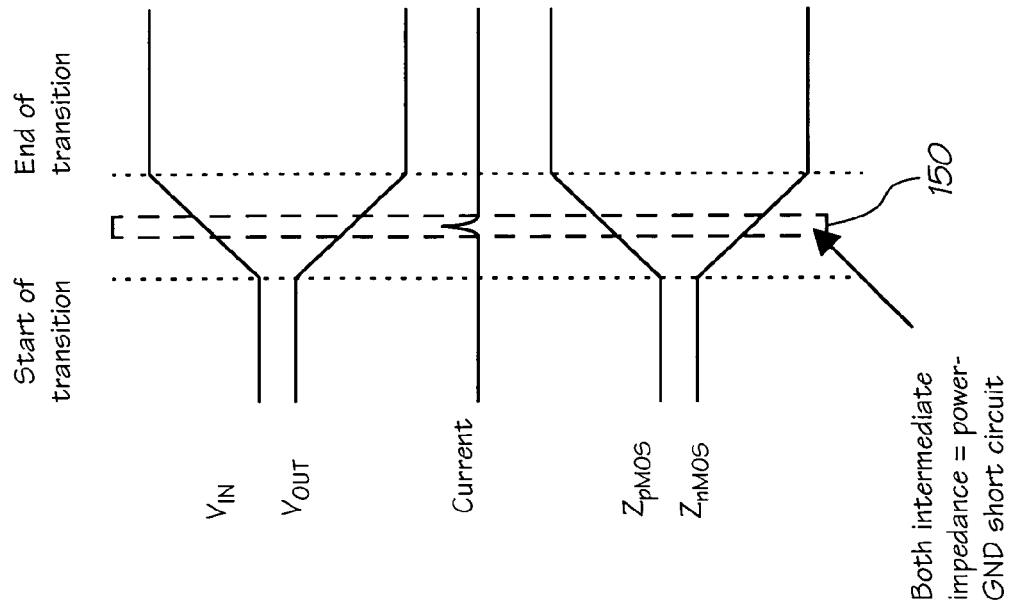
FIG. 15 is voltage/current diagram for the transistors of the CMOS inverter of FIG. 14.

FIG. 15 is the voltage/current diagram for the CMOS inverter 140. During the transition, there is a small period of time 150 where both the nMOS transistor 142 and the pMOS transistor 141 have an intermediate resistance. The resultant power-ground short circuit causes a temporary increase in the current, and in fact accounts for the majority of current consumed by a CMOS device. A small amount of infrared light is emitted during the short circuit, and can be viewed through the silicon substrate (silicon is transparent to infrared light). A small amount of light is also emitted during the charging and discharging of the transistor gate capacitance and transmission line capacitance.

For circuitry that manipulates secret key information, such information must be kept hidden. An alternative non-flashing CMOS 160 implementation should therefore be used for all data paths that manipulate the key or a partially calculated value that is based on the key.

Figure 17:
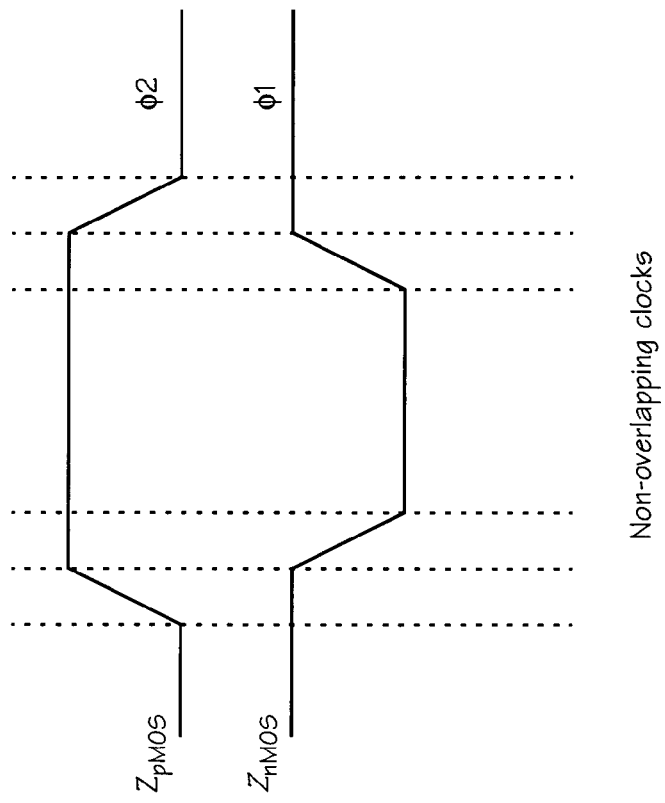
FIG. 17 is impedance diagram for the transistors of the CMOS inverter of FIG. 16.
Figure 16:
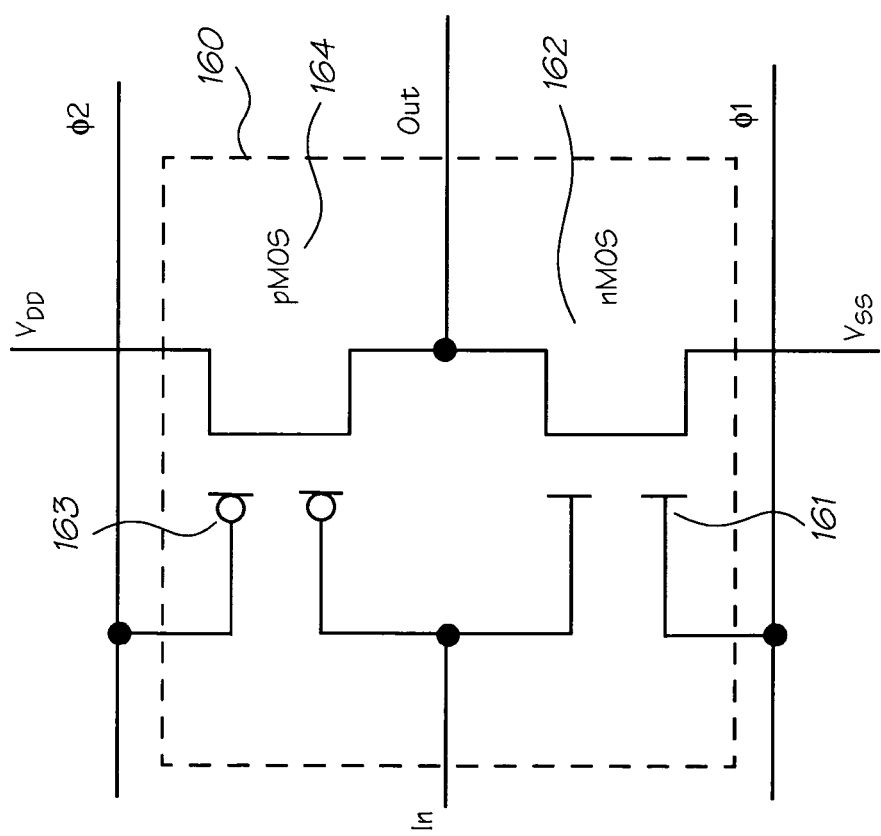
FIG. 16 is a circuit diagram of the FET implementation of a non-flashing CMOS inverter.

The use of two non-overlapping clocks $\phi 1$ and $\phi 2$ can provide a non-flashing mechanism. $\phi 1$ is connected to a second gate 161 of all nMOS transistors 162, and $\phi 2$ is connected to a second gate 163 of all pMOS transistors 164. The transition can only take place in combination with the clock. Since $\phi 1$ and $\phi 2$ are non-overlapping, the pMOS and nMOS transistors will not have a simultaneous intermediate resistance. The setup is shown in FIG. 16, and the impedance diagram in FIG. 17.

Finally, regular CMOS inverters can be positioned near critical non-Flashing CMOS components. These inverters should take their input signal from the Tamper Detection Line above. Since the Tamper Detection Line operates multiple times faster than the regular operating circuitry, the net effect will be a high rate of light-bursts next to each non-Flashing CMOS component. Since a bright light overwhelms observation of a nearby faint light, an observer will not be able to detect what switching operations are occurring in the chip proper. These regular CMOS inverters will also effectively increase the amount of circuit noise, reducing the SNR and obscuring useful EMI.

There are a number of side effects due to the use of non-Flashing CMOS:

- The effective speed of the chip is reduced by twice the rise time of the clock per clock cycle. This is not a problem for an authentication chip.
- The amount of current drawn by the non-Flashing CMOS is reduced (since the short circuits do not occur). However, this is offset by the use of regular CMOS inverters.
- Routing of the clocks increases chip area, especially since multiple versions of $\phi 1$ and $\phi 2$ are required to cater for different levels of propagation. The estimation of chip area is double that of a regular implementation.
- Design of the non-Flashing areas of the authentication chip are slightly more complex than to do the same with a with a regular CMOS design. In particular, standard cell components cannot be used, making these areas full custom. This is not a problem for something as small as an authentication chip, particularly when the entire chip does not have to be protected in this manner.

10.1.9 Connections in Polysilicon Layers where Possible

Wherever possible, the connections along which the key or secret data flows, should be made in the polysilicon layers. Where necessary, they can be in metal 1, but must never be in the top metal layer (containing the Tamper Detection Lines).

10.1.10 OverUnderPower Detection Unit

Each authentication chip requires an OverUnderPower Detection Unit to prevent Power Supply Attacks. An OverUnderPower Detection Unit detects power glitches and tests the power level against a Voltage Reference to ensure it is within a certain tolerance. The Unit contains a single Voltage Reference and two comparators. The OverUnderPower Detection Unit would be connected into the RESET Tamper Detection Line, thus causing a RESET when triggered.

A side effect of the OverUnderPower Detection Unit is that as the voltage drops during a power-down, a RESET is triggered, thus erasing any work registers.

10.1.11 No Test Circuitry

Test hardware on an authentication chip could very easily introduce vulnerabilities. As a result, the authentication chip should not contain any BIST or scan paths.

The authentication chip must therefore be testable with external test vectors. This should be possible since the authentication chip is not complex.

10.1.12 Transparent Epoxy Packaging

The authentication chip needs to be packaged in transparent epoxy so it can be photo-imaged by the programming station to prevent Trojan horse attacks. The transparent packaging does not compromise the security of the authentication chip since an attacker can fairly easily remove a chip from its packaging. For more information see Section 10.2.20 and [85].

10.2 Resistance to Physical Attacks

While this part only describes manufacture in general terms (since this document does not cover a specific implementation of a Protocol C1 authentication chip), we can still make some observations about such a chip's resistance to physical attack. A description of the general form of each physical attack can be found in Section 3.8.2.

10.2.1 Reading ROM

This attack depends on the key being stored in an addressable ROM. Since each authentication chip stores its authentication keys in internal Flash memory and not in an addressable ROM, this attack is irrelevant.

10.2.2 Reverse Engineering the Chip

Reverse engineering a chip is only useful when the security of authentication lies in the algorithm alone. However our authentication chips rely on a secret key, and not in the secrecy of the algorithm. Our authentication algorithm is, by contrast, public, and in any case, an attacker of a high volume consumable is assumed to have been able to obtain detailed plans of the internals of the chip.

In light of these factors, reverse engineering the chip itself, as opposed to the stored data, poses no threat.

10.2.3 Usurping the Authentication Process

There are several forms this attack can take, each with varying degrees of success. In all cases, it is assumed that a clone manufacturer will have access to both the System and the consumable designs.

An attacker may attempt to build a chip that tricks the System into returning a valid code instead of generating an authentication code. This attack is not possible for two reasons. The first reason is that System authentication chips and Consumable authentication chips, although physically identical, are programmed differently. In particular, the RD opcode and the RND opcode are the same, as are the WR and TST opcodes. A System authentication Chip cannot perform a RD command since every call is interpreted as a call to RND instead. The second reason this attack would fail is that separate serial data lines are provided from the System to the System and Consumable authentication chips. Consequently neither chip can see what is being transmitted to or received from the other.

If the attacker builds a clone chip that ignores WR commands (which decrement the consumable remaining), Protocol C1 ensures that the subsequent RD will detect that the WR did not occur. The System will therefore not go ahead with the use of the consumable, thus thwarting the attacker. The same is true if an attacker simulates loss of contact before authentication—since the authentication does not take place, the use of the consumable doesn't occur.

An attacker is therefore limited to modifying each System in order for clone consumables to be accepted (see Section 10.2.4 for details of resistance this attack).

10.2.4 Modification of System

The simplest method of modification is to replace the System's authentication chip with one that simply reports success for each call to TST. This can be thwarted by System calling TST several times for each authentication, with the first few times providing false values, and expecting a fail from TST. The final call to TST would be expected to succeed. The number of false calls to TST could be determined by some part of the returned result from RD or from the system clock. Unfortunately an attacker could simply rewire System so that the new System clone authentication chip can monitor the returned result from the consumable chip or clock. The clone System authentication chip would only return success when that monitored value is presented to its TST function. Clone consumables could then return any value as the hash result for RD, as the clone System chip would declare that value valid. There is therefore no point for the System to call the System authentication chip multiple times, since a rewiring attack will only work for the System that has been rewired, and not for all Systems. For more information see Section 5.2.4.

A similar form of attack on a System is a replacement of the System ROM. The ROM program code can be altered so that the Authentication never occurs. There is nothing that can be done about this, since the System remains in the hands of a consumer. Of course this would void any warranty, but the consumer may consider the alteration worthwhile if the clone consumable were extremely cheap and more readily available than the original item.

The System/consumable manufacturer must therefore determine how likely an attack of this nature is. Such a study must include given the pricing structure of Systems and Consumables, frequency of System service, advantage to the consumer of having a physical modification performed, and where consumers would go to get the modification performed.

The likelihood of physical alteration increases with the perceived artificiality of the consumable marketing scheme. It is one thing for a consumable to be protected against clone manufacturers. It is quite another for a consumable's market to be protected by a form of exclusive licensing arrangement that creates what is viewed by consumers as artificial markets. In the former case, owners are not so likely to go to the trouble of modifying their system to allow a clone manufacturer's goods. In the latter case, consumers are far more likely to modify their System. A case in point is DVD. Each DVD is marked with a region code, and will only play in a DVD player from that region. Thus a DVD from the USA will not play in an Australian player, and a DVD from Japan, Europe or Australia will not play in a USA DVD player. Given that certain DVD titles are not available in all regions, or because of quality differences, pricing differences or timing of releases, many consumers have had their DVD players modified to accept DVDs from any region. The modification is usually simple (it often involves soldering a single wire), voids the owner's warranty, and often costs the owner some money. But the interesting thing to note is that the change is not made so the consumer can use clone consumables—the consumer will still only buy real consumables, but from different regions. The modification is performed to remove what is viewed as an artificial barrier, placed on the consumer by the movie companies. In the same way, a System/Consumable scheme that is viewed as unfair will result in people making modifications to their Systems.

The limit case of modifying a system is for a clone manufacturer to provide a completely clone System which takes clone consumables. This may be simple competition or violation of patents. Either way, it is beyond the scope of the authentication chip and depends on the technology or service being cloned.

10.2.5 Direct Viewing of Chip Operation by Conventional Probing

In order to view the chip operation, the chip must be operating. However, the Tamper Prevention and Detection circuitry covers those sections of the chip that process or hold the key. It is not possible to view those sections through the Tamper Prevention lines.

An attacker cannot simply slice the chip past the Tamper Prevention layer, for this will break the Tamper Detection Lines and cause an erasure of all keys at power-up. Simply destroying the erasure circuitry is not sufficient, since the multiple ChipOK bits (now all 0) feeding into multiple units within the authentication chip will cause the chip's regular operating circuitry to stop functioning.

To set up the chip for an attack, then, requires the attacker to delete the Tamper Detection lines, stop the Erasure of Flash memory, and somehow rewire the components that relied on the ChipOK lines. Even if all this could be done, the act of slicing the chip to this level will most likely destroy the charge patterns in the non-volatile memory that holds the keys, making the process fruitless.

10.2.6 Direct Viewing of the Non-volatile Memory

If the authentication chip were sliced so that the floating gates of the Flash memory were exposed, without discharging them, then the keys could probably be viewed directly using an STM or SKM.

However, slicing the chip to this level without discharging the gates is probably impossible. Using wet etching, plasma etching, ion milling, or chemical mechanical polishing will almost certainly discharge the small charges present on the floating gates. This is true of regular Flash memory, but even more so of multi-level Flash memory.

10.2.7 Viewing the Light Bursts Caused by State Changes

All sections of circuitry that manipulate secret key information are implemented in the non-Flashing CMOS described above. This prevents the emission of the majority of light bursts. Regular CMOS inverters placed in close proximity to the non-Flashing CMOS will hide any faint emissions caused by capacitor charge and discharge. The inverters are connected to the Tamper Detection circuitry, so they change state many times (at the high clock rate) for each non-Flashing CMOS state change.

10.2.8 Viewing the Keys Using an SEPM

An SEPM attack can be simply thwarted by adding a metal layer to cover the circuitry. However an attacker could etch a hole in the layer, so this is not an appropriate defense.

The Tamper Detection circuitry described above will shield the signal as well as cause circuit noise. The noise will actually be a greater signal than the one that the attacker is looking for. If the attacker attempts to etch a hole in the noise circuitry covering the protected areas, the chip will not function, and the SEPM will not be able to read any data.

An SEPM attack is therefore fruitless.

10.2.9 Monitoring EMI

The Noise Generator described above will cause circuit noise. The noise will interfere with other electromagnetic emissions from the chip's regular activities and thus obscure any meaningful reading of internal data transfers.

10.2.10 Viewing $I_{dd}$ Fluctuations

The solution against this kind of attack is to decrease the SNR in the Idd signal. This is accomplished by increasing the amount of circuit noise and decreasing the amount of signal.

The Noise Generator circuit (which also acts as a defense against EMI attacks) will also cause enough state changes each cycle to obscure any meaningful information in the Idd signal.

In addition, the special Non-Flashing CMOS implementation of the key-carrying data paths of the chip prevents current from flowing when state changes occur. This has the benefit of reducing the amount of signal.

10.2.11 Differential Fault Analysis

Differential fault bit errors are introduced in a non-targeted fashion by ionization, microwave radiation, and environmental stress. The most likely effect of an attack of this nature is a change in Flash memory (causing an invalid state) or RAM (bad parity). Invalid states and bad parity are detected by the Tamper Detection Circuitry, and cause an erasure of the key.

Since the Tamper Detection Lines cover the key manipulation circuitry, any error introduced in the key manipulation circuitry will be mirrored by an error in a Tamper Detection Line. If the Tamper Detection Line is affected, the chip will either continually RESET or simply erase the key upon a power-up, rendering the attack fruitless.

Rather than relying on a non-targeted attack and hoping that "just the right part of the chip is affected in just the right way", an attacker is better off trying to introduce a targeted fault (such as overwrite attacks, gate destruction etc.). For information on these targeted fault attacks, see the relevant sections below.

10.2.12 Clock Glitch Attacks

The Clock Filter (described above) eliminates the possibility of clock glitch attacks.

10.2.13 Power Supply Attacks

The OverUnderPower Detection Unit (described above) eliminates the possibility of power supply attacks.

10.2.14 Overwriting ROM

Authentication chips store program code, keys and secret information in Flash memory, and not in ROM. This attack is therefore not possible.

10.2.15 Modifying EEPROM/Flash

Authentication chips store program code, keys and secret information in multi-level Flash memory. However the Flash memory is covered by two Tamper Prevention and Detection Lines. If either of these lines is broken (in the process of destroying a gate via a laser-cutter) the attack will be detected on power-up, and the chip will either RESET (continually) or erase the keys from Flash memory. This process is described in Section 10.1.6.

Even if an attacker is able to somehow access the bits of Flash and destroy or short out the gate holding a particular bit, this will force the bit to have no charge or a full charge. These are both invalid states for the authentication chip's usage of the multi-level Flash memory (only the two middle states are valid). When that data value is transferred from Flash, detection circuitry will cause the Erasure Tamper Detection Line to be triggered—thereby erasing the remainder of Flash memory and RESETing the chip. This is true for program code, and non-secret information. As key data is read from multi-level flash memory, it is not imediately checked for validity (otherwise information about the key is given away). Instead, a specific key validation mechanism is used to protect the secret key information.

An attacker could theoretically etch off the upper levels of the chip, and deposit enough electrons to change the state of the multi-level Flash memory by ⅓. If the beam is high enough energy it might be possible to focus the electron beam through the Tamper Prevention and Detection Lines. As a result, the authentication chip must perform a validation of the keys before replying to the Random, Test or Random commands. The SHA-1 algorithm must be run on the keys, and the results compared against an internal checksum value. This gives an attacker a 1 in $2^{160}$ chance of tricking the chip, which is the same chance as guessing either of the keys.

A Modify EEPROM/Flash attack is therefore fruitless.

10.2.16 Gate Destruction Attacks

Gate Destruction Attacks rely on the ability of an attacker to modify a single gate to cause the chip to reveal information during operation. However any circuitry that manipulates secret information is covered by one of the two Tamper Prevention and Detection lines. If either of these lines is broken (in the process of destroying a gate) the attack will be detected on power-up, and the chip will either RESET (continually) or erase the keys from Flash memory.

To launch this kind of attack, an attacker must first reverse-engineer the chip to determine which gate(s) should be targeted. Once the location of the target gates has been determined, the attacker must break the covering Tamper Detection line, stop the Erasure of Flash memory, and somehow rewire the components that rely on the ChipOK lines. Rewiring the circuitry cannot be done without slicing the chip, and even if it could be done, the act of slicing the chip to this level will most likely destroy the charge patterns in the non-volatile memory that holds the keys, making the process fruitless.

10.2.17 Overwrite Attack

An overwrite attack relies on being able to set individual bits of the key without knowing the previous value. It relies on probing the chip, as in the conventional probing attack and destroying gates as in the gate destruction attack. Both of these attacks (as explained in their respective sections), will not succeed due to the use of the Tamper Prevention and Detection Circuitry and ChipOK lines.

However, even if the attacker is able to somehow access the bits of Flash and destroy or short out the gate holding a particular bit, this will force the bit to have no charge or a full charge. These are both invalid states for the authentication chip's usage of the multi-level Flash memory (only the two middle states are valid). When that data value is transferred from Flash detection circuitry will cause the Erasure Tamper Detection Line to be triggered—thereby erasing the remainder of Flash memory and RESETing the chip. In the same way, a parity check on tampered values read from RAM will cause the Erasure Tamper Detection Line to be triggered.

An overwrite attack is therefore fruitless.

10.2.18 Memory Remanence Attack

Any working registers or RAM within the authentication chip may be holding part of the authentication keys when power is removed. The working registers and RAM would continue to hold the information for some time after the removal of power. If the chip were sliced so that the gates of the registers/RAM were exposed, without discharging them, then the data could probably be viewed directly using an STM.

The first defense can be found above, in the description of defense against power glitch attacks. When power is removed, all registers and RAM are cleared, just as the RESET condition causes a clearing of memory.

The chances then, are less for this attack to succeed than for a reading of the Flash memory. RAM charges (by nature) are more easily lost than Flash memory. The slicing of the chip to reveal the RAM will certainly cause the charges to be lost (if they haven't been lost simply due to the memory not being refreshed and the time taken to perform the slicing).

This attack is therefore fruitless.

10.2.19 Chip Theft Attack

There are distinct phases in the lifetime of an authentication chip. Chips can be stolen when at any of these stages:

After manufacture, but before programming of key

After programming of key, but before programming of state data

After programming of state data, but before insertion into the consumable or system After insertion into the system or consumable A theft in between the chip manufacturer and programming station would only provide the clone manufacturer with blank chips. This merely compromises the sale of authentication chips, not anything authenticated by the authentication chips. Since the programming station is the only mechanism with consumable and system product keys, a clone manufacturer would not be able to program the chips with the correct key. Clone manufacturers would be able to program the blank chips for their own Systems and Consumables, but it would be difficult to place these items on the market without detection.

The second form of theft can only happen in a situation where an authentication chip passes through two or more distinct programming phases. This is possible, but unlikely. In any case, the worst situation is where no state data has been programmed, so all of M is read/write. If this were the case, an attacker could attempt to launch an adaptive chosen text attack on the chip. The HMAC-SHA1 algorithm is resistant to such attacks. For more information see Section 5.5.

The third form of theft would have to take place in between the programming station and the installation factory. The authentication chips would already be programmed for use in a particular system or for use in a particular consumable. The only use these chips have to a thief is to place them into a clone System or clone Consumable. Clone systems are irrelevant—a cloned System would not even require an authentication chip. For clone Consumables, such a theft would limit the number of cloned products to the number of chips stolen. A single theft should not create a supply constant enough to provide clone manufacturers with a cost-effective business.

The final form of theft is where the System or Consumable itself is stolen. When the theft occurs at the manufacturer, physical security protocols must be enhanced. If the theft occurs anywhere else, it is a matter of concern only for the owner of the item and the police or insurance company. The security mechanisms that the authentication chip uses assume that the consumables and systems are in the hands of the public. Consequently, having them stolen makes no difference to the security of the keys.

10.2.20 Trojan Horse Attack

A Trojan horse attack involves an attacker inserting a fake authentication chip into the programming station and retrieving the same chip after it has been programmed with the secret key information. The difficulty of these two tasks depends on both logical and physical security, but is an expensive attack—the attacker has to manufacture a false authentication chip, and it will only be useful where the effort is worth the gain. For example, obtaining the secret key for a specific car's authentication chip is most likely not worth an attacker's efforts, while the key for a printer's ink cartridge may be very valuable.

The problem arises if the programming station is unable to tell a Trojan horse authentication chip from a real one—which is the problem of authenticating the authentication chip.

One solution to the authentication problem is for the manufacturer to have a programming station attached to the end of the production line. Chips passing the manufacture QA tests are programmed with the manufacturer's secret key information. The chip can therefore be verified by the C1 authentication protocol, and give information such as the expected batch number, serial number etc. The information can be verified and recorded, and the valid chip can then be reprogrammed with the System or Consumable key and state data. An attacker would have to substitute an authentication chip with a Trojan horse programmed with the manufacturer's secret key information and copied batch number data from the removed authentication chip. This is only possible if the manufacturer's secret key is compromised (the key is changed regularly and not known by a human) or if the physical security at the manufacturing plant is compromised at the end of the manufacturing chain.

Even if the solution described were to be undertaken, the possibility of a Trojan horse attack does not go away—it merely is removed to the manufacturer's physical location. A better solution requires no physical security at the manufacturing location.

The preferred solution then, is to use transparent epoxy on the chip's packaging and to image the chip before programming it. Once the chip has been mounted for programming it is in a known fixed orientation. It can therefore be high resolution photo-imaged and X-rayed from multiple directions, and the images compared against "signature" images. Any chip not matching the image signature is treated as a Trojan horse and rejected.

11 REFERENCES

[1] Anderson, R, and Kuhn, M., 1997, Low Cost Attacks on Tamper Resistant Devices, Security Protocols, Proceedings 1997, LNCS 1361, B. Christianson, B. Crispo, M. Lomas, M. Roe, Eds., Springer-Verlag, pp. 125-136.

[2] Anderson, R., and Needham, R. M., Programming Satan's Computer, Computer Science Today, LNCS 1000, pp. 426-441.

[3] Atkins, D., Graff, M., Lenstra, A. K., and Leyland, P. C., 1995, The Magic Words Are Squeamish Ossifrage, Advances in Cryptology—ASIACRYPT '94 Proceedings, Springer-Verlag, pp. 263-277.

[4] Bains, S., 1997, Optical schemes tried out in IC test—IBM and Lucent teams take passive and active paths, respectively, to imaging. EETimes, Dec. 22, 1997.

[5] Bao, F., Deng, R. H., Yan, Y, Jeng, A., Narasimhalu, A. D., Ngair, T., 1997, Breaking Public Key Cryptosystems on Tamper Resistant Devices in the Presence of Transient Faults, Security Protocols, Proceedings 1997, LNCS 1361, B. Christianson, B. Crispo, M. Lomas, M. Roe, Eds., Springer-Verlag, pp. 115-124.

[6] Bellare, M., Canetti, R., and Krawczyk. H., 1996, Keying Hash Functions For Message Authentication, Advances in Cryptology, Proceedings Crypto '96, LNCS 1109, N. Koblitz, Ed., Springer-Verlag, 1996, pp. 1-15. Full version: http://www.research.ibm.com/security/keyed-md5.html

[7] Bellare, M., Canetti, R., and Krawczyk, H., 1996, The HMAC Construction, RSA Laboratories CryptoBytes, Vol. 2, No 1, 1996, pp. 12-15.

[8] Bellare, M., Guérin, R., and Rogaway, P., 1995, XOR MACs: New Methods For Message Authentication Using Finite Pseudorandom Functions, Advances in Cryptology, Proceedings Crypto '95, LNCS 963, D Coppersmith, Ed., Springer-Verlag, 1995, pp. 15-28.

[9] Blaze, M., Diffie, W., Rivest, R., Schneier, B., Shimomura, T., Thompson, E., Wiener, M., 1996, Minimal Key Lengths For Symmetric Ciphers To Provide Adequate Commercial Security, A Report By an Ad Hoc Group of Cryptographers and Computer Scientists, Published on the internet: http://www.livelinks.com/livelinks/bsa/cryptographers.html

[10] Blum, L., Blum, M., and Shub, M., A Simple Unpredictable Pseudo-random Number Generator, SIAM Journal of Computing, vol 15, no 2, May 1986, pp 364-383.

[11] Bosselaers, A., and Preneel, B., editors, 1995, Integrity Primitives for Secure Information Systems: Final Report of RACE Integrity Primitives Evaluation RIPE-RACE 1040, LNCS 1007, Springer-Verlag, New York.

[12] Brassard, G., 1988, Modern Cryptography, a Tutorial, LNCS 325, Springer-Verlag.

[13] Canetti, R., 1997, Towards Realizing Random Oracles: Hash Functions That Hide All Partial Information, Advances in Cryptology, Proceedings Crypto '97, LNCS 1294, B. Kaliski, Ed., Springer-Verlag, pp. 455-469.

[14] Cheng, P., and Glenn, R., 1997, Test Cases for HMAC-MD5 and HMAC-SHA-1, Network Working Group RFC 2202, http://reference.ncrs.usda.gov/ietf/rfc/2300/rfc2202.htm

[15] Diffie, W., and Hellman, M. E., 1976, Multiuser Cryptographic Techniques, AFIPS national Computer Conference, Proceedings '76, pp. 109-112.

[16] Diffie, W., and Hellman, M. E., 1976, New Directions in Cryptography, IEEE Transactions on Information Theory, Volume IT-22, No 6 (November 1976), pp. 644-654.

[17] Diffie, W., and Hellman, M. E., 1977, Exhaustive Cryptanalysis of the NBS Data Encryption Standard, Computer, Volume 10, No 6, (June 1977), pp. 74-84.

[18] Dobbertin, H., 1995, Alf Swindles Ann, RSA Laboratories CryptoBytes, Volume 1, No 3, p. 5.

[19] Dobbertin, H, 1996, Cryptanalysis of MD4, Fast Software Encryption—Cambridge Workshop, LNCS 1039, Springer-Verlag, 1996, pp 53-69.

[20] Dobbertin, H, 1996, The Status of MD5 After a Recent Attack, RSA Laboratories CryptoBytes, Volume 2, No 2, pp. 1, 3-6.

[21] Dreifus, H., and Monk, J. T., 1988, Smart Cards—A Guide to Building and Managing Smart Card Applications, John Wiley and Sons.

[22] ElGamal, T., 1985, A Public-Key Cryptosystem and a Signature Scheme Based on Discrete Logarithms, Advances in Cryptography, Proceedings Crypto '84, LNCS 196, Springer-Verlag, pp. 10-18.

[23] ElGamal, T., 1985, A Public-Key Cryptosystem and a Signature Scheme Based on Discrete Logarithms, IEEE Transactions on Information Theory, Volume 31, No 4, pp. 469-472

[24] Feige, U., Fiat, A, and Shamir, A., 1988, Zero Knowledge Proofs of Identity, J Cryptography, Volume 1, pp. 77-904.

[25] Feigenbaum, J., 1992, Overview of Interactive Proof Systems and Zero-Knowledge, Contemporary Cryptology—The Science of Information Integrity, G Simmons, Ed., IEEE Press, New York.

[26] FIPS 46-1, 1977, Data Encryption Standard, NIST, US Department of Commerce, Washington D.C., January 1977.

[27] FIPS 180, 1993, Secure Hash Standard, NIST, US Department of Commerce, Washington D.C., May 1993.

[28] FIPS 180-1, 1995, Secure Hash Standard, NIST, US Department of Commerce, Washington D.C., April 1995.

[29] FIPS 186, 1994, Digital Signature Standard, NIST, US Department of Commerce, Washington D.C., 1994.

[30] Gardner, M., 1977, A New Kind of Cipher That Would Take Millions of Years to Break, Scientific American, Vol. 237, No. 8, pp. 120-124.

[31] Girard, P., Roche, F. M., Pistoulet, B., 1986, Electron Beam Effects on VLSI MOS: Conditions for Testing and Reconfiguration, Wafer-Scale Integration, G. Saucier and J. Trihle, Eds., Amsterdam.

[32] Girard, P., Pistoulet, B., Valenza, M., and Lorival, R., 1987, Electron Beam Switching of Floating Gate MOS Transistors, IFIP International Workshop on Wafer Scale International, Brunel University, Sep. 23-25, 1987.

[33] Goldberg, I., and Wagner, D., 1996, Randomness and the Netscape Browser, Dr. Dobb's Journal, January 1996.

[34] Guilou, L. G., Ugon, M., and Quisquater, J., 1992, The Smart Card, Contemporary Cryptology—The Science of Information Integrity, G Simmons, Ed., IEEE Press, New York.

[35] Gutman, P., 1996, Secure Deletion of Data From Magnetic and Solid-State Memory, Sixth USENIX Security Symposium Proceedings (July 1996), pp. 77-89.

[36] Hendry, M., 1997, Smart Card Security and Applications, Artech House, Norwood Mass.

[37] Holgate, S. A., 1998, Sensing is Believing, New Scientist, 15 Aug. 1998, p 20.

[38] Johansson, T., 1997, Bucket Hashing with a Small Key Size, Advances in Cryptology, Proceedings Eurocrypt '97, LNCS 1233, W. Fumy, Ed., Springer-Verlag, pp. 149-162.

[39] Kahn, D., 1967, The Codebreakers: The Story of Secret Writing, New York: Macmillan Publishing Co.

[40] Kaliski, B., 1991, Letter to NIST regarding DSS, 4 Nov. 1991.

[41] Kaliski, B., 1998, New Threat Discovered and Fixed, RSA Laboratories Web site http://www.rsa.com/rsalabs/pkcs1

[42] Kaliski, B., and Robshaw, M, 1995, Message Authentication With MD5, RSA Laboratories CryptoBytes, Volume 1, No 1, pp. 5-8.

[43] Kaliski, B., and Yin, Y. L., 1995, On Differential and Linear Cryptanalysis of the RC5 Encryption Algorithm, Advances in Cryptology, Proceedings Crypto '95, LNCS 963, D. Coppersmith, Ed., Springer-Verlag, pp. 171-184.

[44] Klapper, A., and Goresky, M., 1994, 2-Adic Shift Registers, Fast Software Encryption: Proceedings Cambridge Security Workshop '93, LNCS 809, R. Anderson, Ed., Springer-Verlag, pp. 174-178.

[45] Klapper, A., 1996, On the Existence of Secure Feedback Registers, Advances in Cryptology, Proceedings Eurocrypt '96, LNCS 1070, U. Maurer, Ed., Springer-Verlag, pp. 256-267.

[46] Kleiner, K., 1998, Cashing in on the not so smart cards, New Scientist, 20 Jun. 1998, p 12.

[47] Knudsen, L. R., and Lai, X., Improved Differential Attacks on RC5, Advances in Cryptology, Proceedings Crypto '96, LNCS 1109, N. Koblitz, Ed., Springer-Verlag, 1996, pp. 216-228

[48] Knuth, D. E., 1998, The Art of Computer Programing—Volume 2/Seminumerical Algorithms, 3rd edition, Addison-Wesley.

[49] Krawczyk, H., 1995, New Hash Functions for Message Authentication, Advances in Cryptology, Proceedings Eurocrypt '95, LNCS 921, L Guillou, J Quisquater, (editors), Springer-Verlag, pp. 301-310.

[50] Krawczyk, H., 199x, Network Encryption—History and Patents, internet publication: http://www.cygnus.com/~gnu/netcrypt.html

[51] Krawczyk, H., Bellare, M, Canetti, R., 1997, HMAC: Keyed Hashing for message Authentication, Network Working Group RFC 2104, http://reference.ncrs.usda.gov/ietf/rfc/2200/rfc2104.htm

[52] Lai, X., 1992, On the Design and Security of Block Ciphers, ETH Series in Information Processing, J. L. Massey (editor), Volume 1, Konstanz: hartung-Gorre Verlag (Zurich).

[53] Lai, X, and Massey, 1991, J. L, A Proposal for a New Block Encryption Standard, Advances in Cryptology, Proceedings Eurocrypt '90, LNCS 473, Springer-Verlag, pp. 389-404.

[54] Massey, J. L., 1969, Shift Register Sequences and BCH Decoding, IEEE Transactions on Information Theory, IT-15, pp. 122-127.

[55] Mende, B., Noll, L., and Sisodiya, S., 1997, How Lavarand Works, Silicon Graphics Incorporated, published on Internet: http://lavarand.sgi.com (also reported in Scientific American, November 1997 p. 18, and New Scientist, 8 Nov. 1997).

[56] Menezes, A. J., van Oorschot, P. C., Vanstone, S. A., 1997, Handbook of Applied Cryptography, CRC Press.

[57] Merkle, R. C., 1978, Secure Communication Over Insecure Channels, Communications of the ACM, Volume 21, No 4, pp. 294-299.

[58] Montgomery, P. L., 1985, Modular Multiplication Without Trial Division, Mathematics of Computation, Volume 44, Number 170, pp. 519-521.

[59] Moreau, T., A Practical "Perfect" Pseudo-Random Number Generator, paper submitted to Computers in Physics on Feb. 27, 1996, Internet version: http://www.connotech.com/BBS.HTM

[60] Moreau, T., 1997, Pseudo-Random Generators, a High-Level Survey-in-Progress, Published on the internet: http://www.cabano.com/connotech/RNG.HTM

[61] NIST, 1994, Digital Signature Standard, NIST ISL Bulletin, online version at http://csrc.ncsl.nist.gov/nistbul/cs194-11.txt

[62] Oehler, M., Glenn, R., 1997, HMAC-MD5 IP Authentication with Replay Prevention, Network Working Group RFC 2085, http://reference.ncrs.usda.gov/ietf/rfc/2100/rfc2085.txt

[63] Oppliger, R., 1996, Authentication Systems For Secure Networks, Artech House, Norwood Mass.

[64] Preneel, B., van Oorschot, P. C., 1996, MDx-MAC And Building Fast MACs From Hash Functions, Advances in Cryptology, Proceedings Crypto95, LNCS 963, D. Coppersmith, Ed., Springer-Verlag, pp. 1-14.

[65] Preneel, B., van Oorschot, P. C., 1996, On the Security of Two MAC Algorithms, Advances in Cryptology, Proceedings Eurocrypt '96, LNCS 1070, U. Maurer, Ed., Springer-Verlag, 1996, pp. 19-32.

[66] Preneel, B., Bosselaers, A., Dobbertin, H., 1997, The Cryptographic Hash Function RIPEMD-160, Crypto-Bytes, Volume 3, No 2, 1997, pp. 9-14.

[67] Rankl, W., and Effing, W., 1997, Smart Card Handbook, John Wiley and Sons (first published as Handbuch der Chipkarten, Carl Hanser Verlag, Munich, 1995).

[68] Ritter, T., 1991, The Efficient Generation of Cryptographic Confusion Sequences, Cryptologia, Volume 15, No 2, pp. 81-139.

[69] Rivest, R. L., 1993, Dr. Ron Rivest on the Difficulties of Factoring, Ciphertext: The RSA Newsletter, Vol 1, No 1, pp. 6, 8.

[70] Rivest, R. L., 1991, The MD4 Message-Digest Algorithm, Advances in Cryptology, Proceedings Crypto '90, LNCS 537, S. Vanstone, Ed., Springer-Verlag, pp. 301-311.

[71] Rivest, R. L., 1992, The RC4 Encryption Algorithm, RSA Data Security Inc. (This document has not been made public).

[72] Rivest, R. L., 1992, The MD4 Message-Digest Algorithm, Request for Comments (RFC) 1320, Internet Activities Board, Internet Privacy Task Force, April 1992.

[73] Rivest, R. L., 1992, The MD5 Message-Digest Algorithm, Request for Comments (RFC) 1321, Internet Activities Board, Internet privacy Task Force.

[74] Rivest, R. L., 1995, The RC5 Encryption Algorithm, Fast Software Encryption, LNCS 1008, Springer-Verlag, pp. 86-96.

[75] Rivest, R. L., Shamir, A., and Adleman, L. M., 1978, A Method For Obtaining Digital Signatures and Public-Key Cryptosystems, Communications of the ACM, Volume 21, No 2, pp. 120-126.

[76] Schneier, S., 1994, Description of a New Variable-Length Key, 64-Bit Block Cipher (Blowfish), Fast Software Encryption (December 1993), LNCS 809, Springer-Verlag, pp. 191-204.

[77] Schneier, S., 1995, The Blowfish Encryption Algorithm—One Year Later, Dr Dobb's Journal, September 1995.

[78] Schneier, S., 1996, Applied Cryptography, Wiley Press.

[79] Schneier, S., 1998, The Blowfish Encryption Algorithm, revision date Feb. 25, 1998, http://www.counterpane.com/blowfish.html

[80] Schneier, S., 1998, The Crypto Bomb is Ticking, Byte Magazine, May 1998, pp. 97-102.

[81] Schnorr, C. P., 1990, Efficient Identification and Signatures for Smart Cards, Advances in Cryptology, Proceedings Eurocrypt '89, LNCS 435, Springer-Verlag, pp. 239-252.

[82] Shamir, A., and Fiat, A., Method, Apparatus and Article For Identification and Signature, U.S. Pat. No. 4,748,668, 31 May 1988.

[83] Shor, W., 1994, Algorithms for Quantum Computation: Discrete Logarithms and Factoring, Proc. 35th Symposium. Foundations of Computer Science (FOCS), IEEE Computer Society, Los Alamitos, Calif., 1994.

[84] Silverbrook Research, 1998, Authentication Chip Technical Reference.

[85] Silverbrook Research, 1998, Authentication Chip Programming Station.

[86] Simmons, G. J., 1992, A Survey of Information Authentication, Contemporary Cryptography—The Science of Information Integrity, G Simmons, Ed., IEEE Press, New York.

[87] Tewksbury, S. K., 1998, Architectural Fault Tolerance, Integrated Circuit Manufacturability, Pineda de Gyvez, J., and Pradhan, D. K., Eds., IEEE Press, New York.

[88] Tsudik, G., 1992, Message Authentication With One-way Hash Functions, Proceedings of Infocom '92 (Also in Access Control and Policy Enforcement in Internetworks, Ph.D. Dissertation, Computer Science Department, University of Southern California, April 1991).

[89] Vallett. D., Kash, J., and Tsang, J., Watching Chips Work, IBM MicroNews, Vol 4, No 1, 1998.

[90] Vazirani, U. V., and Vazirani, V. V., 1984, Efficient and Secure Random Number Generation, 25th Symposium. Foundations of Computer Science (FOCS), IEEE Computer Society, 1984, pp. 458-463.

[91] Wagner, D., Goldberg, I., and Briceno, M., 1998, GSM Cloning, ISAAC Research Group, University of California, http://www.isaac.cs.berkeley.edu/isaac/gsm-faq.html

[92] Wiener, M. J., 1997, Efficient DES Key Search—An Update, RSA Laboratories CryptoBytes, Volume 3, No 2, pp. 6-8.

[93] Zoreda, J. L., and Otón, J. M., 1994, Smart Cards, Artech House, Norwood Mass.

The invention claimed is:

1. A trusted integrated circuit for use in authenticating an untrusted integrated circuit; the trusted integrated circuit including a random number generator, a symmetric encryption function and two secret keys for the function, a signature function and a test function; wherein the trusted integrated circuit chip generates test data including a random number and its signature, encrypted using a first of said secret keys and transmits the test data to the untrusted integrated circuit, wherein the trusted integrated circuit receives a data message and an encrypted version of the data message in combination with the random number from the untrusted integrated circuit, the data message being encrypted using a second of said secret keys, wherein the test function operates to encrypt the random number together with the data message by the symmetric encryption function using the second secret key, compare the two versions of the random number encrypted together with the data message using the second key, and in the event that the two versions match, considers the untrusted integrated circuit and the data message to be valid, otherwise, it considers the untrusted integrated circuit and the data message to be invalid.

2. A trusted integrated circuit according to claim 1, where the two secret keys are kept secret.

3. A trusted integrated circuit according to claim 1, where the random number is generated by the random number generator from an initial seed value only in the trusted chip, and the seed value for generating a new random number is changed only after each successful validation.

4. A trusted integrated circuit according to claim 1, where the data message is a memory vector of the integrated circuit.

5. A trusted integrated circuit according to claim 4, where part of the vector space is different for each chip, part of it is constant (read only) for each consumable, and part of it is decrement only.

6. A trusted integrated circuit according to claim 1, where the signature function operates to create digital signatures between 128 bits and 160 bits long.

7. A trusted integrated circuit according to claim 1, where the test function advances the random number in the event of a match.

8. A trusted integrated circuit according to claim 1, where the time taken for the test function to return an indication that the untrusted chip is invalid is identical for all bad inputs, and the time taken to return an indication that the untrusted chip is valid is identical for all good inputs.

9. A trusted integrated circuit according to claim 1, where the time taken for the read function to return the invalid indication is identical for all bad inputs, and the time taken to make a return for a good input is the same for all good inputs.

* * * * *